United States Patent
Dutta

(10) Patent No.: US 10,616,063 B1
(45) Date of Patent: Apr. 7, 2020

(54) STATELESS MULTICAST IN IP NETWORKS

(71) Applicant: NOKIA SOLUTIONS AND NETWORKS OY, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/158,562

(22) Filed: Oct. 12, 2018

(51) Int. Cl.
| | |
|---|---|
| G06F 15/173 | (2006.01) |
| H04L 12/24 | (2006.01) |
| H04L 12/723 | (2013.01) |
| H04L 29/06 | (2006.01) |
| H04L 12/761 | (2013.01) |
| H04L 12/713 | (2013.01) |
| H04L 12/715 | (2013.01) |

(52) U.S. Cl.
CPC .......... H04L 41/0893 (2013.01); H04L 45/16 (2013.01); H04L 45/50 (2013.01); H04L 45/586 (2013.01); H04L 45/64 (2013.01); H04L 69/22 (2013.01)

(58) Field of Classification Search
CPC ......... H04L 45/16; H04L 45/50; H04L 45/64; H04L 45/586; H04L 41/0893; H04L 69/22
USPC ........................................................ 709/238
See application file for complete search history.

(56) References Cited

U.S. PATENT DOCUMENTS

| | | | |
|---|---|---|---|
| 2006/0203819 A1* | 9/2006 | Farinacci | H04L 45/00 370/390 |
| 2007/0091827 A1* | 4/2007 | Boers | H04L 12/185 370/255 |
| 2012/0026866 A1* | 2/2012 | Venkataraman | H04L 12/1877 370/225 |
| 2013/0266023 A1* | 10/2013 | Breslau | H04L 12/1868 370/432 |

OTHER PUBLICATIONS

Fenner, B., et al., "Protocol Independent Multicast-Sparse Mode (PIM-SM): Protocol Specification (Revised)," Internet Engineering Task Force, RFC 7761, Mar. 2016, 137 pages.

(Continued)

Primary Examiner — Frantz B Jean
(74) Attorney, Agent, or Firm — Tong, Rea, Bentley & Kim, LLC

(57) ABSTRACT

Various example embodiments for supporting stateless multicast in communication networks are presented. Various example embodiments for supporting stateless multicast in communication networks may be configured to support stateless multicast in Internet Protocol (IP) networks. Various example embodiments for supporting stateless multicast in IP networks may be configured to support stateless IP multicast based on encoding of indications of egress routers of the multicast group within the IP packet (e.g., an indication of a group of egress routers including a subset of the egress routers of the multicast group, where the indication of the group of egress routers may include respective IP addresses of the egress routers in the group of egress routers, an indication of a tree from a gateway router to the egress routers in the group of egress routers, or the like, as well as various combinations thereof).

28 Claims, 53 Drawing Sheets

(56) References Cited

OTHER PUBLICATIONS

Cain, B., et al., "Internet Group Management Protocol, Version 3," Network Working Group, RFC 3376, Oct. 2002, 53 pages.
Aggarwal, R., et al., "Extensions to Resource Reservation Protocol—Traffic Engineering (RSVP-TE) for Point-to-Multipoint TE Label Switched Paths (LSPs)," Network Working Group, RFC 4875, May 2007, 53 pages.
Wijnands, IJ., et al., "Multipoint LDP In-Band Signaling for Point-to-Multipoint and Multipoint-to-Multipoint Label Switched Paths," Internet Engineering Task Force, RFC 6826, Jan. 2013, 12 pages.
Wijnands, IJ., et al., "Multicast Using Bit Index Explicit Replication (BIER)," Internet Engineering Task Force, RFC 8279, Nov. 2017, 43 pages.
Andersson, L., et al., "LDP Specification," Network Working Group, RFC 5036, Oct. 2007, 135 pages.
Filsfils, C., et al., "Segment Routing Architecture—draft-ietf-spring-segment-routing-15," Network Working Group, Jan. 25, 2018, 31 pages.
Rosen, E., et al., "Multiprotocol Label Switching Architecture," Network Working Group, RFC 3031, Jan. 2001, 57 pages.
Rosen, E., et al., "Multicast in MPLS/BGP IP VPNs," Internet Engineering Task Force, RFC 6513, Feb. 2012, 88 pages.
IANA, "Special-Purpose Multiprotocol Label Switching (MPLS) Label Values," printed from https://www.iana.org/assignments/mpls-label-values/mpls-label-values.xhtml on Nov. 28, 2018, 2 pages.
Previdi, S., et al., "IS-IS Extensions for Segment Routing—draft-ietf-isis-segment-routing-extensions-15," IS-IS for IP Internets, Dec. 19, 2017, 34 pages.
Psenak, P. et al., "OSPF Extensions for Segment Routing—draft-ietf-ospf-segment-routing-extensions-24," Open Shortest Path First IGP, Dec. 14, 2017, 29 pages.
Psenak, P. et al., "OSPFv3 Extensions for Segment Routing draft-ietf-ospfv3-segment-routing-extensions-11," Open Shortest Path First IGP, Jan. 26, 2018, 28 pages.
Previdi, S. et al., "BGP Link-State extensions for Segment Routing—draft-ietf-idr-bgp-ls-segment-routing-ext-04," Inter-Domain Routing, Jan. 25, 2018, 27 pages.
Broadcom, "10 Tb/s StrataDNX Jericho2 Ethernet Switch Series," BCM88690, printed from https://www.broadcom.com/products/ethernet-connectivity/switching/stratadnx/bcm88690 on Nov. 28, 2018, 4 pages.
Networkworld, "Arista takes on Cisco, Juniper at routing," printed from https://www.networkworld.com/article/3048914/cloud-computing/arista-takes-on-cisco-juniper-at-routing.html on Nov. 28, 2018, 2 pages.
Ray, T., "Cisco Already Had a Jump on Arista with Broadcom Routing Chip, Says UBS," printed from https://www.barrons.com/articles/cisco-already-had-a-jump-on-arista-with-broadcom-routing-chip-says-ubs-1459795684 on Nov. 28, 2018, 2 pages.
Boivie, R., et al., "Explicit Multicast (Xcast) Concepts and Options," Network Working Group, RFC 5058, Nov. 2007, 35 pages.
Information Sciences Institute, "Internet Protocol—DARPA Internet Program Protocol Specification," RFC 791, Sep. 1981, 50 pages.
Deering, S. et al., "Internet Protocol, Version 6 (IPv6) Specification," Network Working Group, RFC 2460, Dec. 1998, 39 pages.
IANA, "Internet Protocol Version 4 (IPv4) Parameters," printed from https://www.iana.org/assignments/ip-parameters/ip-parameters.xhtml on Nov. 28, 2018, 3 pages.
IANA, "Internet Protocol Version 6 (IPv6) Parameters," printed from https://www.iana.org/assignments/ipv6-parameters/ipv6-parameters.xhtml#extension-header on Nov. 28, 2018, 4 pages.
IANA. "IANA IPv4 Special-Purpose Address Registry," printed from https://www.iana.org/assignments/iana-ipv4-special-registry/iana-ipv4-special-registry.xhtml on Nov. 28, 2018, 2 pages.
IANA. "IANA IPv6 Special-Purpose Address Registry," printed from https://www.iana.org/assignments/iana-ipv6-special-registry/iana-ipv6-special-registry.xhtml on Nov. 29, 2018, 2 pages.
Hinden, R., et al., "Unique Local IPv6 Unicast Addresses," Network Working Group, RFC 4193, Oct. 2005, 16 pages.
Hinden, R. et al, "IP Version 6 Addressing Architecture," Network Working Group, RFC 4291, Feb. 2006, 24 pages.
Ooms, D. et al, "Connectionless Multicast," Internet Draft, <draft-ooms-cl-multicast-02.txt>, Apr. 2000, 24 pages.
Imai, Y. et al, "Multiple Destination option on IPv6 (MDO6)," Internet Draft, https://tools.ietf.org/html/draft-imai-mdo6-00, Sep. 2000, 28 pages.

* cited by examiner

FIG. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Version|  IHL  |Type of Service|          Total Length         |
+-+-+-+-+-+-+-+-+-+-+-+-+-+-+-+-+-+-+-+-+-+-+-+-+-+-+-+-+-+-+-+-+
|         Identification        |Flags|      Fragment Offset    |
+-+-+-+-+-+-+-+-+-+-+-+-+-+-+-+-+-+-+-+-+-+-+-+-+-+-+-+-+-+-+-+-+
|  Time to Live |    Protocol   |         Header Checksum       |
+-+-+-+-+-+-+-+-+-+-+-+-+-+-+-+-+-+-+-+-+-+-+-+-+-+-+-+-+-+-+-+-+
|                         Source Address                        |
+-+-+-+-+-+-+-+-+-+-+-+-+-+-+-+-+-+-+-+-+-+-+-+-+-+-+-+-+-+-+-+-+
|                       Destination Address                     |
+-+-+-+-+-+-+-+-+-+-+-+-+-+-+-+-+-+-+-+-+-+-+-+-+-+-+-+-+-+-+-+-+
|                    Options                    |    Padding    |
+-+-+-+-+-+-+-+-+-+-+-+-+-+-+-+-+-+-+-+-+-+-+-+-+-+-+-+-+-+-+-+-+
```

FIG. 8

```
COPY CLASS NUMBER LENGTH DESCRIPTION
----- ------ ------ -----------
  1     0      15   var. Explicit Multicast Route (EMR) - used for
                    stateless multicast of the internet datagram
                    based on EMR information supplied by the source.
```

FIG. 9

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(=15)   |     Length    |     Flags     |    RESERVED   |
+-+-+-+-+-+-+-+-+-+-+-+-+-+-+-+-+-+-+-+-+-+-+-+-+-+-+-+-+-+-+-+-+
|                      IPv4-Address-List[1]                     |
+-+-+-+-+-+-+-+-+-+-+-+-+-+-+-+-+-+-+-+-+-+-+-+-+-+-+-+-+-+-+-+-+
|                                .                              |
+                                .                              +
|                                .                              |
+-+-+-+-+-+-+-+-+-+-+-+-+-+-+-+-+-+-+-+-+-+-+-+-+-+-+-+-+-+-+-+-+
|                      IPv4-Address-List[n]                     |
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Length    |          Next Header          |
+-+-+-+-+-+-+-+-+-+-+-+-+-+-+-+-+-+-+-+-+-+-+-+-+-+-+-+-+-+-+-+-+
|                  Payload(Type-specific format/data)           |
/                                                               /
/                                                               /
+-+-+-+-+-+-+-+-+-+-+-+-+-+-+-+-+-+-+-+-+-+-+-+-+-+-+-+-+-+-+-+-+
```

FIG. 12

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Flags     |                   RESERVED                    |
+-+-+-+-+-+-+-+-+-+-+-+-+-+-+-+-+-+-+-+-+-+-+-+-+-+-+-+-+-+-+-+-+
|                      IPv4-Address-List[1]                     |
+-+-+-+-+-+-+-+-+-+-+-+-+-+-+-+-+-+-+-+-+-+-+-+-+-+-+-+-+-+-+-+-+
|                               .                               |
+                               .                               +
|                               .                               |
+-+-+-+-+-+-+-+-+-+-+-+-+-+-+-+-+-+-+-+-+-+-+-+-+-+-+-+-+-+-+-+-+
|                      IPv4-Address-List[n]                     |
+-+-+-+-+-+-+-+-+-+-+-+-+-+-+-+-+-+-+-+-+-+-+-+-+-+-+-+-+-+-+-+-+
```

```
   0                   1                   2                   3
   0 1 2 3 4 5 6 7 8 9 0 1 2 3 4 5 6 7 8 9 0 1 2 3 4 5 6 7 8 9 0 1
  +-+-+-+-+-+-+-+-+-+-+-+-+-+-+-+-+-+-+-+-+-+-+-+-+-+-+-+-+-+-+-+-+
  |  Next Header  |  Hdr Ext Len  |  EMR Type=0   |     Flags     |
  +-+-+-+-+-+-+-+-+-+-+-+-+-+-+-+-+-+-+-+-+-+-+-+-+-+-+-+-+-+-+-+-+
  |                                                               |
  +                                                               +
  |                                                               |
  +                      IPv6-Address-List[1]                     +
  |                                                               |
  +                                                               +
  |                                                               |
  +-+-+-+-+-+-+-+-+-+-+-+-+-+-+-+-+-+-+-+-+-+-+-+-+-+-+-+-+-+-+-+-+
  |                               .                               |
  +                               .                               +
  |                               .                               |
  +-+-+-+-+-+-+-+-+-+-+-+-+-+-+-+-+-+-+-+-+-+-+-+-+-+-+-+-+-+-+-+-+
  |                                                               |
  +                                                               +
  |                                                               |
  +                      IPv6-Address-List[n]                     +
  |                                                               |
  +                                                               +
  |                                                               |
  +-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |         Length        |       Next Header     |
+-+-+-+-+-+-+-+-+-+-+-+-+-+-+-+-+-+-+-+-+-+-+-+-+-+-+-+-+-+-+-+-+
|                  Payload(Type-specific format/data)            |
/                                                                /
/                                                                /
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Flags     |                  RESERVED                     |
+-+-+-+-+-+-+-+-+-+-+-+-+-+-+-+-+-+-+-+-+-+-+-+-+-+-+-+-+-+-+-+-+
|                                                               |
+                      IPv6-Address-List[1]                     +
|                                                               |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                               .                               |
+                               .                               +
|                               .                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                      IPv6-Address-List[n]                     +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

*FIG. 22*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Length            |     Next Header       |
+-+-+-+-+-+-+-+-+-+-+-+-+-+-+-+-+-+-+-+-+-+-+-+-+-+-+-+-+-+-+-+-+
|         Segments Left         | Flags     |    RESERVED       |
+-+-+-+-+-+-+-+-+-+-+-+-+-+-+-+-+-+-+-+-+-+-+-+-+-+-+-+-+-+-+-+-+
|                     Source Addr[1]                            |
+-+-+-+-+-+-+-+-+-+-+-+-+-+-+-+-+-+-+-+-+-+-+-+-+-+-+-+-+-+-+-+-+
|                     Source Addr[2]                            |
+-+-+-+-+-+-+-+-+-+-+-+-+-+-+-+-+-+-+-+-+-+-+-+-+-+-+-+-+-+-+-+-+
~                                                               ~
~                                                               ~
+-+-+-+-+-+-+-+-+-+-+-+-+-+-+-+-+-+-+-+-+-+-+-+-+-+-+-+-+-+-+-+-+
|                     Source Addr[N]                            |
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Next Header  |  Hdr Ext Len  | Routing Type=0| Segments Left |
+-+-+-+-+-+-+-+-+-+-+-+-+-+-+-+-+-+-+-+-+-+-+-+-+-+-+-+-+-+-+-+-+
|                            Reserved                           |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                           Address[1]                          +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                           Address[2]                          +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                               .                               |
|                               .                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                           Address[n]                          +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

*FIG. 26B*

```
+                                                            +   |
|                                                            |   |
+                       Address[2]                           +   |
|                                                            |   |
+                                                            +   |
|                                                            |   |
+-+-+-+-+-+-+-+-+-+-+-+-+-+-+-+-+-+-+-+-+-+-+-+-+-+-+-+-+-+-+-+  |
|                            .                               |   |
+                            .                               +   |
|                            .                               |   |
+-+-+-+-+-+-+-+-+-+-+-+-+-+-+-+-+-+-+-+-+-+-+-+-+-+-+-+-+-+-+-+  |
|           .                                                |   |
+                                                            +   |
|                                                            |   |
+                       Address[n]                           +   |
|                                                            |   |
+                                                            +   |
|                                                            |   |
+-+-+-+-+-+-+-+-+-+-+-+-+-+-+-+-+-+-+-+-+-+-+-+-+-+-+-+-+-+-+-+  V
|                                                            |   ^
+                                                            +   |
|      EMR Header (as IPv6 Extended Header                   |   |
|             or IPv4 Shim or IPv6 Shim)                     |   |
~                                                            ~  EMR
|                                                            |  Hdr
+                                                            +   |
|                                                            |   |
+                                                            +   |
|                                                            |   |
+                                                            +   |
|                                                            |   |
+-+-+-+-+-+-+-+-+-+-+-+-+-+-+-+-+-+-+-+-+-+-+-+-+-+-+-+-+-+-+-+  V
```

FIG. 27

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+   ^
|    Segments Left      |   Flags       |   RESERVED    |       |   |
+-+-+-+-+-+-+-+-+-+-+-+-+-+-+-+-+-+-+-+-+-+-+-+-+-+-+-+-+-+-+-+-+   |
|                                                               |   |
+                                                               +   |
|                                                               |   |
+                          Address[1]                           +  IPv6
|                                                               | Routing
+                                                               +  Hdr
|                                                               |   |
+-+-+-+-+-+-+-+-+-+-+-+-+-+-+-+-+-+-+-+-+-+-+-+-+-+-+-+-+-+-+-+-+   |
|                                                               |   |
+                                                               +   |
|                                                               |   |
+                          Address[2]                           +   |
|                                                               |   |
+                                                               +   |
|                                                               |   |
+-+-+-+-+-+-+-+-+-+-+-+-+-+-+-+-+-+-+-+-+-+-+-+-+-+-+-+-+-+-+-+-+   |
|                              .                                |   |
|                              .                                |   |
+-+-+-+-+-+-+-+-+-+-+-+-+-+-+-+-+-+-+-+-+-+-+-+-+-+-+-+-+-+-+-+-+   |
|                                                               |   |
+                                                               +   |
|                                                               |   |
+                          Address[n]                           +   |
|                                                               |   |
+                                                               +   |
|                                                               |   |
+-+-+-+-+-+-+-+-+-+-+-+-+-+-+-+-+-+-+-+-+-+-+-+-+-+-+-+-+-+-+-+-+   v
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
~                         Tree Address                          ~
+-+-+-+-+-+-+-+-+-+-+-+-+-+-+-+-+-+-+-+-+-+-+-+-+-+-+-+-+-+-+-+-+
~                        Gateway Address                        ~
+-+-+-+-+-+-+-+-+-+-+-+-+-+-+-+-+-+-+-+-+-+-+-+-+-+-+-+-+-+-+-+-+
```

*FIG. 32*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(=15)   | Length(=4n+4))|     Flags     |    RESERVED   |
+-+-+-+-+-+-+-+-+-+-+-+-+-+-+-+-+-+-+-+-+-+-+-+-+-+-+-+-+-+-+-+-+
|                      IPv4-Address-List[1]                     |
+-+-+-+-+-+-+-+-+-+-+-+-+-+-+-+-+-+-+-+-+-+-+-+-+-+-+-+-+-+-+-+-+
|                              .                                |
|                              .                                |
+-+-+-+-+-+-+-+-+-+-+-+-+-+-+-+-+-+-+-+-+-+-+-+-+-+-+-+-+-+-+-+-+
|               IPv4-Address-List[x] (Tree Address)             |
+-+-+-+-+-+-+-+-+-+-+-+-+-+-+-+-+-+-+-+-+-+-+-+-+-+-+-+-+-+-+-+-+
|             IPv4-Address-List[x+1] (Gateway Address)          |
+-+-+-+-+-+-+-+-+-+-+-+-+-+-+-+-+-+-+-+-+-+-+-+-+-+-+-+-+-+-+-+-+
|                              .                                |
|                              .                                |
+-+-+-+-+-+-+-+-+-+-+-+-+-+-+-+-+-+-+-+-+-+-+-+-+-+-+-+-+-+-+-+-+
|                      IPv4-Address-List[n]                     |
+-+-+-+-+-+-+-+-+-+-+-+-+-+-+-+-+-+-+-+-+-+-+-+-+-+-+-+-+-+-+-+-+
```

*FIG. 33*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Flags         |                  RESERVED                     |
+-+-+-+-+-+-+-+-+-+-+-+-+-+-+-+-+-+-+-+-+-+-+-+-+-+-+-+-+-+-+-+-+
|                       IPv4-Address-List[1]                    |
+-+-+-+-+-+-+-+-+-+-+-+-+-+-+-+-+-+-+-+-+-+-+-+-+-+-+-+-+-+-+-+-+
|                               .                               |
|                               .                               |
|                               .                               |
+-+-+-+-+-+-+-+-+-+-+-+-+-+-+-+-+-+-+-+-+-+-+-+-+-+-+-+-+-+-+-+-+
|                  IPv4-Address-List[x]  (Tree Address)         |
+-+-+-+-+-+-+-+-+-+-+-+-+-+-+-+-+-+-+-+-+-+-+-+-+-+-+-+-+-+-+-+-+
|                  IPv4-Address-List[x+1] (Gateway Address)     |
+-+-+-+-+-+-+-+-+-+-+-+-+-+-+-+-+-+-+-+-+-+-+-+-+-+-+-+-+-+-+-+-+
|                               .                               |
|                               .                               |
|                               .                               |
+-+-+-+-+-+-+-+-+-+-+-+-+-+-+-+-+-+-+-+-+-+-+-+-+-+-+-+-+-+-+-+-+
|                       IPv4-Address-List[n]                    |
+-+-+-+-+-+-+-+-+-+-+-+-+-+-+-+-+-+-+-+-+-+-+-+-+-+-+-+-+-+-+-+-+
```

*FIG. 34*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Next Header  |  Hdr Ext Len  |   EMR Type=0  |     Flags     |
+-+-+-+-+-+-+-+-+-+-+-+-+-+-+-+-+-+-+-+-+-+-+-+-+-+-+-+-+-+-+-+-+
|                                                               |
+                                                               +
|                       IPv6-Address-List[1]                    |
+                                                               +
|                                                               |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                              .                                |
|                              .                                |
+-+-+-+-+-+-+-+-+-+-+-+-+-+-+-+-+-+-+-+-+-+-+-+-+-+-+-+-+-+-+-+-+
|                                                               |
+         IPv6-Address-List[x]  (Tree Address)                  +
|                                                               |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+       IPv6-Address-List[x+1]  (Gateway Address)               +
|                                                               |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                              .                                |
|                              .                                |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                     IPv6-Address-List[n]                      +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

FIG. 35

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Flags         |                  RESERVED                     |
+-+-+-+-+-+-+-+-+-+-+-+-+-+-+-+-+-+-+-+-+-+-+-+-+-+-+-+-+-+-+-+-+
|                                                               |
+                     IPv6-Address-List[1]                      +
|                                                               |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+         IPv6-Address-List[x]  (Tree Address)                  +
|                                                               |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+       IPv6-Address-List[x+1] (Gateway Address)                +
|                                                               |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                     IPv6-Address-List[n]                      +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

FIG. 37

IPv4 Header: Source Address (SA) = IP-1, Destination Address (DA) = IP-21
IPv4 Option: EMR (below)

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |   Type(143)   |   Length(16)  |     Flags     |    RESERVED   |
   +-+-+-+-+-+-+-+-+-+-+-+-+-+-+-+-+-+-+-+-+-+-+-+-+-+-+-+-+-+-+-+-+
   |                              IP-2                             |
   +-+-+-+-+-+-+-+-+-+-+-+-+-+-+-+-+-+-+-+-+-+-+-+-+-+-+-+-+-+-+-+-+
   |                              IP-3                             |
   +-+-+-+-+-+-+-+-+-+-+-+-+-+-+-+-+-+-+-+-+-+-+-+-+-+-+-+-+-+-+-+-+
   |                              IP-4                             |
   +-+-+-+-+-+-+-+-+-+-+-+-+-+-+-+-+-+-+-+-+-+-+-+-+-+-+-+-+-+-+-+-+
```

FIG. 38

IPv4 Header: Source Address (SA) = IP-1, Destination Address (DA) = IP-21
IPv4 Option: EMR (below)

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |   Type(143)   |   Length(16)  |     Flags     |    RESERVED   |
   +-+-+-+-+-+-+-+-+-+-+-+-+-+-+-+-+-+-+-+-+-+-+-+-+-+-+-+-+-+-+-+-+
   |                              IP-5                             |
   +-+-+-+-+-+-+-+-+-+-+-+-+-+-+-+-+-+-+-+-+-+-+-+-+-+-+-+-+-+-+-+-+
   |                              IP-6                             |
   +-+-+-+-+-+-+-+-+-+-+-+-+-+-+-+-+-+-+-+-+-+-+-+-+-+-+-+-+-+-+-+-+
   |                              IP-7                             |
   +-+-+-+-+-+-+-+-+-+-+-+-+-+-+-+-+-+-+-+-+-+-+-+-+-+-+-+-+-+-+-+-+
```

FIG. 39

IPv4 Header: Source Address (SA) = IP-1, Destination Address (DA) = IP-21
IPv4 Option: EMR (below)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(143)   |   Length(16)  |     Flags     |    RESERVED   |
+-+-+-+-+-+-+-+-+-+-+-+-+-+-+-+-+-+-+-+-+-+-+-+-+-+-+-+-+-+-+-+-+
|                              IP-8                             |
+-+-+-+-+-+-+-+-+-+-+-+-+-+-+-+-+-+-+-+-+-+-+-+-+-+-+-+-+-+-+-+-+
|                              IP-9                             |
+-+-+-+-+-+-+-+-+-+-+-+-+-+-+-+-+-+-+-+-+-+-+-+-+-+-+-+-+-+-+-+-+
|                              IP-10                            |
+-+-+-+-+-+-+-+-+-+-+-+-+-+-+-+-+-+-+-+-+-+-+-+-+-+-+-+-+-+-+-+-+
```

FIG. 40

IPv4 Header: Source Address (SA) = IP-1, Destination Address (DA) = IP-21
IPv4 Option: EMR (below)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(143)   |   Length(16)  |     Flags     |    RESERVED   |
+-+-+-+-+-+-+-+-+-+-+-+-+-+-+-+-+-+-+-+-+-+-+-+-+-+-+-+-+-+-+-+-+
|                              IP-11                            |
+-+-+-+-+-+-+-+-+-+-+-+-+-+-+-+-+-+-+-+-+-+-+-+-+-+-+-+-+-+-+-+-+
|                              IP-12                            |
+-+-+-+-+-+-+-+-+-+-+-+-+-+-+-+-+-+-+-+-+-+-+-+-+-+-+-+-+-+-+-+-+
|                              IP-13                            |
+-+-+-+-+-+-+-+-+-+-+-+-+-+-+-+-+-+-+-+-+-+-+-+-+-+-+-+-+-+-+-+-+
```

*FIG. 42*

IPv4 Header: Source Address (SA) = IP-1, Destination Address (DA) = IP-21
IPv4 Option: EMR (below)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(143)   |  Length(16)   |     Flags     |   RESERVED    |
+-+-+-+-+-+-+-+-+-+-+-+-+-+-+-+-+-+-+-+-+-+-+-+-+-+-+-+-+-+-+-+-+
|                              IP-2                             |
+-+-+-+-+-+-+-+-+-+-+-+-+-+-+-+-+-+-+-+-+-+-+-+-+-+-+-+-+-+-+-+-+
|                              IP-3                             |
+-+-+-+-+-+-+-+-+-+-+-+-+-+-+-+-+-+-+-+-+-+-+-+-+-+-+-+-+-+-+-+-+
|                              IP-4                             |
+-+-+-+-+-+-+-+-+-+-+-+-+-+-+-+-+-+-+-+-+-+-+-+-+-+-+-+-+-+-+-+-+
```

FIG. 43

IPv4 Header: Source Address (SA) = IP-1, Destination Address (DA) = IP-2
IPv4 Option: EMR (below)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(143)   |   Length(8)   |     Flags     |   RESERVED    |
+-+-+-+-+-+-+-+-+-+-+-+-+-+-+-+-+-+-+-+-+-+-+-+-+-+-+-+-+-+-+-+-+
|                              IP-2                             |
+-+-+-+-+-+-+-+-+-+-+-+-+-+-+-+-+-+-+-+-+-+-+-+-+-+-+-+-+-+-+-+-+
```

FIG. 44

IPv4 Header: Source Address (SA) = IP-1, Destination Address (DA) = IP-22
IPv4 Option: EMR (below)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(143)   |   Length(12)  |     Flags     |   RESERVED    |
+-+-+-+-+-+-+-+-+-+-+-+-+-+-+-+-+-+-+-+-+-+-+-+-+-+-+-+-+-+-+-+-+
|                              IP-3                             |
+-+-+-+-+-+-+-+-+-+-+-+-+-+-+-+-+-+-+-+-+-+-+-+-+-+-+-+-+-+-+-+-+
|                              IP-4                             |
+-+-+-+-+-+-+-+-+-+-+-+-+-+-+-+-+-+-+-+-+-+-+-+-+-+-+-+-+-+-+-+-+
```

FIG. 45

IPv4 Header: Source Address (SA) = IP-1, Destination Address (DA) = IP-21
IPv4 Option: EMR (below)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(143)   |   Length(16)  |     Flags     |    RESERVED   |
+-+-+-+-+-+-+-+-+-+-+-+-+-+-+-+-+-+-+-+-+-+-+-+-+-+-+-+-+-+-+-+-+
|                              IP-5                             |
+-+-+-+-+-+-+-+-+-+-+-+-+-+-+-+-+-+-+-+-+-+-+-+-+-+-+-+-+-+-+-+-+
|                              IP-6                             |
+-+-+-+-+-+-+-+-+-+-+-+-+-+-+-+-+-+-+-+-+-+-+-+-+-+-+-+-+-+-+-+-+
|                              IP-7                             |
+-+-+-+-+-+-+-+-+-+-+-+-+-+-+-+-+-+-+-+-+-+-+-+-+-+-+-+-+-+-+-+-+
```

FIG. 46

IPv4 Header: Source Address (SA) = IP-1, Destination Address (DA) = IP-GW1
IPv4 Option: EMR (below)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(143)   |   Length(16)  |     Flags     |    RESERVED   |
+-+-+-+-+-+-+-+-+-+-+-+-+-+-+-+-+-+-+-+-+-+-+-+-+-+-+-+-+-+-+-+-+
|                              IP-5                             |
+-+-+-+-+-+-+-+-+-+-+-+-+-+-+-+-+-+-+-+-+-+-+-+-+-+-+-+-+-+-+-+-+
|                              IP-6                             |
+-+-+-+-+-+-+-+-+-+-+-+-+-+-+-+-+-+-+-+-+-+-+-+-+-+-+-+-+-+-+-+-+
|                              IP-7                             |
+-+-+-+-+-+-+-+-+-+-+-+-+-+-+-+-+-+-+-+-+-+-+-+-+-+-+-+-+-+-+-+-+
```

FIG. 47

IPv4 Header: Source Address (SA) = IP-1, Destination Address (DA) = IP-21

IPv4 Option: EMR (below)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(143)   |   Length(16)  |     Flags     |    RESERVED   |
+-+-+-+-+-+-+-+-+-+-+-+-+-+-+-+-+-+-+-+-+-+-+-+-+-+-+-+-+-+-+-+-+
|                              IP-8                             |
+-+-+-+-+-+-+-+-+-+-+-+-+-+-+-+-+-+-+-+-+-+-+-+-+-+-+-+-+-+-+-+-+
|                              IP-9                             |
+-+-+-+-+-+-+-+-+-+-+-+-+-+-+-+-+-+-+-+-+-+-+-+-+-+-+-+-+-+-+-+-+
|                              IP-10                            |
+-+-+-+-+-+-+-+-+-+-+-+-+-+-+-+-+-+-+-+-+-+-+-+-+-+-+-+-+-+-+-+-+
```

FIG. 48

IPv4 Header: Source Address (SA) = IP-1, Destination Address (DA) = IP-GW1

IPv4 Option: EMR (below)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(143)   |   Length(16)  |     Flags     |    RESERVED   |
+-+-+-+-+-+-+-+-+-+-+-+-+-+-+-+-+-+-+-+-+-+-+-+-+-+-+-+-+-+-+-+-+
|                              IP-8                             |
+-+-+-+-+-+-+-+-+-+-+-+-+-+-+-+-+-+-+-+-+-+-+-+-+-+-+-+-+-+-+-+-+
|                              IP-9                             |
+-+-+-+-+-+-+-+-+-+-+-+-+-+-+-+-+-+-+-+-+-+-+-+-+-+-+-+-+-+-+-+-+
|                              IP-10                            |
+-+-+-+-+-+-+-+-+-+-+-+-+-+-+-+-+-+-+-+-+-+-+-+-+-+-+-+-+-+-+-+-+
```

FIG. 49

IPv4 Header: Source Address (SA) = IP-1, Destination Address (DA) = IP-21
IPv4 Option: EMR (below)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(143)   |   Length(16)  |     Flags     |    RESERVED   |
+-+-+-+-+-+-+-+-+-+-+-+-+-+-+-+-+-+-+-+-+-+-+-+-+-+-+-+-+-+-+-+-+
|                              IP-11                            |
+-+-+-+-+-+-+-+-+-+-+-+-+-+-+-+-+-+-+-+-+-+-+-+-+-+-+-+-+-+-+-+-+
|                              IP-12                            |
+-+-+-+-+-+-+-+-+-+-+-+-+-+-+-+-+-+-+-+-+-+-+-+-+-+-+-+-+-+-+-+-+
|                              IP-13                            |
+-+-+-+-+-+-+-+-+-+-+-+-+-+-+-+-+-+-+-+-+-+-+-+-+-+-+-+-+-+-+-+-+
```

FIG. 50

IPv4 Header: Source Address (SA) = IP-1, Destination Address (DA) = IP-GW1
IPv4 Option: EMR (below)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(143)   |   Length(16)  |     Flags     |    RESERVED   |
+-+-+-+-+-+-+-+-+-+-+-+-+-+-+-+-+-+-+-+-+-+-+-+-+-+-+-+-+-+-+-+-+
|                              IP-11                            |
+-+-+-+-+-+-+-+-+-+-+-+-+-+-+-+-+-+-+-+-+-+-+-+-+-+-+-+-+-+-+-+-+
|                              IP-12                            |
+-+-+-+-+-+-+-+-+-+-+-+-+-+-+-+-+-+-+-+-+-+-+-+-+-+-+-+-+-+-+-+-+
|                              IP-13                            |
+-+-+-+-+-+-+-+-+-+-+-+-+-+-+-+-+-+-+-+-+-+-+-+-+-+-+-+-+-+-+-+-+
```

*FIG. 55*

IPv4 Header: Source Address (SA) = IP-1, Destination Address (DA) = IP-2
IPv4 Option: EMR (below)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type(143)  |   Length(8)   |     Flags     |    RESERVED   |
+-+-+-+-+-+-+-+-+-+-+-+-+-+-+-+-+-+-+-+-+-+-+-+-+-+-+-+-+-+-+-+-+
|                              IP-2                             |
+-+-+-+-+-+-+-+-+-+-+-+-+-+-+-+-+-+-+-+-+-+-+-+-+-+-+-+-+-+-+-+-+
```

*FIG. 56*

IPv4 Header: Source Address (SA) = IP-1, Destination Address (DA) = IP-22
IPv4 Option: EMR (below)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type(143)  |   Length(12)  |     Flags     |    RESERVED   |
+-+-+-+-+-+-+-+-+-+-+-+-+-+-+-+-+-+-+-+-+-+-+-+-+-+-+-+-+-+-+-+-+
|                              IP-3                             |
+-+-+-+-+-+-+-+-+-+-+-+-+-+-+-+-+-+-+-+-+-+-+-+-+-+-+-+-+-+-+-+-+
|                              IP-4                             |
+-+-+-+-+-+-+-+-+-+-+-+-+-+-+-+-+-+-+-+-+-+-+-+-+-+-+-+-+-+-+-+-+
```

*FIG. 57*

IPv4 Header: Source Address (SA) = IP-1, Destination Address (DA) = IP-GW1
IPv4 Option: EMR (below)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(143)   |  Length(28)   |     Flags     |    RESERVED   |
+-+-+-+-+-+-+-+-+-+-+-+-+-+-+-+-+-+-+-+-+-+-+-+-+-+-+-+-+-+-+-+-+
|                             IP-TA2                            |
+-+-+-+-+-+-+-+-+-+-+-+-+-+-+-+-+-+-+-+-+-+-+-+-+-+-+-+-+-+-+-+-+
|                             IP-GW2                            |
+-+-+-+-+-+-+-+-+-+-+-+-+-+-+-+-+-+-+-+-+-+-+-+-+-+-+-+-+-+-+-+-+
|                             IP-TA3                            |
+-+-+-+-+-+-+-+-+-+-+-+-+-+-+-+-+-+-+-+-+-+-+-+-+-+-+-+-+-+-+-+-+
|                             IP-GW3                            |
+-+-+-+-+-+-+-+-+-+-+-+-+-+-+-+-+-+-+-+-+-+-+-+-+-+-+-+-+-+-+-+-+
|                             IP-TA4                            |
+-+-+-+-+-+-+-+-+-+-+-+-+-+-+-+-+-+-+-+-+-+-+-+-+-+-+-+-+-+-+-+-+
|                             IP-GW4                            |
+-+-+-+-+-+-+-+-+-+-+-+-+-+-+-+-+-+-+-+-+-+-+-+-+-+-+-+-+-+-+-+-+
```

*FIG. 58*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(143)   |  Length(28)   |     Flags     |    RESERVED   |
+-+-+-+-+-+-+-+-+-+-+-+-+-+-+-+-+-+-+-+-+-+-+-+-+-+-+-+-+-+-+-+-+
|                             IP-TA3                            |
+-+-+-+-+-+-+-+-+-+-+-+-+-+-+-+-+-+-+-+-+-+-+-+-+-+-+-+-+-+-+-+-+
|                             IP-GW3                            |
+-+-+-+-+-+-+-+-+-+-+-+-+-+-+-+-+-+-+-+-+-+-+-+-+-+-+-+-+-+-+-+-+
```

FIG. 60

IPv4 Header: Source Address (SA) = IP-1, Destination Address (DA) = IP-N1
IPv4 Option: EMR (below)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(143)   |   Length(28)  |     Flags     |    RESERVED   |
+-+-+-+-+-+-+-+-+-+-+-+-+-+-+-+-+-+-+-+-+-+-+-+-+-+-+-+-+-+-+-+-+
|                              IP-8                             |
+-+-+-+-+-+-+-+-+-+-+-+-+-+-+-+-+-+-+-+-+-+-+-+-+-+-+-+-+-+-+-+-+
|                              IP-10                            |
+-+-+-+-+-+-+-+-+-+-+-+-+-+-+-+-+-+-+-+-+-+-+-+-+-+-+-+-+-+-+-+-+
```

FIG. 61

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type(143)   |   Length(28)  |     Flags     |    RESERVED   |
+-+-+-+-+-+-+-+-+-+-+-+-+-+-+-+-+-+-+-+-+-+-+-+-+-+-+-+-+-+-+-+-+
|                              IP-9                             |
+-+-+-+-+-+-+-+-+-+-+-+-+-+-+-+-+-+-+-+-+-+-+-+-+-+-+-+-+-+-+-+-+
```

US 10,616,063 B1

STATELESS MULTICAST IN IP NETWORKS

TECHNICAL FIELD

Various example embodiments relate generally to communication networks and, more particularly but not exclusively, to stateless multicast in communication networks.

BACKGROUND

In many communication networks, various communications technologies may be used to support communications between various types of devices.

SUMMARY

Various example embodiments relate generally to supporting stateless multicast in an Internet Protocol (IP) network.

In at least some example embodiments, an apparatus includes at least one processor and at least one memory including computer program code, wherein the at least one memory and the computer program code are configured to, with the at least one processor, cause the apparatus to at least handle an IP packet for a multicast group including a set of egress routers, wherein the IP packet includes a payload and a header, wherein the header includes a set of addresses indicative of a group of egress routers including a subset of the egress routers of the multicast group. In at least some example embodiments, the set of addresses indicative of the group of egress routers includes respective IP addresses of the egress routers in the group of egress routers. In at least some example embodiments, the set of addresses indicative of the group of egress routers includes an indication of a tree from a gateway router to the egress routers in the group of egress routers. In at least some example embodiments, the indication of the tree from the gateway router to the egress routers in the group of egress routers includes an IP address of the gateway router. In at least some example embodiments, the indication of the tree from the gateway router to the egress routers in the group of egress routers includes a tree address of the tree from the gateway router to the egress routers in the group of egress routers. In at least some example embodiments, the tree address of the tree from the gateway router to the egress routers in the group of egress routers is configured to be mapped to respective IP addresses of the egress routers in the group of egress routers. In at least some example embodiments, the set of addresses indicative of the group of egress routers is included within an encoding of a shortcut. In at least some example embodiments, the shortcut includes an Interior Gateway Protocol (IGP) based shortcut. In at least some example embodiments, the shortcut includes a Multiprotocol Label Switching (MPLS) label switched path (LSP). In at least some example embodiments, the MPLS LSP includes an MPLS Resource Reservation Protocol-Traffic Engineered (RSVP-TE) LSP or a Segment Routing-Traffic Engineered (SR-TE) LSP. In at least some example embodiments, the shortcut includes a Segment Routing-Traffic Engineered (SR-TE) path using IP source routing. In at least some example embodiments, the shortcut includes a source routed Interior Gateway Protocol (IGP) shortcut. In at least some example embodiments, the source routed IGP shortcut is supported using an IP version 4 (IPv4) Shim Header or an IP version 6 (IPv6) Shim Header. In at least some example embodiments, the source routed IGP shortcut is supported over an IP Shim Header provided over an IP version 4 (IPv4) Source Route Option or provided over an IPv4 Source Route Shim Header. In at least some example embodiments, the source routed IGP shortcut is supported over an IP Shim Header provided over an IP version 6 (IPv6) Routing Header or provided over an IPv6 Routing Shim Header. In at least some example embodiments, the set of addresses indicative of the group of egress routers is included within an IP version 4 (IPv4) Options Header, an IPv4 Shim Header, an IP version 6 (IPv6) Extension Header, or an IPv6 Shim Header. In at least some example embodiments, to handle the IP packet, the at least one memory and the computer program code are configured to, with the at least one processor, cause the apparatus to at least determine, by a router, the egress routers of the multicast group, generate, by the router, the header based on the egress routers of the multicast group, and associate, by the router, the header with the payload to form the IP packet. In at least some example embodiments, to handle the IP packet, the at least one memory and the computer program code are configured to, with the at least one processor, cause the apparatus to at least receive, by a router, the IP packet, determine, by the router based on the set of addresses indicative of the group of egress routers, an address associated with one of the egress routers, perform, by the router based on a lookup into an IP route table using the address associated with the one of the egress routers, a next-hop router for the IP packet, and initiate, by the router, handling of the IP packet based on the next-hop router for the IP packet. In at least some example embodiments, to initiate handling of the IP packet based on the next-hop router for the IP packet, the at least one memory and the computer program code are configured to, with the at least one processor, cause the apparatus to at least provide, by the router, the IP packet to an upper layer of the router based on a determination that the next-hop router for the IP packet is the router. In at least some example embodiments, to initiate handling of the IP packet based on the next-hop router for the IP packet, the at least one memory and the computer program code are configured to, with the at least one processor, cause the apparatus to at least replicate, by the router based on a determination that the next-hop router for the IP packet is a remote router, the IP packet to form a replicated IP packet and send, by the router, the replicated IP packet toward the remote router. In at least some example embodiments, to handle the IP packet, the at least one memory and the computer program code are configured to, with the at least one processor, cause the apparatus to at least receive, by a gateway router associated with the group of egress routers, the IP packet, determine, by the gateway router based on the set of addresses indicative of the group of egress routers, an IP address of the gateway router and a tree address of the tree from the gateway router to the egress routers in the group of egress routers, perform, by the gateway router based on a determination that the IP address of the gateway router identifies the gateway router, a lookup into a tree address table based on the tree address to identify respective IP addresses of the egress routers in the group of egress routers, and initiate, by the gateway router, handling of the IP packet based on the respective IP addresses of the egress routers in the group of egress routers. In at least some example embodiments, to initiate handling of the IP packet based on the respective IP addresses of the egress routers in the group of egress routers, the at least one memory and the computer program code are configured to, with the at least one processor, cause the apparatus to at least replicate, by the gateway router based on the respective IP addresses of the egress routers in the group of egress routers, the IP packet to form a replicated IP packet, and send, by the gateway router, the replicated IP packet based on the tree from the gateway router to the egress routers in the group of egress routers. In at least some example embodiments, to handle the IP packet, the at least one memory and the computer program code are configured to, with the at least one processor, cause the apparatus to at least receive, at one of the egress routers in the group of egress routers, the IP packet, remove, by the one of the egress routers, an encoding of an IP address of the one of the egress routers from the header of the IP packet to provide a modified IP packet, and forward, by the one of the egress routers, the modified IP packet within a context of a multicast application of the multicast group.

In at least some example embodiments, a non-transitory computer readable medium includes program instructions for causing an apparatus to at least handle an IP packet for a multicast group including a set of egress routers, wherein the IP packet includes a payload and a header, wherein the header includes a set of addresses indicative of a group of egress routers including a subset of the egress routers of the multicast group. In at least some example embodiments, the set of addresses indicative of the group of egress routers includes respective IP addresses of the egress routers in the group of egress routers. In at least some example embodiments, the set of addresses indicative of the group of egress routers includes an indication of a tree from a gateway router to the egress routers in the group of egress routers. In at least some example embodiments, the indication of the tree from the gateway router to the egress routers in the group of egress routers includes an IP address of the gateway router. In at least some example embodiments, the indication of the tree from the gateway router to the egress routers in the group of egress routers includes a tree address of the tree from the gateway router to the egress routers in the group of egress routers. In at least some example embodiments, the tree address of the tree from the gateway router to the egress routers in the group of egress routers is configured to be mapped to respective IP addresses of the egress routers in the group of egress routers. In at least some example embodiments, the set of addresses indicative of the group of egress routers is included within an encoding of a shortcut. In at least some example embodiments, the shortcut includes an Interior Gateway Protocol (IGP) based shortcut. In at least some example embodiments, the shortcut includes a Multiprotocol Label Switching (MPLS) label switched path (LSP). In at least some example embodiments, the MPLS LSP includes an MPLS Resource Reservation Protocol-Traffic Engineered (RSVP-TE) LSP or a Segment Routing-Traffic Engineered (SR-TE) LSP. In at least some example embodiments, the shortcut includes a Segment Routing-Traffic Engineered (SR-TE) path using IP source routing. In at least some example embodiments, the shortcut includes a source routed Interior Gateway Protocol (IGP) shortcut. In at least some example embodiments, the source routed IGP shortcut is supported using an IP version 4 (IPv4) Shim Header or an IP version 6 (IPv6) Shim Header. In at least some example embodiments, the source routed IGP shortcut is supported over an IP Shim Header provided over an IP version 4 (IPv4) Source Route Option or provided over an IPv4 Source Route Shim Header. In at least some example embodiments, the source routed IGP shortcut is supported over an IP Shim Header provided over an IP version 6 (IPv6) Routing Header or provided over an IPv6 Routing Shim Header. In at least some example embodiments, the set of addresses indicative of the group of egress routers is included within an IP version 4 (IPv4) Options Header, an IPv4 Shim Header, an IP version 6 (IPv6) Extension Header, or an IPv6 Shim Header. In at least some example embodi-ments, to handle the IP packet, the non-transitory computer readable medium includes program instructions for causing the apparatus to at least determine, by a router, the egress routers of the multicast group, generate, by the router, the header based on the egress routers of the multicast group, and associate, by the router, the header with the payload to form the IP packet. In at least some example embodiments, to handle the IP packet, the non-transitory computer readable medium includes program instructions for causing the apparatus to at least receive, by a router, the IP packet, determine, by the router based on the set of addresses indicative of the group of egress routers, an address associated with one of the egress routers, perform, by the router based on a lookup into an IP route table using the address associated with the one of the egress routers, a next-hop router for the IP packet, and initiate, by the router, handling of the IP packet based on the next-hop router for the IP packet. In at least some example embodiments, to initiate handling of the IP packet based on the next-hop router for the IP packet, the non-transitory computer readable medium includes program instructions for causing the apparatus to at least provide, by the router, the IP packet to an upper layer of the router based on a determination that the next-hop router for the IP packet is the router. In at least some example embodiments, to initiate handling of the IP packet based on the next-hop router for the IP packet, the non-transitory computer readable medium includes program instructions for causing the apparatus to at least replicate, by the router based on a determination that the next-hop router for the IP packet is a remote router, the IP packet to form a replicated IP packet and send, by the router, the replicated IP packet toward the remote router. In at least some example embodiments, to handle the IP packet, the non-transitory computer readable medium includes program instructions for causing the apparatus to at least receive, by a gateway router associated with the group of egress routers, the IP packet, determine, by the gateway router based on the set of addresses indicative of the group of egress routers, an IP address of the gateway router and a tree address of the tree from the gateway router to the egress routers in the group of egress routers, perform, by the gateway router based on a determination that the IP address of the gateway router identifies the gateway router, a lookup into a tree address table based on the tree address to identify respective IP addresses of the egress routers in the group of egress routers, and initiate, by the gateway router, handling of the IP packet based on the respective IP addresses of the egress routers in the group of egress routers. In at least some example embodiments, to initiate handling of the IP packet based on the respective IP addresses of the egress routers in the group of egress routers, the non-transitory computer readable medium includes program instructions for causing the apparatus to at least replicate, by the gateway router based on the respective IP addresses of the egress routers in the group of egress routers, the IP packet to form a replicated IP packet, and send, by the gateway router, the replicated IP packet based on the tree from the gateway router to the egress routers in the group of egress routers. In at least some example embodiments, to handle the IP packet, the non-transitory computer readable medium includes program instructions for causing the apparatus to at least receive, at one of the egress routers in the group of egress routers, the IP packet, remove, by the one of the egress routers, an encoding of an IP address of the one of the egress routers from the header of the IP packet to provide a modified IP packet, and forward, by the one of the egress routers, the modified IP packet within a context of a multicast application of the multicast group.

In at least some example embodiments, a method includes handling an IP packet for a multicast group including a set of egress routers, wherein the IP packet includes a payload and a header, wherein the header includes a set of addresses indicative of a group of egress routers including a subset of the egress routers of the multicast group. In at least some example embodiments, the set of addresses indicative of the group of egress routers includes respective IP addresses of the egress routers in the group of egress routers. In at least some example embodiments, the set of addresses indicative of the group of egress routers includes an indication of a tree from a gateway router to the egress routers in the group of egress routers. In at least some example embodiments, the indication of the tree from the gateway router to the egress routers in the group of egress routers includes an IP address of the gateway router. In at least some example embodiments, the indication of the tree from the gateway router to the egress routers in the group of egress routers includes a tree address of the tree from the gateway router to the egress routers in the group of egress routers. In at least some example embodiments, the tree address of the tree from the gateway router to the egress routers in the group of egress routers is configured to be mapped to respective IP addresses of the egress routers in the group of egress routers. In at least some example embodiments, the set of addresses indicative of the group of egress routers is included within an encoding of a shortcut. In at least some example embodiments, the shortcut includes an Interior Gateway Protocol (IGP) based shortcut. In at least some example embodiments, the shortcut includes a Multiprotocol Label Switching (MPLS) label switched path (LSP). In at least some example embodiments, the MPLS LSP includes an MPLS Resource Reservation Protocol-Traffic Engineered (RSVP-TE) LSP or a Segment Routing-Traffic Engineered (SR-TE) LSP. In at least some example embodiments, the shortcut includes a Segment Routing-Traffic Engineered (SR-TE) path using IP source routing. In at least some example embodiments, the shortcut includes a source routed Interior Gateway Protocol (IGP) shortcut. In at least some example embodiments, the source routed IGP shortcut is supported using an IP version 4 (IPv4) Shim Header or an IP version 6 (IPv6) Shim Header. In at least some example embodiments, the source routed IGP shortcut is supported over an IP Shim Header provided over an IP version 4 (IPv4) Source Route Option or provided over an IPv4 Source Route Shim Header. In at least some example embodiments, the source routed IGP shortcut is supported over an IP Shim Header provided over an IP version 6 (IPv6) Routing Header or provided over an IPv6 Routing Shim Header. In at least some example embodiments, the set of addresses indicative of the group of egress routers is included within an IP version 4 (IPv4) Options Header, an IPv4 Shim Header, an IP version 6 (IPv6) Extension Header, or an IPv6 Shim Header. In at least some example embodiments, handling the IP packet includes determining, by a router, the egress routers of the multicast group, generating, by the router, the header based on the egress routers of the multicast group, and associating, by the router, the header with the payload to form the IP packet. In at least some example embodiments, handling the IP packet includes receiving, by a router, the IP packet, determining, by the router based on the set of addresses indicative of the group of egress routers, an address associated with one of the egress routers, performing, by the router based on a lookup into an IP route table using the address associated with the one of the egress routers, a next-hop router for the IP packet, and initiating, by the router, handling of the IP packet based on the next-hop router for the IP packet. In at least some example embodiments, initiating handling of the IP packet based on the next-hop router for the IP packet includes providing, by the router, the IP packet to an upper layer of the router based on a determination that the next-hop router for the IP packet is the router. In at least some example embodiments, initiating handling of the IP packet based on the next-hop router for the IP packet includes replicating, by the router based on a determination that the next-hop router for the IP packet is a remote router, the IP packet to form a replicated IP packet and sending, by the router, the replicated IP packet toward the remote router. In at least some example embodiments, handling the IP packet includes receiving, by a gateway router associated with the group of egress routers, the IP packet, determining, by the gateway router based on the set of addresses indicative of the group of egress routers, an IP address of the gateway router and a tree address of the tree from the gateway router to the egress routers in the group of egress routers, performing, by the gateway router based on a determination that the IP address of the gateway router identifies the gateway router, a lookup into a tree address table based on the tree address to identify respective IP addresses of the egress routers in the group of egress routers, and initiating, by the gateway router, handling of the IP packet based on the respective IP addresses of the egress routers in the group of egress routers. In at least some example embodiments, initiating handling of the IP packet based on the respective IP addresses of the egress routers in the group of egress routers includes replicating, by the gateway router based on the respective IP addresses of the egress routers in the group of egress routers, the IP packet to form a replicated IP packet, and sending, by the gateway router, the replicated IP packet based on the tree from the gateway router to the egress routers in the group of egress routers. In at least some example embodiments, handling the IP packet includes receiving, at one of the egress routers in the group of egress routers, the IP packet, removing, by the one of the egress routers, an encoding of an IP address of the one of the egress routers from the header of the IP packet to provide a modified IP packet, and forwarding, by the one of the egress routers, the modified IP packet within a context of a multicast application of the multicast group.

In at least some example embodiments, an apparatus includes means for handling an IP packet for a multicast group including a set of egress routers, wherein the IP packet includes a payload and a header, wherein the header includes a set of addresses indicative of a group of egress routers including a subset of the egress routers of the multicast group. In at least some example embodiments, the set of addresses indicative of the group of egress routers includes respective IP addresses of the egress routers in the group of egress routers. In at least some example embodiments, the set of addresses indicative of the group of egress routers includes an indication of a tree from a gateway router to the egress routers in the group of egress routers. In at least some example embodiments, the indication of the tree from the gateway router to the egress routers in the group of egress routers includes an IP address of the gateway router. In at least some example embodiments, the indication of the tree from the gateway router to the egress routers in the group of egress routers includes a tree address of the tree from the gateway router to the egress routers in the group of egress routers. In at least some example embodiments, the tree address of the tree from the gateway router to the egress routers in the group of egress routers is configured to be mapped to respective IP addresses of the egress routers in the group of egress routers. In at least some example embodiments, the set of addresses indicative of the group of egress routers is included within an encoding of a shortcut. In at least some example embodiments, the shortcut includes an Interior Gateway Protocol (IGP) based shortcut. In at least some example embodiments, the shortcut includes a Multiprotocol Label Switching (MPLS) label switched path (LSP). In at least some example embodiments, the MPLS LSP includes an MPLS Resource Reservation Protocol-Traffic Engineered (RSVP-TE) LSP or a Segment Routing-Traffic Engineered (SR-TE) LSP. In at least some example embodiments, the shortcut includes a Segment Routing-Traffic Engineered (SR-TE) path using IP source routing. In at least some example embodiments, the shortcut includes a source routed Interior Gateway Protocol (IGP) shortcut. In at least some example embodiments, the source routed IGP shortcut is supported using an IP version 4 (IPv4) Shim Header or an IP version 6 (IPv6) Shim Header. In at least some example embodiments, the source routed IGP shortcut is supported over an IP Shim Header provided over an IP version 4 (IPv4) Source Route Option or provided over an IPv4 Source Route Shim Header. In at least some example embodiments, the source routed IGP shortcut is supported over an IP Shim Header provided over an IP version 6 (IPv6) Routing Header or provided over an IPv6 Routing Shim Header. In at least some example embodiments, the set of addresses indicative of the group of egress routers is included within an IP version 4 (IPv4) Options Header, an IPv4 Shim Header, an IP version 6 (IPv6) Extension Header, or an IPv6 Shim Header. In at least some example embodiments, the means for handling the IP packet includes means for determining, by a router, the egress routers of the multicast group, means for generating, by the router, the header based on the egress routers of the multicast group, and means for associating, by the router, the header with the payload to form the IP packet. In at least some example embodiments, the means for handling the IP packet includes means for receiving, by a router, the IP packet, means for determining, by the router based on the set of addresses indicative of the group of egress routers, an address associated with one of the egress routers, means for performing, by the router based on a lookup into an IP route table using the address associated with the one of the egress routers, a next-hop router for the IP packet, and means for initiating, by the router, handling of the IP packet based on the next-hop router for the IP packet. In at least some example embodiments, the means for initiating handling of the IP packet based on the next-hop router for the IP packet includes means for providing, by the router, the IP packet to an upper layer of the router based on a determination that the next-hop router for the IP packet is the router. In at least some example embodiments, the means for initiating handling of the IP packet based on the next-hop router for the IP packet includes means for replicating, by the router based on a determination that the next-hop router for the IP packet is a remote router, the IP packet to form a replicated IP packet and means for sending, by the router, the replicated IP packet toward the remote router. In at least some example embodiments, the means for handling the IP packet includes means for receiving, by a gateway router associated with the group of egress routers, the IP packet, means for determining, by the gateway router based on the set of addresses indicative of the group of egress routers, an IP address of the gateway router and a tree address of the tree from the gateway router to the egress routers in the group of egress routers, means for performing, by the gateway router based on a determination that the IP address of the gateway router identifies the gateway router, a lookup into a tree address table based on the tree address to identify respective IP addresses of the egress routers in the group of egress routers, and means for initiating, by the gateway router, handling of the IP packet based on the respective IP addresses of the egress routers in the group of egress routers. In at least some example embodiments, the means for initiating handling of the IP packet based on the respective IP addresses of the egress routers in the group of egress routers includes means for replicating, by the gateway router based on the respective IP addresses of the egress routers in the group of egress routers, the IP packet to form a replicated IP packet, and means for sending, by the gateway router, the replicated IP packet based on the tree from the gateway router to the egress routers in the group of egress routers. In at least some example embodiments, the means for handling the IP packet includes means for receiving, at one of the egress routers in the group of egress routers, the IP packet, means for removing, by the one of the egress routers, an encoding of an IP address of the one of the egress routers from the header of the IP packet to provide a modified IP packet, and means for forwarding, by the one of the egress routers, the modified IP packet within a context of a multicast application of the multicast group.

In at least some example embodiments, an apparatus includes at least one processor and at least one memory including computer program code, wherein the at least one memory and the computer program code are configured to, with the at least one processor, cause the apparatus to at least handle, by an ingress router associated with a multicast group including a set of egress routers, an IP packet including a payload and a header, wherein the header includes a set of addresses indicative of a group of egress routers including only a subset of the egress routers of the multicast group. In at least some example embodiments, the set of addresses indicative of the group of egress routers includes respective IP addresses of the egress routers in the group of egress routers. In at least some example embodiments, the set of addresses indicative of the group of egress routers includes an indication of a tree from a gateway router to the egress routers in the group of egress routers. In at least some example embodiments, the indication of the tree from the gateway router to the egress routers in the group of egress routers includes an IP address of the gateway router. In at least some example embodiments, the indication of the tree from the gateway router to the egress routers in the group of egress routers includes a tree address of the tree from the gateway router to the egress routers in the group of egress routers. In at least some example embodiments, the tree address of the tree from the gateway router to the egress routers in the group of egress routers is configured to be mapped to respective IP addresses of the egress routers in the group of egress routers. In at least some example embodiments, the set of addresses indicative of the group of egress routers is included within an encoding of a shortcut. In at least some example embodiments, the shortcut includes an Interior Gateway Protocol (IGP) based shortcut. In at least some example embodiments, the shortcut includes a Multiprotocol Label Switching (MPLS) label switched path (LSP). In at least some example embodiments, the MPLS LSP includes an MPLS Resource Reservation Protocol-Traffic Engineered (RSVP-TE) LSP or a Segment Routing-Traffic Engineered (SR-TE) LSP. In at least some example embodiments, the shortcut includes a Segment Routing-Traffic Engineered (SR-TE) path using IP source routing. In at least some example embodiments, the shortcut includes a source routed Interior Gateway Protocol (IGP) shortcut. In at least some example embodiments, the source routed IGP shortcut is supported using an IP version 4 (IPv4) Shim Header or an IP version 6 (IPv6) Shim Header. In at least some example embodiments, the source routed IGP shortcut is supported over an IP Shim Header provided over an IP version 4 (IPv4) Source Route Option or provided over an IPv4 Source Route Shim Header. In at least some example embodiments, the source routed IGP shortcut is supported over an IP Shim Header provided over an IP version 6 (IPv6) Routing Header or provided over an IPv6 Routing Shim Header. In at least some example embodiments, the set of addresses indicative of the group of egress routers is included within an IP version 4 (IPv4) Options Header, an IPv4 Shim Header, an IP version 6 (IPv6) Extension Header, or an IPv6 Shim Header. In at least some example embodiments, to handle the IP packet, the at least one memory and the computer program code are configured to, with the at least one processor, cause the apparatus to at least determine, by a router, the egress routers of the multicast group, generate, by the router, the header based on the egress routers of the multicast group, and associate, by the router, the header with the payload to form the IP packet. In at least some example embodiments, to handle the IP packet, the at least one memory and the computer program code are configured to, with the at least one processor, cause the apparatus to at least receive, by a router, the IP packet, determine, by the router based on the set of addresses indicative of the group of egress routers, an address associated with one of the egress routers, perform, by the router based on a lookup into an IP route table using the address associated with the one of the egress routers, a next-hop router for the IP packet, and initiate, by the router, handling of the IP packet based on the next-hop router for the IP packet. In at least some example embodiments, to initiate handling of the IP packet based on the next-hop router for the IP packet, the at least one memory and the computer program code are configured to, with the at least one processor, cause the apparatus to at least provide, by the router, the IP packet to an upper layer of the router based on a determination that the next-hop router for the IP packet is the router. In at least some example embodiments, to initiate handling of the IP packet based on the next-hop router for the IP packet, the at least one memory and the computer program code are configured to, with the at least one processor, cause the apparatus to at least replicate, by the router based on a determination that the next-hop router for the IP packet is a remote router, the IP packet to form a replicated IP packet and send, by the router, the replicated IP packet toward the remote router. In at least some example embodiments, to handle the IP packet, the at least one memory and the computer program code are configured to, with the at least one processor, cause the apparatus to at least receive, by a gateway router associated with the group of egress routers, the IP packet, determine, by the gateway router based on the set of addresses indicative of the group of egress routers, an IP address of the gateway router and a tree address of a tree from the gateway router to the egress routers in the group of egress routers, perform, by the gateway router based on a determination that the IP address of the gateway router identifies the gateway router, a lookup into a tree address table based on the tree address to identify respective IP addresses of the egress routers in the group of egress routers, and initiate, by the gateway router, handling of the IP packet based on the respective IP addresses of the egress routers in the group of egress routers. In at least some example embodiments, to initiate handling of the IP packet based on the respective IP addresses of the egress routers in the group of egress routers, the at least one memory and the computer program code are configured to, with the at least one processor, cause the apparatus to at least replicate, by the gateway router based on the respective IP addresses of the egress routers in the group of egress routers, the IP packet to form a replicated IP packet and send, by the gateway router, the replicated IP packet based on the tree from the gateway router to the egress routers in the group of egress routers. In at least some example embodiments, to handle the IP packet, the at least one memory and the computer program code are configured to, with the at least one processor, cause the apparatus to at least receive, at one of the egress routers in the group of egress routers, the IP packet, remove, by the one of the egress routers, an encoding of an IP address of the one of the egress routers from the header of the IP packet to provide a modified IP packet, and forward, by the one of the egress routers, the modified IP packet within a context of a multicast application of the multicast group.

In at least some example embodiments, a non-transitory computer readable medium includes program instructions for causing an apparatus to at least handle, by an ingress router associated with a multicast group including a set of egress routers, an IP packet including a payload and a header, wherein the header includes a set of addresses indicative of a group of egress routers including only a subset of the egress routers of the multicast group. In at least some example embodiments, the set of addresses indicative of the group of egress routers includes respective IP addresses of the egress routers in the group of egress routers. In at least some example embodiments, the set of addresses indicative of the group of egress routers includes an indication of a tree from a gateway router to the egress routers in the group of egress routers. In at least some example embodiments, the indication of the tree from the gateway router to the egress routers in the group of egress routers includes an IP address of the gateway router. In at least some example embodiments, the indication of the tree from the gateway router to the egress routers in the group of egress routers includes a tree address of the tree from the gateway router to the egress routers in the group of egress routers. In at least some example embodiments, the tree address of the tree from the gateway router to the egress routers in the group of egress routers is configured to be mapped to respective IP addresses of the egress routers in the group of egress routers. In at least some example embodiments, the set of addresses indicative of the group of egress routers is included within an encoding of a shortcut. In at least some example embodiments, the shortcut includes an Interior Gateway Protocol (IGP) based shortcut. In at least some example embodiments, the shortcut includes a Multiprotocol Label Switching (MPLS) label switched path (LSP). In at least some example embodiments, the MPLS LSP includes an MPLS Resource Reservation Protocol-Traffic Engineered (RSVP-TE) LSP or a Segment Routing-Traffic Engineered (SR-TE) LSP. In at least some example embodiments, the shortcut includes a Segment Routing-Traffic Engineered (SR-TE) path using IP source routing. In at least some example embodiments, the shortcut includes a source routed Interior Gateway Protocol (IGP) shortcut. In at least some example embodiments, the source routed IGP shortcut is supported using an IP version 4 (IPv4) Shim Header or an IP version 6 (IPv6) Shim Header. In at least some example embodiments, the source routed IGP shortcut is supported over an IP Shim Header provided over an IP version 4 (IPv4) Source Route Option or provided over an IPv4 Source Route Shim Header. In at least some example embodiments, the source routed IGP shortcut is supported over an IP Shim Header provided over an IP version 6 (IPv6) Routing Header or provided over an IPv6 Routing Shim Header. In at least some example embodiments, the set of addresses indicative of the group of egress routers is included within an IP version 4 (IPv4) Options Header, an IPv4 Shim Header, an IP version 6 (IPv6) Extension Header, or an IPv6 Shim Header. In at least some example embodiments, to handle the IP packet, the non-transitory computer readable medium includes program instructions for causing the apparatus to at least determine, by a router, the egress routers of the multicast group, generate, by the router, the header based on the egress routers of the multicast group, and associate, by the router, the header with the payload to form the IP packet. In at least some example embodiments, to handle the IP packet, the non-transitory computer readable medium includes program instructions for causing the apparatus to at least receive, by a router, the IP packet, determine, by the router based on the set of addresses indicative of the group of egress routers, an address associated with one of the egress routers, perform, by the router based on a lookup into an IP route table using the address associated with the one of the egress routers, a next-hop router for the IP packet, and initiate, by the router, handling of the IP packet based on the next-hop router for the IP packet. In at least some example embodiments, to initiate handling of the IP packet based on the next-hop router for the IP packet, the non-transitory computer readable medium includes program instructions for causing the apparatus to at least provide, by the router, the IP packet to an upper layer of the router based on a determination that the next-hop router for the IP packet is the router. In at least some example embodiments, to initiate handling of the IP packet based on the next-hop router for the IP packet, the non-transitory computer readable medium includes program instructions for causing the apparatus to at least replicate, by the router based on a determination that the next-hop router for the IP packet is a remote router, the IP packet to form a replicated IP packet and send, by the router, the replicated IP packet toward the remote router. In at least some example embodiments, to handle the IP packet, the non-transitory computer readable medium includes program instructions for causing the apparatus to at least receive, by a gateway router associated with the group of egress routers, the IP packet, determine, by the gateway router based on the set of addresses indicative of the group of egress routers, an IP address of the gateway router and a tree address of a tree from the gateway router to the egress routers in the group of egress routers, perform, by the gateway router based on a determination that the IP address of the gateway router identifies the gateway router, a lookup into a tree address table based on the tree address to identify respective IP addresses of the egress routers in the group of egress routers, and initiate, by the gateway router, handling of the IP packet based on the respective IP addresses of the egress routers in the group of egress routers. In at least some example embodiments, to initiate handling of the IP packet based on the respective IP addresses of the egress routers in the group of egress routers, the non-transitory computer readable medium includes program instructions for causing the apparatus to at least replicate, by the gateway router based on the respective IP addresses of the egress routers in the group of egress routers, the IP packet to form a replicated IP packet and send, by the gateway router, the replicated IP packet based on the tree from the gateway router to the egress routers in the group of egress routers. In at least some example embodiments, to handle the IP packet, the non-transitory computer readable medium includes program instructions for causing the apparatus to at least receive, at one of the egress routers in the group of egress routers, the IP packet, remove, by the one of the egress routers, an encoding of an IP address of the one of the egress routers from the header of the IP packet to provide a modified IP packet, and forward, by the one of the egress routers, the modified IP packet within a context of a multicast application of the multicast group.

In at least some example embodiments, a method includes handling, by an ingress router associated with a multicast group including a set of egress routers, an IP packet including a payload and a header, wherein the header includes a set of addresses indicative of a group of egress routers including only a subset of the egress routers of the multicast group. In at least some example embodiments, the set of addresses indicative of the group of egress routers includes respective IP addresses of the egress routers in the group of egress routers. In at least some example embodiments, the set of addresses indicative of the group of egress routers includes an indication of a tree from a gateway router to the egress routers in the group of egress routers. In at least some example embodiments, the indication of the tree from the gateway router to the egress routers in the group of egress routers includes an IP address of the gateway router. In at least some example embodiments, the indication of the tree from the gateway router to the egress routers in the group of egress routers includes a tree address of the tree from the gateway router to the egress routers in the group of egress routers. In at least some example embodiments, the tree address of the tree from the gateway router to the egress routers in the group of egress routers is configured to be mapped to respective IP addresses of the egress routers in the group of egress routers. In at least some example embodiments, the set of addresses indicative of the group of egress routers is included within an encoding of a shortcut. In at least some example embodiments, the shortcut includes an Interior Gateway Protocol (IGP) based shortcut. In at least some example embodiments, the shortcut includes a Multiprotocol Label Switching (MPLS) label switched path (LSP). In at least some example embodiments, the MPLS LSP includes an MPLS Resource Reservation Protocol-Traffic Engineered (RSVP-TE) LSP or a Segment Routing-Traffic Engineered (SR-TE) LSP. In at least some example embodiments, the shortcut includes a Segment Routing-Traffic Engineered (SR-TE) path using IP source routing. In at least some example embodiments, the shortcut includes a source routed Interior Gateway Protocol (IGP) shortcut. In at least some example embodiments, the source routed IGP shortcut is supported using an IP version 4 (IPv4) Shim Header or an IP version 6 (IPv6) Shim Header. In at least some example embodiments, the source routed IGP shortcut is supported over an IP Shim Header provided over an IP version 4 (IPv4) Source Route Option or provided over an IPv4 Source Route Shim Header. In at least some example embodiments, the source routed IGP shortcut is supported over an IP Shim Header provided over an IP version 6 (IPv6) Routing Header or provided over an IPv6 Routing Shim Header. In at least some example embodiments, the set of addresses indicative of the group of egress routers is included within an IP version 4 (IPv4) Options Header, an IPv4 Shim Header, an IP version 6 (IPv6) Extension Header, or an IPv6 Shim Header. In at least some example embodiments, handling the IP packet includes determining, by a router, the egress routers of the multicast group, generating, by the router, the header based on the egress routers of the multicast group, and associating, by the router, the header with the payload to form the IP packet. In at least some example embodiments, handling the IP packet includes receiving, by a router, the IP packet, determining, by the router based on the set of addresses indicative of the group of egress routers, an address associated with one of the egress routers, performing, by the router based on a lookup into an IP route table using the address associated with the one of the egress routers, a next-hop router for the IP packet, and initiating, by the router, handling of the IP packet based on the next-hop router for the IP packet. In at least some example embodiments, initiating handling of the IP packet based on the next-hop router for the IP packet includes providing, by the router, the IP packet to an upper layer of the router based on a determination that the next-hop router for the IP packet is the router. In at least some example embodiments, initiating handling of the IP packet based on the next-hop router for the IP packet includes replicating, by the router based on a determination that the next-hop router for the IP packet is a remote router, the IP packet to form a replicated IP packet and sending, by the router, the replicated IP packet toward the remote router. In at least some example embodiments, handling the IP packet includes receiving, by a gateway router associated with the group of egress routers, the IP packet, determining, by the gateway router based on the set of addresses indicative of the group of egress routers, an IP address of the gateway router and a tree address of a tree from the gateway router to the egress routers in the group of egress routers, performing, by the gateway router based on a determination that the IP address of the gateway router identifies the gateway router, a lookup into a tree address table based on the tree address to identify respective IP addresses of the egress routers in the group of egress routers, and initiating, by the gateway router, handling of the IP packet based on the respective IP addresses of the egress routers in the group of egress routers. In at least some example embodiments, initiating handling of the IP packet based on the respective IP addresses of the egress routers in the group of egress routers includes replicating, by the gateway router based on the respective IP addresses of the egress routers in the group of egress routers, the IP packet to form a replicated IP packet and sending, by the gateway router, the replicated IP packet based on the tree from the gateway router to the egress routers in the group of egress routers. In at least some example embodiments, handling the IP packet includes receiving, at one of the egress routers in the group of egress routers, the IP packet, removing, by the one of the egress routers, an encoding of an IP address of the one of the egress routers from the header of the IP packet to provide a modified IP packet, and forwarding, by the one of the egress routers, the modified IP packet within a context of a multicast application of the multicast group.

In at least some example embodiments, an apparatus includes means for handling, by an ingress router associated with a multicast group including a set of egress routers, an IP packet including a payload and a header, wherein the header includes a set of addresses indicative of a group of egress routers including only a subset of the egress routers of the multicast group. In at least some example embodiments, the set of addresses indicative of the group of egress routers includes respective IP addresses of the egress routers in the group of egress routers. In at least some example embodiments, the set of addresses indicative of the group of egress routers includes an indication of a tree from a gateway router to the egress routers in the group of egress routers. In at least some example embodiments, the indication of the tree from the gateway router to the egress routers in the group of egress routers includes an IP address of the gateway router. In at least some example embodiments, the indication of the tree from the gateway router to the egress routers in the group of egress routers includes a tree address of the tree from the gateway router to the egress routers in the group of egress routers. In at least some example embodiments, the tree address of the tree from the gateway router to the egress routers in the group of egress routers is configured to be mapped to respective IP addresses of the egress routers in the group of egress routers. In at least some example embodiments, the set of addresses indicative of the group of egress routers is included within an encoding of a shortcut. In at least some example embodiments, the shortcut includes an Interior Gateway Protocol (IGP) based shortcut. In at least some example embodiments, the shortcut includes a Multiprotocol Label Switching (MPLS) label switched path (LSP). In at least some example embodiments, the MPLS LSP includes an MPLS Resource Reservation Protocol-Traffic Engineered (RSVP-TE) LSP or a Segment Routing-Traffic Engineered (SR-TE) LSP. In at least some example embodiments, the shortcut includes a Segment Routing-Traffic Engineered (SR-TE) path using IP source routing. In at least some example embodiments, the shortcut includes a source routed Interior Gateway Protocol (IGP) shortcut. In at least some example embodiments, the source routed IGP shortcut is supported using an IP version 4 (IPv4) Shim Header or an IP version 6 (IPv6) Shim Header. In at least some example embodiments, the source routed IGP shortcut is supported over an IP Shim Header provided over an IP version 4 (IPv4) Source Route Option or provided over an IPv4 Source Route Shim Header. In at least some example embodiments, the source routed IGP shortcut is supported over an IP Shim Header provided over an IP version 6 (IPv6) Routing Header or provided over an IPv6 Routing Shim Header. In at least some example embodiments, the set of addresses indicative of the group of egress routers is included within an IP version 4 (IPv4) Options Header, an IPv4 Shim Header, an IP version 6 (IPv6) Extension Header, or an IPv6 Shim Header. In at least some example embodiments, the means for handling the IP packet includes means for determining, by a router, the egress routers of the multicast group, means for generating, by the router, the header based on the egress routers of the multicast group, and means for associating, by the router, the header with the payload to form the IP packet. In at least some example embodiments, the means for handling the IP packet includes means for receiving, by a router, the IP packet, means for determining, by the router based on the set of addresses indicative of the group of egress routers, an address associated with one of the egress routers, means for performing, by the router based on a lookup into an IP route table using the address associated with the one of the egress routers, a next-hop router for the IP packet, and means for initiating, by the router, handling of the IP packet based on the next-hop router for the IP packet. In at least some example embodiments, the means for initiating handling of the IP packet based on the next-hop router for the IP packet includes means for providing, by the router, the IP packet to an upper layer of the router based on a determination that the next-hop router for the IP packet is the router. In at least some example embodiments, the means for initiating handling of the IP packet based on the next-hop router for the IP packet includes means for replicating, by the router based on a determination that the next-hop router for the IP packet is a remote router, the IP packet to form a replicated IP packet and means for sending, by the router, the replicated IP packet toward the remote router. In at least some example embodiments, the means for handling the IP packet includes means for receiving, by a gateway router associated with the group of egress routers, the IP packet, means for determining, by the gateway router based on the set of addresses indicative of the group of egress routers, an IP address of the gateway router and a tree address of a tree from the gateway router to the egress routers in the group of egress routers, means for performing, by the gateway router based on a determination that the IP address of the gateway router identifies the gateway router, a lookup into a tree address table based on the tree address to identify respective IP addresses of the egress routers in the group of egress routers, and means for initiating, by the gateway router, handling of the IP packet based on the respective IP addresses of the egress routers in the group of egress routers. In at least some example embodiments, the means for initiating handling of the IP packet based on the respective IP addresses of the egress routers in the group of egress routers includes means for replicating, by the gateway router based on the respective IP addresses of the egress routers in the group of egress routers, the IP packet to form a replicated IP packet and means for sending, by the gateway router, the replicated IP packet based on the tree from the gateway router to the egress routers in the group of egress routers. In at least some example embodiments, the means for handling the IP packet includes means for receiving, at one of the egress routers in the group of egress routers, the IP packet, means for removing, by the one of the egress routers, an encoding of an IP address of the one of the egress routers from the header of the IP packet to provide a modified IP packet, and means for forwarding, by the one of the egress routers, the modified IP packet within a context of a multicast application of the multicast group.

In at least some example embodiments, an apparatus includes at least one processor and at least one memory including computer program code, wherein the at least one memory and the computer program code are configured to, with the at least one processor, cause the apparatus to at least handle an Internet Protocol (IP) packet for a multicast group including a set of egress routers, wherein the IP packet includes a payload and a header, wherein the header includes a set of addresses indicative of a group of egress routers including a subset of the egress routers of the multicast group, wherein the set of addresses indicative of the group of egress routers includes a router address of a router and a tree address of a tree from the router to the egress routers in the group of egress routers. In at least some example embodiments, the router includes a transit router between an ingress router of a multicast flow for the multicast group and the egress routers in the group of egress routers. In at least some example embodiments, the router includes a gateway router configured to operate as a root of the tree from the gateway router to the egress routers in the group of egress routers. In at least some example embodiments, the router address of the router comprises an IP address of the router. In at least some example embodiments, the tree address is configured to be mapped, by the router, to respective addresses of the egress routers in the group of egress routers. In at least some example embodiments, the set of addresses indicative of the group of egress routers is included within an encoding of a shortcut. In at least some example embodiments, the shortcut includes an Interior Gateway Protocol (IGP) based shortcut. In at least some example embodiments, the shortcut includes a Multiprotocol Label Switching (MPLS) label switched path (LSP). In at least some example embodiments, the MPLS LSP includes an MPLS Resource Reservation Protocol-Traffic Engineered (RSVP-TE) LSP or a Segment Routing-Traffic Engineered (SR-TE) LSP. In at least some example embodiments, the shortcut includes a Segment Routing-Traffic Engineered (SR-TE) path using IP source routing. In at least some example embodiments, the shortcut includes a source routed Interior Gateway Protocol (IGP) shortcut. In at least some example embodiments, the source routed IGP shortcut is supported using an IP version 4 (IPv4) Shim Header or an IP version 6 (IPv6) Shim Header. In at least some example embodiments, the source routed IGP shortcut is supported over an IP Shim Header provided over an IP version 4 (IPv4) Source Route Option or provided over an IPv4 Source Route Shim Header. In at least some example embodiments, the source routed IGP shortcut is supported over an IP Shim Header provided over an IP version 6 (IPv6) Routing Header or provided over an IPv6 Routing Shim Header. In at least some example embodiments, the set of addresses indicative of the group of egress routers is included within an IP version 4 (IPv4) Options Header, an IPv4 Shim Header, an IP version 6 (IPv6) Extension Header, or an IPv6 Shim Header. In at least some example embodiments, the header includes a second set of addresses indicative of a second group of egress routers including a second subset of the egress routers of the multicast group. In at least some example embodiments, the second set of addresses indicative of the second group of egress routers includes respective IP addresses of the egress routers in the second group of egress routers. In at least some example embodiments, the second set of addresses indicative of the second group of egress routers includes a second router address of a second router and a second tree address of a second tree from the second router to the egress routers in the second group of egress routers. In at least some example embodiments, to handle the IP packet, the at least one memory and the computer program code are configured to, with the at least one processor, cause the apparatus to at least determine, by a handling router, the egress routers of the multicast group, generate, by the handling router, the header based on the egress routers of the multicast group, and associate, by the handling router, the header with the payload to form the IP packet. In at least some example embodiments, to handle the IP packet, the at least one memory and the computer program code are configured to, with the at least one processor, cause the apparatus to at least receive, by a handling router, the IP packet, determine, by the handling router based on the set of addresses indicative of the group of egress routers, an address associated with one of the egress routers, perform, by the handling router based on a lookup into an IP route table using the address associated with the one of the egress routers, a next-hop router for the IP packet, and initiate, by the handling router, handling of the IP packet based on the next-hop router for the IP packet. In at least some example embodiments, to initiate handling of the IP packet based on the next-hop router for the IP packet, the at least one memory and the computer program code are configured to, with the at least one processor, cause the apparatus to at least provide, by the handling router, the IP packet to an upper layer of the handling router based on a determination that the next-hop router for the IP packet is the handling router. In at least some example embodiments, to initiate handling of the IP packet based on the next-hop router for the IP packet, the at least one memory and the computer program code are configured to, with the at least one processor, cause the apparatus to at least replicate, by the handling router based on a determination that the next-hop router for the IP packet is a remote router, the IP packet to form a replicated IP packet and send, by the handling router, the replicated IP packet toward the remote router. In at least some example embodiments, to handle the IP packet, the at least one memory and the computer program code are configured to, with the at least one processor, cause the apparatus to at least receive, by the router, the IP packet, determine, by the router based on the set of addresses indicative of the group of egress routers, the router address of the router, perform, by the router based on a determination that the router address of the router identified the router, a lookup into a tree address table based on the tree address to identify respective IP addresses of the egress routers in the group of egress routers, and initiate, by the router, handling of the IP packet based on the respective IP addresses of the egress routers in the group of egress routers. In at least some example embodiments, to initiate handling of the IP packet based on the respective IP addresses of the egress routers in the group of egress routers, the at least one memory and the computer program code are configured to, with the at least one processor, cause the apparatus to at least replicate, by the router based on the respective IP addresses of the egress routers in the group of egress routers, the IP packet to form a replicated IP packet and send, by the router, the replicated IP packet based on the tree from the router to the egress routers in the group of egress routers. In at least some example embodiments, to handle the IP packet, the at least one memory and the computer program code are configured to, with the at least one processor, cause the apparatus to at least receive, at one of the egress routers in the group of egress routers, the IP packet, remove, by the one of the egress routers, an encoding of an IP address of the one of the egress routers from the header of the IP packet to provide a modified IP packet, and forward, by the one of the egress routers, the modified IP packet within a context of a multicast application of the multicast group.

In at least some example embodiments, a non-transitory computer readable medium includes program instructions for causing an apparatus to at least handle an Internet Protocol (IP) packet for a multicast group including a set of egress routers, wherein the IP packet includes a payload and a header, wherein the header includes a set of addresses indicative of a group of egress routers including a subset of the egress routers of the multicast group, wherein the set of addresses indicative of the group of egress routers includes a router address of a router and a tree address of a tree from the router to the egress routers in the group of egress routers. In at least some example embodiments, the router includes a transit router between an ingress router of a multicast flow for the multicast group and the egress routers in the group of egress routers. In at least some example embodiments, the router includes a gateway router configured to operate as a root of the tree from the gateway router to the egress routers in the group of egress routers. In at least some example embodiments, the router address of the router comprises an IP address of the router. In at least some example embodiments, the tree address is configured to be mapped, by the router, to respective addresses of the egress routers in the group of egress routers. In at least some example embodiments, the set of addresses indicative of the group of egress routers is included within an encoding of a shortcut. In at least some example embodiments, the shortcut includes an Interior Gateway Protocol (IGP) based shortcut. In at least some example embodiments, the shortcut includes a Multiprotocol Label Switching (MPLS) label switched path (LSP). In at least some example embodiments, the MPLS LSP includes an MPLS Resource Reservation Protocol-Traffic Engineered (RSVP-TE) LSP or a Segment Routing-Traffic Engineered (SR-TE) LSP. In at least some example embodiments, the shortcut includes a Segment Routing-Traffic Engineered (SR-TE) path using IP source routing. In at least some example embodiments, the shortcut includes a source routed Interior Gateway Protocol (IGP) shortcut. In at least some example embodiments, the source routed IGP shortcut is supported using an IP version 4 (IPv4) Shim Header or an IP version 6 (IPv6) Shim Header. In at least some example embodiments, the source routed IGP shortcut is supported over an IP Shim Header provided over an IP version 4 (IPv4) Source Route Option or provided over an IPv4 Source Route Shim Header. In at least some example embodiments, the source routed IGP shortcut is supported over an IP Shim Header provided over an IP version 6 (IPv6) Routing Header or provided over an IPv6 Routing Shim Header. In at least some example embodiments, the set of addresses indicative of the group of egress routers is included within an IP version 4 (IPv4) Options Header, an IPv4 Shim Header, an IP version 6 (IPv6) Extension Header, or an IPv6 Shim Header. In at least some example embodiments, the header includes a second set of addresses indicative of a second group of egress routers including a second subset of the egress routers of the multicast group. In at least some example embodiments, the second set of addresses indicative of the second group of egress routers includes respective IP addresses of the egress routers in the second group of egress routers. In at least some example embodiments, the second set of addresses indicative of the second group of egress routers includes a second router address of a second router and a second tree address of a second tree from the second router to the egress routers in the second group of egress routers. In at least some example embodiments, to handle the IP packet, the non-transitory computer readable medium includes program instructions for causing the apparatus to at least determine, by a handling router, the egress routers of the multicast group, generate, by the handling router, the header based on the egress routers of the multicast group, and associate, by the handling router, the header with the payload to form the IP packet. In at least some example embodiments, to handle the IP packet, the non-transitory computer readable medium includes program instructions for causing the apparatus to at least receive, by a handling router, the IP packet, determine, by the handling router based on the set of addresses indicative of the group of egress routers, an address associated with one of the egress routers, perform, by the handling router based on a lookup into an IP route table using the address associated with the one of the egress routers, a next-hop router for the IP packet, and initiate, by the handling router, handling of the IP packet based on the next-hop router for the IP packet. In at least some example embodiments, to initiate handling of the IP packet based on the next-hop router for the IP packet, the non-transitory computer readable medium includes program instructions for causing the apparatus to at least provide, by the handling router, the IP packet to an upper layer of the handling router based on a determination that the next-hop router for the IP packet is the handling router. In at least some example embodiments, to initiate handling of the IP packet based on the next-hop router for the IP packet, the non-transitory computer readable medium includes program instructions for causing the apparatus to at least replicate, by the handling router based on a determination that the next-hop router for the IP packet is a remote router, the IP packet to form a replicated IP packet and send, by the handling router, the replicated IP packet toward the remote router. In at least some example embodiments, to handle the IP packet, the non-transitory computer readable medium includes program instructions for causing the apparatus to at least receive, by the router, the IP packet, determine, by the router based on the set of addresses indicative of the group of egress routers, the router address of the router, perform, by the router based on a determination that the router address of the router identified the router, a lookup into a tree address table based on the tree address to identify respective IP addresses of the egress routers in the group of egress routers, and initiate, by the router, handling of the IP packet based on the respective IP addresses of the egress routers in the group of egress routers. In at least some example embodiments, to initiate handling of the IP packet based on the respective IP addresses of the egress routers in the group of egress routers, the non-transitory computer readable medium includes program instructions for causing the apparatus to at least replicate, by the router based on the respective IP addresses of the egress routers in the group of egress routers, the IP packet to form a replicated IP packet and send, by the router, the replicated IP packet based on the tree from the router to the egress routers in the group of egress routers. In at least some example embodiments, to handle the IP packet, the non-transitory computer readable medium includes program instructions for causing the apparatus to at least receive, at one of the egress routers in the group of egress routers, the IP packet, remove, by the one of the egress routers, an encoding of an IP address of the one of the egress routers from the header of the IP packet to provide a modified IP packet, and forward, by the one of the egress routers, the modified IP packet within a context of a multicast application of the multicast group.

In at least some example embodiments, a method includes handling an Internet Protocol (IP) packet for a multicast group including a set of egress routers, wherein the IP packet includes a payload and a header, wherein the header includes a set of addresses indicative of a group of egress routers including a subset of the egress routers of the multicast group, wherein the set of addresses indicative of the group of egress routers includes a router address of a router and a tree address of a tree from the router to the egress routers in the group of egress routers. In at least some example embodiments, the router includes a transit router between an ingress router of a multicast flow for the multicast group and the egress routers in the group of egress routers. In at least some example embodiments, the router includes a gateway router configured to operate as a root of the tree from the gateway router to the egress routers in the group of egress routers. In at least some example embodiments, the router address of the router comprises an IP address of the router. In at least some example embodiments, the tree address is configured to be mapped, by the router, to respective addresses of the egress routers in the group of egress routers. In at least some example embodiments, the set of addresses indicative of the group of egress routers is included within an encoding of a shortcut. In at least some example embodiments, the shortcut includes an Interior Gateway Protocol (IGP) based shortcut. In at least some example embodiments, the shortcut includes a Multiprotocol Label Switching (MPLS) label switched path (LSP). In at least some example embodiments, the MPLS LSP includes an MPLS Resource Reservation Protocol-Traffic Engineered (RSVP-TE) LSP or a Segment Routing-Traffic Engineered (SR-TE) LSP. In at least some example embodiments, the shortcut includes a Segment Routing-Traffic Engineered (SR-TE) path using IP source routing. In at least some example embodiments, the shortcut includes a source routed Interior Gateway Protocol (IGP) shortcut. In at least some example embodiments, the source routed IGP shortcut is supported using an IP version 4 (IPv4) Shim Header or an IP version 6 (IPv6) Shim Header. In at least some example embodiments, the source routed IGP shortcut is supported over an IP Shim Header provided over an IP version 4 (IPv4) Source Route Option or provided over an IPv4 Source Route Shim Header. In at least some example embodiments, the source routed IGP shortcut is supported over an IP Shim Header provided over an IP version 6 (IPv6) Routing Header or provided over an IPv6 Routing Shim Header. In at least some example embodiments, the set of addresses indicative of the group of egress routers is included within an IP version 4 (IPv4) Options Header, an IPv4 Shim Header, an IP version 6 (IPv6) Extension Header, or an IPv6 Shim Header. In at least some example embodiments, the header includes a second set of addresses indicative of a second group of egress routers including a second subset of the egress routers of the multicast group. In at least some example embodiments, the second set of addresses indicative of the second group of egress routers includes respective IP addresses of the egress routers in the second group of egress routers. In at least some example embodiments, the second set of addresses indicative of the second group of egress routers includes a second router address of a second router and a second tree address of a second tree from the second router to the egress routers in the second group of egress routers. In at least some example embodiments, handling the IP packet includes determining, by a handling router, the egress routers of the multicast group, generating, by the handling router, the header based on the egress routers of the multicast group, and associating, by the handling router, the header with the payload to form the IP packet. In at least some example embodiments, handling the IP packet includes receiving, by a handling router, the IP packet, determining, by the handling router based on the set of addresses indicative of the group of egress routers, an address associated with one of the egress routers, performing, by the handling router based on a lookup into an IP route table using the address associated with the one of the egress routers, a next-hop router for the IP packet, and initiating, by the handling router, handling of the IP packet based on the next-hop router for the IP packet. In at least some example embodiments, initiating handling of the IP packet based on the next-hop router for the IP packet includes providing, by the handling router, the IP packet to an upper layer of the handling router based on a determination that the next-hop router for the IP packet is the handling router. In at least some example embodiments, initiating handling of the IP packet based on the next-hop router for the IP packet includes replicating, by the handling router based on a determination that the next-hop router for the IP packet is a remote router, the IP packet to form a replicated IP packet and sending, by the handling router, the replicated IP packet toward the remote router. In at least some example embodiments, handling the IP packet includes receiving, by the router, the IP packet, determining, by the router based on the set of addresses indicative of the group of egress routers, the router address of the router, performing, by the router based on a determination that the router address of the router identified the router, a lookup into a tree address table based on the tree address to identify respective IP addresses of the egress routers in the group of egress routers, and initiating, by the router, handling of the IP packet based on the respective IP addresses of the egress routers in the group of egress routers. In at least some example embodiments, initiating handling of the IP packet based on the respective IP addresses of the egress routers in the group of egress routers includes replicating, by the router based on the respective IP addresses of the egress routers in the group of egress routers, the IP packet to form a replicated IP packet and sending, by the router, the replicated IP packet based on the tree from the router to the egress routers in the group of egress routers. In at least some example embodiments, handling the IP packet includes receiving, at one of the egress routers in the group of egress routers, the IP packet, removing, by the one of the egress routers, an encoding of an IP address of the one of the egress routers from the header of the IP packet to provide a modified IP packet, and forwarding, by the one of the egress routers, the modified IP packet within a context of a multicast application of the multicast group.

In at least some example embodiments, an apparatus includes means for handling an Internet Protocol (IP) packet for a multicast group including a set of egress routers, wherein the IP packet includes a payload and a header, wherein the header includes a set of addresses indicative of a group of egress routers including a subset of the egress routers of the multicast group, wherein the set of addresses indicative of the group of egress routers includes a router address of a router and a tree address of a tree from the router to the egress routers in the group of egress routers. In at least some example embodiments, the router includes a transit router between an ingress router of a multicast flow for the multicast group and the egress routers in the group of egress routers. In at least some example embodiments, the router includes a gateway router configured to operate as a root of the tree from the gateway router to the egress routers in the group of egress routers. In at least some example embodiments, the router address of the router comprises an IP address of the router. In at least some example embodiments, the tree address is configured to be mapped, by the router, to respective addresses of the egress routers in the group of egress routers. In at least some example embodiments, the set of addresses indicative of the group of egress routers is included within an encoding of a shortcut. In at least some example embodiments, the shortcut includes an Interior Gateway Protocol (IGP) based shortcut. In at least some example embodiments, the shortcut includes a Multiprotocol Label Switching (MPLS) label switched path (LSP). In at least some example embodiments, the MPLS LSP includes an MPLS Resource Reservation Protocol-Traffic Engineered (RSVP-TE) LSP or a Segment Routing-Traffic Engineered (SR-TE) LSP. In at least some example embodiments, the shortcut includes a Segment Routing-Traffic Engineered (SR-TE) path using IP source routing. In at least some example embodiments, the shortcut includes a source routed Interior Gateway Protocol (IGP) shortcut. In at least some example embodiments, the source routed IGP shortcut is supported using an IP version 4 (IPv4) Shim Header or an IP version 6 (IPv6) Shim Header. In at least some example embodiments, the source routed IGP shortcut is supported over an IP Shim Header provided over an IP version 4 (IPv4) Source Route Option or provided over an IPv4 Source Route Shim Header. In at least some example embodiments, the source routed IGP shortcut is supported over an IP Shim Header provided over an IP version 6 (IPv6) Routing Header or provided over an IPv6 Routing Shim Header. In at least some example embodiments, the set of addresses indicative of the group of egress routers is included within an IP version 4 (IPv4) Options Header, an IPv4 Shim Header, an IP version 6 (IPv6) Extension Header, or an IPv6 Shim Header. In at least some example embodiments, the header includes a second set of addresses indicative of a second group of egress routers including a second subset of the egress routers of the multicast group. In at least some example embodiments, the second set of addresses indicative of the second group of egress routers includes respective IP addresses of the egress routers in the second group of egress routers. In at least some example embodiments, the second set of addresses indicative of the second group of egress routers includes a second router address of a second router and a second tree address of a second tree from the second router to the egress routers in the second group of egress routers. In at least some example embodiments, the means for handling the IP packet includes means for determining, by a handling router, the egress routers of the multicast group, means for generating, by the handling router, the header based on the egress routers of the multicast group, and means for associating, by the handling router, the header with the payload to form the IP packet. In at least some example embodiments, the means for handling the IP packet includes means for receiving, by a handling router, the IP packet, means for determining, by the handling router based on the set of addresses indicative of the group of egress routers, an address associated with one of the egress routers, means for performing, by the handling router based on a lookup into an IP route table using the address associated with the one of the egress routers, a next-hop router for the IP packet, and means for initiating, by the handling router, handling of the IP packet based on the next-hop router for the IP packet. In at least some example embodiments, the means for initiating handling of the IP packet based on the next-hop router for the IP packet includes means for providing, by the handling router, the IP packet to an upper layer of the handling router based on a determination that the next-hop router for the IP packet is the handling router. In at least some example embodiments, the means for initiating handling of the IP packet based on the next-hop router for the IP packet includes means for replicating, by the handling router based on a determination that the next-hop router for the IP packet is a remote router, the IP packet to form a replicated IP packet and means for sending, by the handling router, the replicated IP packet toward the remote router. In at least some example embodiments, the means for handling the IP packet includes means for receiving, by the router, the IP packet, means for determining, by the router based on the set of addresses indicative of the group of egress routers, the router address of the router, means for performing, by the router based on a determination that the router address of the router identified the router, a lookup into a tree address table based on the tree address to identify respective IP addresses of the egress routers in the group of egress routers, and means for initiating, by the router, handling of the IP packet based on the respective IP addresses of the egress routers in the group of egress routers. In at least some example embodiments, the means for initiating handling of the IP packet based on the respective IP addresses of the egress routers in the group of egress routers includes means for replicating, by the router based on the respective IP addresses of the egress routers in the group of egress routers, the IP packet to form a replicated IP packet and means for sending, by the router, the replicated IP packet based on the tree from the router to the egress routers in the group of egress routers. In at least some example embodiments, the means for handling the IP packet includes means for receiving, at one of the egress routers in the group of egress routers, the IP packet, means for removing, by the one of the egress routers, an encoding of an IP address of the one of the egress routers from the header of the IP packet to provide a modified IP packet, and means for forwarding, by the one of the egress routers, the modified IP packet within a context of a multicast application of the multicast group.

BRIEF DESCRIPTION OF THE DRAWINGS

The teachings herein can be readily understood by considering the following detailed description in conjunction with the accompanying drawings, in which:

FIG. 7 depicts an example of an IPv4 Header including IPv4 Options configured for use in encoding an EMR as an IPv4 Header Option;

FIG. 8 depicts an example of an IPv4 Option configured for encoding an EMR as an IPv4 Header Option;

FIG. 9 depicts an example of an encoding of an EMR, within an IPv4 Option, as an EMR Option;

FIG. 10 depicts an example of a Flags field for use in the EMR Option depicted in FIG. 9;

FIG. 11 depicts an example of an IPv4-EMR Shim Header configured for encoding an EMR;

FIG. 12 depicts an example of a Payload field configured for use in the IPv4-EMR Shim Header depicted in FIG. 11;

FIG. 13 depicts an example of a Flags field for use in the Payload field depicted in FIG. 12;

FIG. 15 depicts an example of an IPv6 EH configured for encoding an EMR as an IPv6 EMR Header;

FIG. 16 depicts an example of a Flags field for use in the IPv6 EMR Header depicted in FIG. 15;

FIG. 17 depicts an example of an IPv6-EMR Shim Header configured for encoding an EMR;

FIG. 18 depicts an example of a Payload field configured for use in the IPv6-EMR Shim Header depicted in FIG. 17;

FIG. 19 depicts an example of a Flags field for use in the Payload field depicted in FIG. 18;

FIG. 22 depicts an example of a generic IP Shim Layer configured to provide an IPv4 Source Route Shim;

FIG. 23 depicts an example of a Flags field for use in the IPv4 Source Route Shim depicted in FIG. 22;

FIG. 25 depicts an example IPv6 Routing Header configured for use transporting an IPv4-EMR Shim or an IPv6-EMR Shim;

FIGS. 26A-B depict an example format for an IPv4-EMR Shim or an IPv6-EMR Shim over an IPv6 Routing Header;

FIG. 27 depicts an example format for an IPv6 Routing Shim Header configured for transporting an IPv4 EMR Shim or an IPv6-EMR Shim;

FIG. 28 depicts an example of a Flags field for use in the IPv6 Routing Shim Header depicted in FIG. 27;

FIG. 31 depicts an example encoding of a tree-and-gateway (TAG) address configured to provide an encoding of a tree address within the context of a gateway for the tree address;

FIG. 32 depicts an example of an encoding of a TAG address within an IPv4-EMR Option;

FIG. 33 depicts an example of an encoding of a TAG address within an IPv4-EMR-Shim Header;

FIG. 34 depicts an example of an encoding of a TAG address within an IPv6-EMR EH;

FIG. 35 depicts an example of an encoding of a TAG address within an IPv6-EMR-Shim Header;

FIG. 37 depicts an example encoding of an EMR packet, using an IPv4 Option, originated by a router for a next-hop router within the context of the example of FIG. 36;

FIG. 38 depicts an example encoding of an EMR packet, using an IPv4 Option, originated by a router for a next-hop router within the context of the example of FIG. 36;

FIG. 39 depicts an example encoding of an EMR packet, using an IPv4 Option, originated by a router for a next-hop router within the context of the example of FIG. 36;

FIG. 40 depicts an example encoding of an EMR packet, using an IPv4 Option, originated by a router for a next-hop router within the context of the example of FIG. 36;

FIG. 42 depicts an example encoding of an EMR packet, using an IPv4 Option, received by a router within the context of the example of FIG. 41;

FIG. 43 depicts an example encoding of an EMR packet, using an IPv4 Option, originated by a router for a next-hop router within the context of the example of FIG. 41;

FIG. 44 depicts an example encoding of an EMR packet, using an IPv4 Option, originated by a router for a next-hop router within the context of the example of FIG. 41;

FIG. 45 depicts an example encoding of an EMR packet, using an IPv4 Option, received by a router within the context of the example of FIG. 41;

FIG. 46 depicts an example encoding of an EMR packet, using an IPv4 Option, originated by a router for a next-hop router within the context of the example of FIG. 41;

FIG. 47 depicts an example encoding of an EMR packet, using an IPv4 Option, received by a router within the context of the example of FIG. 41;

FIG. 48 depicts an example encoding of an EMR packet, using an IPv4 Option, originated by a router for a next-hop router within the context of the example of FIG. 41;

FIG. 49 depicts an example encoding of an EMR packet, using an IPv4 Option, received by a router within the context of the example of FIG. 41;

FIG. 50 depicts an example encoding of an EMR packet, using an IPv4 Option, originated by a router for a next-hop router within the context of the example of FIG. 41;

FIG. 55 depicts an example encoding of an EMR packet, using an IPv4 Option, replicated by a router for a next-hop router within the context of the example of FIG. 53;

FIG. 56 depicts an example encoding of an EMR packet, using an IPv4 Option, replicated by a router for a next-hop router within the context of the example of FIG. 53;

FIG. 57 depicts an example encoding of an EMR packet, using an IPv4 Option, replicated by a router for a next-hop router within the context of the example of FIG. 53;

FIG. 58 depicts an example encoding of an EMR packet, using an IPv4 Option, received by a gateway router within the context of the example of FIG. 53;

FIG. 60 depicts an example encoding of an EMR packet, using an IPv4 Option, replicated by a router for a next-hop router within the context of the example of FIG. 59;

FIG. 61 depicts an example encoding of an EMR packet, using an IPv4 Option, replicated by a router for a next-hop router within the context of the example of FIG. 59;

To facilitate understanding, identical reference numerals have been used, where possible, to designate identical elements that are common to the figures.

DETAILED DESCRIPTION

Various example embodiments for supporting stateless multicast in communication networks are presented. Various example embodiments for supporting stateless multicast in communication networks may be configured to support stateless multicast in Internet Protocol (IP) networks. Various example embodiments for supporting stateless multicast in IP networks may be configured to support stateless multicast of an IP packet for a multicast based on encoding of indications of egress routers of the multicast group within the IP packet (e.g., encoding of an indication of a group of egress routers including a subset of the egress routers of the multicast group, where the encoding of the indication of the group of egress routers may include respective IP addresses of the egress routers in the group of egress routers, where the encoding of the indication of the group of egress routers may include an indication of a tree from a gateway router to the egress routers in the group of egress routers, or the like, as well as various combinations thereof). Various example embodiments for supporting stateless multicast in IP networks may be configured to support generic concepts of stateless IP multicast using explicit multicast routes that reuse the unicast IP data plane and control plane, implementation and forwarding of explicit multicast routes in the unicast IP data plane, implementation of explicit multicast routes and forwarding of explicit multicast routes over Interior Gateway Protocol (IGP) shortcuts (e.g., Multiprotocol Label Switching (MPLS)-based IGP shortcuts (e.g., Resource Reservation Protocol-Traffic Engineered (RSVP-TE) LSPs, Segment Routing-Traffic Engineered (SR-TE) LSPs, or the like, as well as various combinations thereof), IP source routed IGP shortcuts (e.g., Segment Routing-Traffic Engineering (SR-TE) based on IP source routing or the like, or the like, as well as various combinations thereof), hierarchical stateless IP multicast (e.g., based on groupings, group membership, gateway, or the like, as well as various combinations thereof), stateless IP multicast based on use of tree addresses and tree-and-gateway addresses, control plane procedures for management of various aspects of stateless IP multicast (e.g., group membership, tree addresses, or the like, as well as various combinations thereof), or the like, as well as various combinations thereof. It will be appreciated that these and various other example embodiments and advantages or potential advantages of supporting stateless multicast in communication networks may be further understood by way of reference to the various figures, which are discussed further below.

Figure 1:
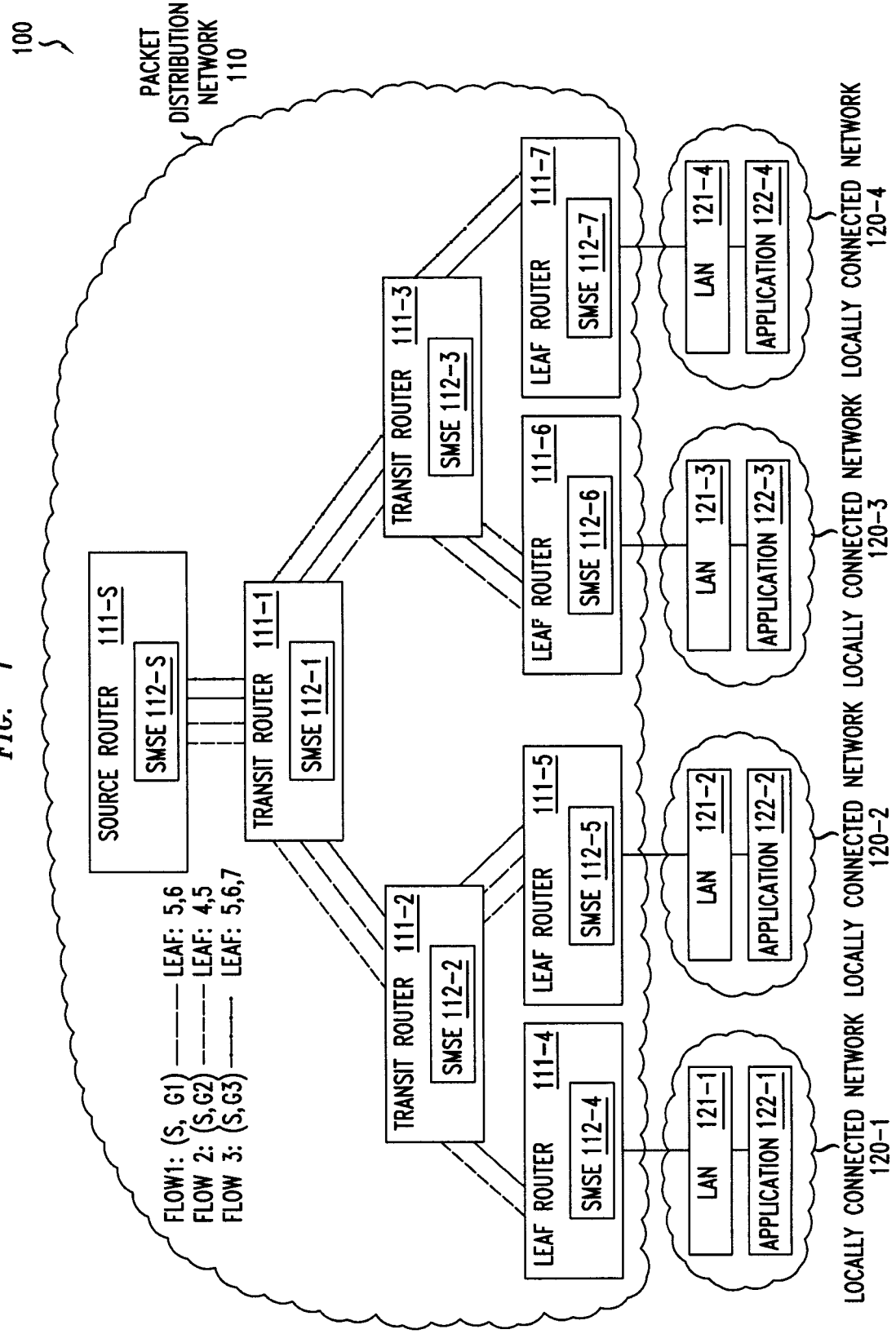
FIG. 1 depicts an example embodiment of a communication system configured to support stateless multicast in an Internet Protocol (IP) network.

FIG. 1 depicts an example embodiment of a communication system configured to support stateless multicast in an IP network.

The communication system 100 includes a packet delivery network 110 and an associated set of locally connected networks 120-1-120-4 (collectively, locally connected networks 120).

The packet delivery network 110 is an IP network. The packet delivery network 110 includes a set of routers 111 including a source router 111-S (which also may be referred to in certain notations herein as router S, multicast router S, or multicast source S), a set of transit routers (illustratively, transit routers 111-1-111-3, which also may be referred to in certain notations herein as routers or transit routers 1, 2, and 3, respectively), and a set of leaf routers (illustratively, leaf routers 111-4-111-7, which also may be referred to in certain notations herein as routers or leaf routers 4, 5, 6, and 7, respectively). The routers 111 of the packet delivery network 110 are communicatively connected in a particular topology via communication links (illustratively, the source router 111-S is communicatively connected to the transit router 111-1, the transit router 111-1 is communicatively connected to the transit routers 111-2 and 111-3, the transit router 111-2 is communicatively connected to the leaf routers 111-4 and 111-5, and the transit router 111-3 is communicatively connected to the leaf routers 111-6 and 111-7). For example, the packet delivery network 110 may be an IP version 4 (IPv4) network, an IP version 6 (IPv6) network, or the like. It will be appreciated that the packet delivery network 110 may be arranged in various other ways (e.g., using different numbers, types, or arrangements of nodes).

The locally connected networks 120 are local networks configured for communications via the packet delivery network 110. The locally connected networks 120-1-120-4 include local area networks (LANs) 121-1-121-4 (collectively, LANs 121) and applications 122-1-122-4 (collectively, applications 122), respectively. The LANs 121-1-121-4 (collectively, LANs 121) are configured to support communications of the applications 122-1-122-4, respectively. The LANs 121 may be operator networks, customer networks, or the like, as well as various combinations thereof. The applications 122 may be any applications configured for communications via the packet delivery network 110 (e.g., receiving content via the content delivery network 110, providing content via the packet delivery network 110, or the like, as well as various combinations thereof). The locally connected networks 120-1-120-4 are served by the leaf routers 111-4-111-7, respectively, of the packet delivery network 110. It is noted that the leaf routers 111-4-111-7 also may be referred to herein as edge routers or egress routers, as the term "leaf" might imply their participation in a multicast tree, for discussing such routers when those routers are not associated with any particular multicast tree. It will be appreciated that the locally connected networks 120 may be arranged in various other ways (e.g., using different numbers, types, or arrangements of nodes).

The packet delivery network 110 is configured to support multicast capabilities. In general, multicast is a method of sending packets to a group of interested receivers in a single transmission. Multicast uses network infrastructure efficiently by having the source send a packet only once, even if it needs to be delivered to multiple receivers. The nodes in the network take care of replicating the packet, when needed, such that the packet may be delivered from the source to multiple receivers. The packet delivery network 110, as indicated above, may be an IP network, in which case the multicast capabilities may be provided using IP multicast. In general, IP multicast is the IP-specific version of the general concept of multicast networking. IP multicast uses reserved multicast address blocks in IPv4 and IPv6 as the destination address (aka group address G) in the IP header. In Point-to-Multipoint (P2MP) IP multicast, a single IP packet is sent by a source S to the group address G which is received by all nodes that have joined as members of G. A flow can be described as (S, G), i.e., from a source S to the group G. In Multipoint-to-Multipoint (MP2MP) IP multicast, a flow can be described as (*, G), i.e., from any source to the group G. A receiver of the flow (*, G) can also send a multicast packet to other members of the group, through a central node called a Rendezvous Point (RP). It will be appreciated that, while various embodiments presented herein are applicable to both P2MP and MP2MP IP multicast, the various embodiments presented herein are primarily described within the context of P2MP flows (for purposes of clarity). IP multicast flows may be set up by the IP multicast control plane, which may include various IP multicast control protocols, such as Protocol Independent Multicast (PIM) (e.g., as described in RFC 7761), Internet Group Membership Protocol (IGMP) (e.g., as described in RFC 3376), or the like. It is noted that IP multicast may be used within various contexts, such as in applications of streaming media (e.g., IP television (IPTV), multi-point video conferencing, or the like) as well as other applications and contexts.

The packet delivery network 110 is configured to support IP multicast capabilities based on use of the IP multicast control plane to establish an IP multicast data plane. In general, an IP multicast flow on the IP multicast data plane may be set up by the IP multicast control plane (which may include one or more multicast control protocols, such as PIM, IGMP, or the like). In IP multicast, a leaf router may rely on an IP multicast control protocol (e.g., IGMP) to learn the interest of a locally connected host/receiver (e.g., in the respective LANs 121-1-121-4 for leaf routers 111-4-111-7) for a multicast group address G (which is sometimes referred to more generally as multicast group G) and the leaf router may then initiate a multicast join message (e.g., "(S, G) JOIN") toward the source S using an IP multicast control protocol (e.g., PIM). The multicast join message traverses the nodes along the shortest path to S, while installing (S, G) state in the control plane and the data plane of the traversed nodes. This results in a Multicast Distribution Tree (MDT) for the (S, G), where the root is S and every leaf node is an egress router interested in G. For example, leaf routers 111-4-111-7 may each receive interest for a multicast group G through multicast join messages from host(s) in their LANs 121-1-121-4, respectively, and these multicast join messages may trigger the leaf routers 111-4-111-7 to send multicast join messages for the multicast group address G toward the multicast source S such that the leaf routers 111-4-111-7 may join the multicast group G and receive the associated multicast flow from the multicast source S. As discussed further below, examples of three such flows are illustrated in FIG. 1: namely, FIG. 1 illustrates three multicast flows from multicast source S to respective subsets of the leaf routers (i.e., leaf routers 111-4-111-7) as follows: (1) Flow 1 for multicast group (S, G1) to leaf routers 111-5 and 111-6, (2) Flow 2 for multicast group (S, G2) to leaf routers 111-4 and 111-5, and (3) Flow 3 for multicast group (S, G3) to leaf routers 111-5, 111-6 and 111-7. These example flows may be used to further understand various embodiments for supporting stateless multicast.

The packet delivery network 110 is configured to support various example embodiments for supporting stateless multicast. The routers 111 of packet delivery network 110 may be configured to support various example embodiments for supporting stateless multicast. The routers 111 include stateless multicast support elements (SMSEs) 112 (illustratively, SMSE 112-S on source router 111-S, SMSEs 112-1-112-3 on transit routers 111-1-111-3, and SMSEs 112-4-112-7 on leaf routers 111-4-111-7, respectively) configured to support stateless multicast for multicast trees in the packet delivery network 110. The SMSEs 112 may be configured to support stateless multicast functions which enable stateless multicast within packet delivery network 110, which may include stateless multicast functions configured to support handling of multicast packets based on stateless multicast (e.g., origination of multicast packets by ingress routers, processing of multicast packets by transit routers, processing of multicast packets by egress routers, or the like, as well as various combinations thereof). The SMSEs 112 may be configured to support various embodiments of stateless multicast for various types of multicast trees (e.g., P2MP, MP2MP, or the like). It will be appreciated that various example embodiments for supporting stateless multicast may be further understood by further considering use of example embodiments for supporting stateless multicast within various contexts (including the example packet delivery network 110 of FIG. 1), as discussed further hereinbelow.

Various example embodiments are configured to support stateless multicast in an IP network (which also may be referred to herein as stateless IP multicast). Various example embodiments are configured to provide a stateless architecture for forwarding of multicast data packets using the native IP data plane. Various example embodiments are configured to provide a stateless architecture for forwarding of multicast data packets using the native IP data plane without requiring a control protocol (e.g., PIM-SM, PIM-DM, or the like) for building MDTs and without requiring intermediate nodes of the MDT to maintain per-flow state. This provides a stateless IP multicast domain. When a multicast data packet enters the stateless IP multicast domain, the ingress router (e.g., S) determines the set of egress routers to which the multicast data packet needs to be sent and then encapsulates the multicast data packet with a list of IP addresses in which each IP address in the list of IP addresses represents an egress router in the stateless IP multicast domain, respectively. It is noted that a multicast data packet in the stateless IP multicast domain may be referred to herein as a stateless IP multicast packet. It is further noted that the list of IP addresses that is used to explicitly encode the egress routers for a stateless IP multicast packet is referred to herein as an Explicit Multicast Route (EMR), and a stateless IP multicast packet that includes an EMR is referred to herein as an EMR packet. In this manner, each of the egress routers for the multicast data packet are encoded within the multicast data packet.

As discussed further below, stateless IP multicast may use typical unicast IP routes (e.g., as presented with respect to FIG. 2), unicast IP routes that use Interior Gateway Protocol (IGP) shortcuts (e.g., as presented with respect to FIG. 3), or the like, as well as various combinations thereof.

Figure 2:
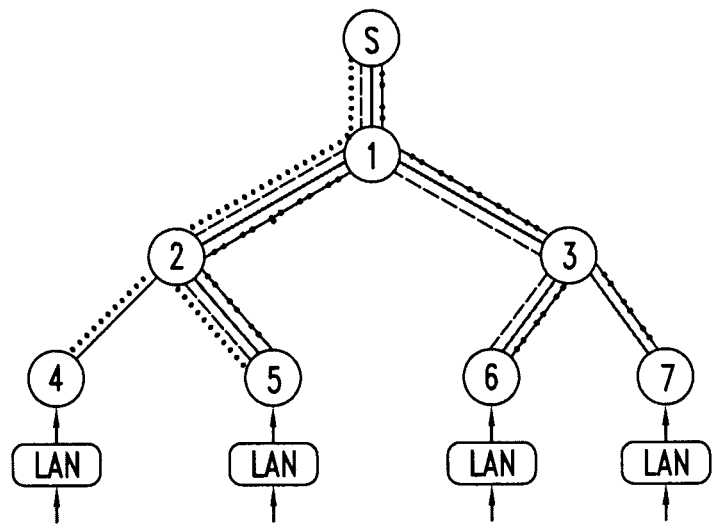
FIG. 2 depicts a variant of the example embodiment of the communication system of FIG. 1, for illustrating use of unicast IP routes.

FIG. 2 depicts a variant of the example embodiment of the communication system of FIG. 1, for illustrating use of unicast IP routes.

In at least some embodiments, stateless IP multicast for unicast IP routes based on EMR packets may be supported as follows. An egress router is encoded in the EMR by one of its loopback IP addresses. The EMR packet is forwarded using the data plane states of the unicast IP routes to the egress routers (namely, a unicast IP route from the ingress router to the loopback IP address on each egress router of the multicast flow). Thus, both unicast packets and multicast packets are sent to the egress routers using the common IP routing table states. It is noted that stateless IP multicast of EMR packets does not incur any additional IP control plane or IP dataplane states at transit routers. After the EMR packet is sent, each router along the path may parse the EMR packet, partition the egress routers based on the next-hop of the unicast routes, and forward an appropriate EMR packet to each of the next-hops of the unicast routes. As such, an EMR packet to a next-hop includes the subset of egress routers routable via that next-hop. When an EMR packet is received by an egress router, the egress router may remove the EMR and forward the packet in the context of the multicast application. This process for supporting stateless IP multicast based on EMR packets may be further understood when considered within the context of an example flow of FIG. 2.

In at least some embodiments, the processing of an EMR packet to make forwarding decisions for the EMR packet may include:

1. Perform an IP Route Table lookup to determine the next-hop for each of the IP addresses listed in the EMR.
2. If the Route Table entry for an IP address indicates that the router is an egress router for the packet, then the IP address is removed from the EMR and a local copy of the packet is sent to the upper layer at the router, and handling of the EMR packet is complete (i.e., steps 3-7 are not performed for that IP address). If the Route Table entry for an IP address indicates that the router is not an egress router for the packet, then processing of the EMR packet continues for that IP address (in step 3).
3. Partition the IP address list in the EMR packet based on the respective next-hops associated with the respective IP addresses in the IP address list in the EMR packet.
4. Replicate the EMR packet so that there is one copy of the EMR packet for each of the next-hops identified for the EMR packet (which is referred to as an EMR packet copy).
5. Modify the EMR in each of the EMR packet copies, so that the EMR in the EMR packet copy for a given next-hop includes only the IP addresses to be switched to that next-hop (and not other IP addresses not to be switched to that next-hop), to provide thereby modified EMR packet copies.
6. Send the modified EMR packet copies of the EMR packet to the next-hops associated with the respective IP addresses of the next-hops, respectively.

It will be appreciated that, although the processing above assumes that there are multiple IP addresses in the EMR packet sent to a next-hop, there may be cases in which there is only a single IP address in the sent EMR packet. In such situations, the EMR packet may be sent as described above or, alternatively, the EMR packet may be sent as a standard unicast IP packet with the single IP address as the destination address in the IP header (e.g., since there may not be any gain by formatting the packet as an EMR packet).

As noted above, stateless IP multicast based on EMR packets may be further understood when considered within the context of an example flow of FIG. 2. For example, in FIG. 2, IP-X is the loopback address of router X. When S wants to multicast a packet for (S, G3), S selects IP addresses IP-5, IP-6, and IP-7 to be encoded as egress routers and each IP address is looked up in the IP Route Table to find the next-hops for these IP addresses. The next-hop for each of these IP addresses is router 1, which is the common shortest path to reach the corresponding egress routers. So, an EMR packet is generated with the IP address list={IP-5, IP-6, IP-7} and the EMR packet is sent to router 1. When router 1 receives the EMR packet, router 1 processes the EMR packet to make further forwarding decisions.

When router 1 receives the packet with EMR={IP-5, IP-6, IP-7}, it will, by the algorithm above, replicate the packet into the following two copies, based on the shortest path of the listed IP addresses: (1) Copy1 with EMR={IP-5} is sent to router 2 (where, since there is single IP address, the packet can be sent as a regular unicast packet with DA=IP-5) and (2) Copy2 with EMR={IP-6, IP-7} is sent to router 3. When routers 2 and 3 receive the copies of the packet, these routers each follow a procedure similar to that discussed for router 1 such that the packet ultimately gets delivered to routers 5, 6, and 7.

It is noted that, when the network topology changes, the unicast IP routes to the egress routers will adapt to the new topology. The forwarding paths of the EMR packet for a flow adapts automatically as well, since the path the EMR packet would take to a given egress router follows the unicast IP route to that egress router.

It will be appreciated that FIG. 2 is merely one example of a communication system in which stateless IP multicast may be used to support unicast IP routes.

Figure 3:
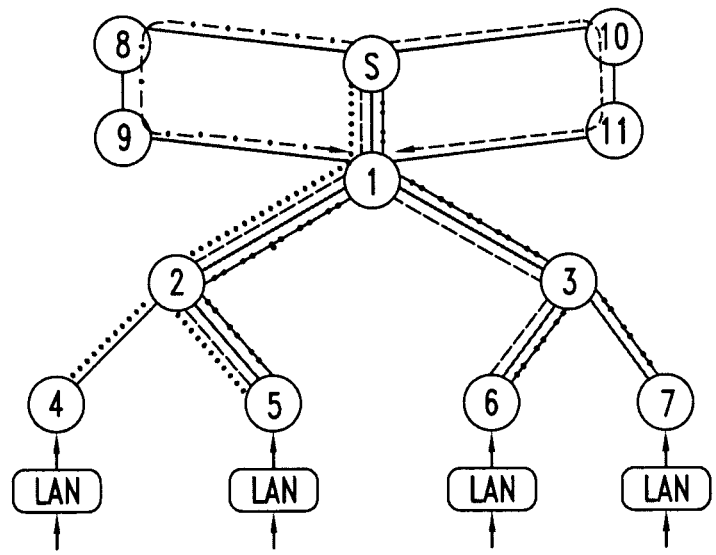
FIG. 3 depicts a variant of the example embodiment of the communication system of FIG. 1, for illustrating use of unicast IP routes using IGP shortcuts.

FIG. 3 depicts a variant of the example embodiment of the communication system of FIG. 1, for illustrating use of unicast IP routes using IGP shortcuts.

In at least some embodiments, a route entry in a unicast IP Route Table may be using an IGP shortcut. Link-state protocols, such as OSPF and IS-IS, use Shortest Path First (SPF) algorithms to compute the shortest-path tree to all nodes in the network. The results of such computations can be represented by the egress router, next-hop address, and output interface, where the output interface is a physical interface. For example, in FIG. 3 the route entry for egress router 5 may be computed by router S to next-hop address 1 and output interface S→1. MPLS label switched paths (LSPs) can be used to augment the SPF algorithm, wherein LSPs are considered as logical interfaces and the endpoint of each LSP is considered to be a next-hop. While computing SPF for a route, if the metric of the shortest path via an LSP (i.e., logical interface) is lower than the "regular" shortest path (i.e., using the physical interface), then the LSP is installed as the next-hop in the IP Route Table. Such a route with an LSP as the next-hop is called an IGP shortcut. An LSP included in an IGP shortcut can be a TE LSP (e.g., signaled RSVP-TE, which is based on RFC 3209).

In at least some embodiments, an egress router encoded within an EMR may be routed via an IGP shortcut and, thus, EMR-encoded stateless IP multicast packets may be sent over IGP shortcuts. The IGP shortcuts, as discussed further below, may include MPLS-based IGP shortcuts (e.g., Resource Reservation Protocol-Traffic Engineered (RSVP-TE) LSPs, Segment Routing-Traffic Engineered (SR-TE) LSPs, or the like, as well as various combinations thereof), IP source routed IGP shortcuts (e.g., SR-TE based on IP source routing or the like), or the like, as well as various combinations thereof. This may be further understood by way of reference to FIG. 3.

In FIG. 3, three flows are defined as follows: (1) Flow 1 (S, G1) to egress routers 5 and 6, (2) Flow 2 (S, G2) to egress routers 4 and 5, and (3) Flow 3 (S, G3) to egress routers 5, 6, and 7.

In at least some embodiments in which stateless IP multicast uses IGP shortcuts, the unicast LSP used in the IGP shortcut may be Resource Reservation Protocol-Traffic Engineered (RSVP-TE) MPLS LSP. It is noted that such embodiments may be further understood by way of reference to FIG. 3.

In FIG. 3, for example, assume that routers S and 1-7 are the routers running IGPs (e.g., OSPF, IS-IS, or the like) and that there are two RSVP LSPs originating from router S as follows: (1) LSP S1-A to router 3 via path S→10→11→1→3 and (2) LSP S1-B to router 1 via path S→8→9→1. In FIG. 3, routers S and 1 are also direct neighbors through the link S→1.

In this example of FIG. 3, based on this arrangement, a unicast route to an egress router has the choice of following next-hops from router S: (1) directly connected link S→1, (2) LSP S1-A, and (3) LSP S1-B. The selection of the next-hop for an egress router from router S to router 1 is based upon the next-hop on the shortest path to the egress router. For example, assume that LSP S1-A is on the shortest path to egress routers 6-7 among the 3 choices of the next-hops and that LSP S1-B is on the shortest path to egress routers 4-5 among the 3 choices of the next-hops. Thus, the EMR packet originated from router S for Flow 3 needs to be sent over at least 1 label (i.e., RSVP-TE Label, where this is assuming that RSVP-TE LSP is not performing facility/bypass FRR, in which case the RSVP-TE LSP would have 2 labels). For simplicity, this example shows the same label LX is used to identify unicast TE-LSP X across the network; however, it will be appreciated that, in practice, each router may allocate a label from its own label space to identify unicast TE-LSP X. For example, in LSP S1-B, each of the routers 8, 9, and 1 may allocate a label from its local label space to identify LSP S1-B. So, in this example, the EMR packets originated by S for Flow 3 will be as follows: (1) EMR-1={IP-5} which is encapsulated in label 'LS1-B' and is sent to router 8 (which is immediate next-hop of LSP S1-B) and (2) EMR-2={IP-6, IP-7} which is encapsulated in label 'LS1-A' and is sent to router 10 (which is immediate next-hop of LSP S1-A).

In this example of FIG. 3, when EMR-1 packet is received by router 8, it forwards it to router 9 as a unicast packet based on the label LS1-B. The packet continues to be forwarded as a unicast packet until it reaches router 1 (end of LSP S1-B) where the label LS1-B is popped and is handed over to the stateless IP multicast layer to replicate/forward based on EMR header. It is possible that, in router 1, unicast IP routes to one or more egress routers in the EMR header are installed as IGP shortcuts, in which case the appropriate EMR header is again encapsulated and forwarded on the LSP used in the IGP shortcut. Similarly, EMR-2 packet is forwarded as a unicast packet until it reaches router 3 (end of LSP S1-A), where the EMR header is processed and the packet is replicated/forwarded. It is noted that the IGP shortcut minimizes the IP Route Table lookups on the EMR header since the packet is forwarded along the shortcut path as a unicast packet.

In at least some embodiments in which stateless IP multicast uses IGP shortcuts, the unicast LSP used in the IGP shortcut may be a Segment Routing-Traffic Engineered (SR-TE) unicast LSP. An SR-TE LSP is a source routed unicast TE-LSP and, thus, it is stateless in transit routers. A SR-TE LSP includes stacks of labels, wherein each label represents a network segment (link/node) along the path of the LSP. A receiving router pops the first label and forwards to the network segment identified by the popped label. The pop-and-forward action continues at each transit hop until the label stack becomes empty (i.e., the packet reaches the destination router of the SR-TE LSP). It is noted that such embodiments may be further understood by way of reference to FIG. 3.

In FIG. 3, for example, assume that router S is the source router and routers 4-7 are egress routers of various multicast flows and, further, that routers S and 1-10 are SR-TE capable routers. In this example, consider the following SR-TE LSPs originating from router S, which are used as IGP shortcuts: (1) LSP S1-A to router 3 via path S→10→11→1→3, used as an IGP shortcut to egress routers 6 and 7 and (2) LSP S1-B to router 1 via path S→8→9→1, used as IGP shortcut to egress router 5.

In this example of FIG. 3, assume that LX Y is the label for link segment X→Y and that LX is the label for the node segment X. Then, unicast traffic on the SR-TE LSPs would be encoded with the label stacks as follows (note that the first hop is not encoded as it is the immediate next-hop of S): (1) LSP S1-A={L_10_11, L_11_1, L_1_3} and (2) LSP S1-B={L_8_9, L_9_1}. In this example, based on this arrangement, for Flow 3, router S would generate the following two EMR packets: (1) EMR-1={IP-5} which is encapsulated in label stack {L_8_9, L_9_1} and is sent to router 8 (which is the immediate next-hop of LSP S1-B) and (2) EMR-2={IP-6, IP-7} which is encapsulated in label stack {L_10_11, L_11_1, L_1_3} and is sent to router 10 (which is the immediate next-hop of LSP S1-A).

In this example of FIG. 3, when EMR-1 packet is received by router 8, it forwards it to router 9 as a unicast packet based on the label stack of LSP S1-B. The packet continues to be forwarded as a unicast packet until it reaches router 1 (end of LSP S1-B) where it is handed over to the stateless IP multicast layer to replicate/forward based on EMR header. It is possible that, in router 1, unicast IP routes to one or more egress routers in the EMR header are installed as IGP shortcuts, in which case the appropriate EMR header is again encapsulated and forwarded on the LSP used in the IGP shortcut. Similarly, the EMR-2 packet is forwarded as a unicast packet until it reaches router 3 (end of LSP S1-A), where the EMR header is processed and the packet is replicated/forwarded. It is noted that the IGP shortcut also minimizes the IP Route Table lookups on the EMR header since the packet is forwarded as a unicast packet along the shortcut.

In at least some embodiments in which stateless IP multicast uses IGP shortcuts, the unicast LSP used in the IGP shortcut may be an SR-TE path implemented with native IP source routing techniques. For an SR-TE path implemented with native IP source routing techniques, wherein, instead of assigning a label, a network segment is identified by the IP address. It is noted that such embodiments may be further understood by way of reference to FIG. 3.

In FIG. 3, for example, assume that IP-X-Y is the IP address assigned to the Y end of link X→Y and IP-Y-X is the IP address assigned to the X end of the link Y→X. In this example of FIG. 3, consider the following SR-TE paths originating from router S: (1) S1-A to router 3 via path S→10→11→1→3 and (2) S1-B to router 1 via path S→8→9→1. In this example, unicast traffic on the IP based SR-TE paths would be encoded with the source route including a list of IP addresses as follows (note that the first hop is not encoded as it is the immediate next-hop of S): (1) S1-A={IP-10-11, IP-11-1, IP-1-3} and (2) S1-B={IP-8-9, IP-9-1}.

In this example of FIG. 3, for Flow 3, router S would generate following two EMR packets: (1) EMR-1={IP-5} which is encapsulated IP source route {IP-8-9, IP-9-1} and is sent to router 8 (which is the immediate next-hop of S1-B) and (2) EMR-2={IP-6, IP-7} which is encapsulated in IP source route {IP-10-11, IP-11-1, IP-1-3} and is sent to router 10 (which is the immediate next-hop of S1-A).

In this example of FIG. 3, when the EMR-1 packet is received by router 8, it forwards it to router 9 as a unicast packet based on the IP Source Route of SR-TE path S1-B. The packet continues to be forwarded as a unicast packet until it reaches router 1 (end of SR-TE path S1-B), where it is handed over to the stateless IP multicast layer to replicate/forward based on the EMR header. It is possible that, in router 1, unicast IP routes to one or more egress routers in the EMR header are installed as IGP shortcuts, in which case the appropriate EMR header is again encapsulated and forwarded on the RSVP-TE/SR-TE LSP or the SR-TE IP Source Route used in the IGP shortcut. Similarly, the EMR-2 packet is forwarded as a unicast packet until it reaches router 3, where the EMR header is processed and the packet is replicated/forwarded. It is noted that the IGP shortcut also minimizes the IP Route Table lookups on the EMR header since the packet is forwarded as unicast packet along the shortcut.

It will be appreciated that FIG. 3 is merely one example of a communication system in which stateless IP multicast may be used to support unicast IP routes using IGP shortcuts.

It is noted that the ability to reuse the control plane and data plane states of the unicast IP routing to achieve stateless IP multicast provides a simple and turnkey solution, which makes this a compelling proposition in existing IP networks.

Various example embodiments provide a hierarchical architecture in stateless IP multicast. This architecture allows an ingress router to multicast a packet to a larger set of egress routers with a smaller EMR size (i.e., such that the EMR overhead and number of IP Route Table lookups do not grow linearly with the number of egress routers). Thus, with such a hierarchical architecture, various embodiments of stateless IP multicast, rather than being limited to certain contexts or applications (e.g., narrowcast contexts or applications having a relatively small number of egress routers), may be used within various contexts and for various applications (e.g., in various contexts or applications in which there may be a relatively large number of egress routers, such in IP-TV deployments). Various example embodiments for providing a hierarchical architecture in stateless IP multicast may be configured to support various models for the hierarchical architecture, at least some of which (namely, two models referred to herein as Model-A (presented with respect to FIG. 4) and Model-B (presented with respect to FIG. 5)) are discussed further below.

Figure 4:
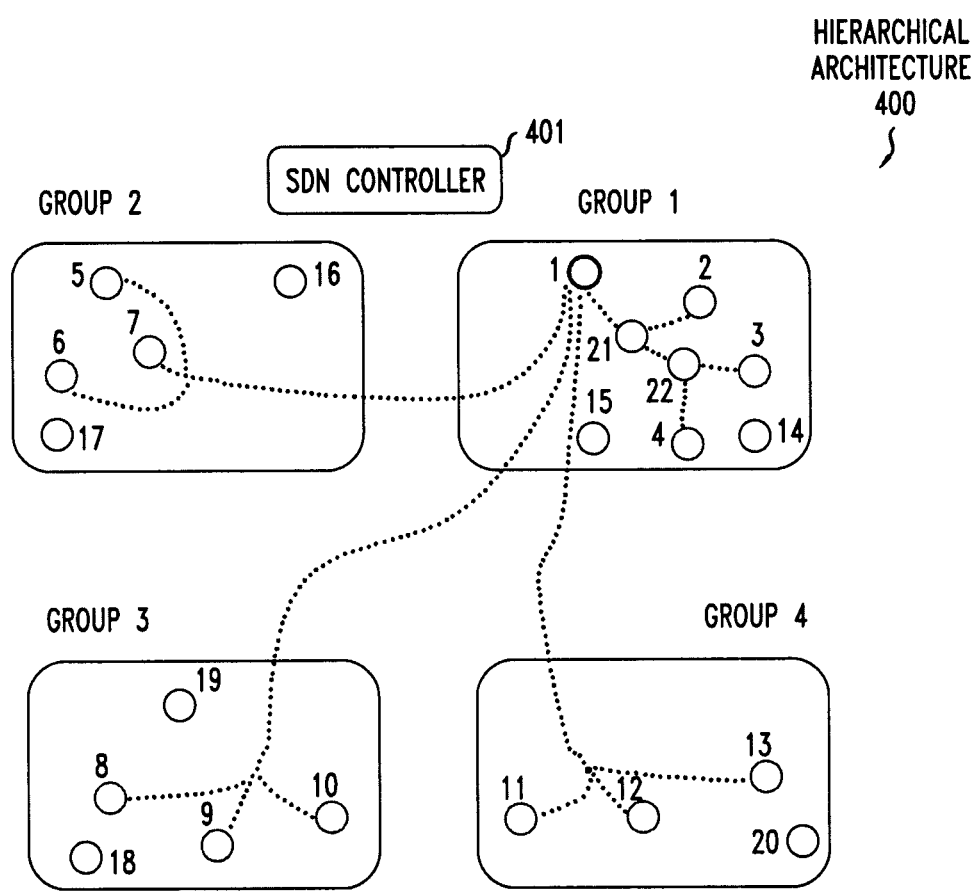
FIG. 4 depicts an example embodiment of a hierarchical architecture, referred to herein as Model-A, configured to support stateless IP multicast.

FIG. 4 depicts an example embodiment of a hierarchical architecture, referred to herein as Model-A, configured to support stateless IP multicast. In Model-A, an example of which is presented in FIG. 4 as hierarchical architecture 400, egress routers are partitioned into groups where each group forms a parent-child relationship with the set of egress routers assigned to that group. In hierarchical architecture 400, twenty-two routers (numbered "1" through "22") are presented.

In FIG. 4, for a given multicast flow, router 1 is the ingress router for the multicast flow and routers 2-13 are egress routers for the multicast flow. In this example, for purposes of clarity, it is assumed that 'IP-X' is the loopback address of router 'X' (e.g., "IP-5" is the loopback address for router 5). It is noted that there are other routers (illustratively, routers 14-22) which are not egress routers for the exemplary multicast flow described here.

In FIG. 4, the egress routers of the multicast flow are partitioned into following groups: (1) routers 1-4 are in Group 1, (2) routers 5-7 are in Group 2, (3) routers 8-10 are in Group 3, and (3) routers 11-13 are in Group 4. In Group 1, routers 21-22 are transit routers that forward multicast packets of the exemplary flow. For simplicity, the transit routers in Groups 2-4 are omitted from FIG. 4.

In FIG. 4, a multicast packet may be sent from ingress router 1 to egress routers 2-13 as follows. Router 1 partitions the egress routers by their respective groups. Router 1 creates a copy of the packet for each group, where each copy is referred to as a group packet. A group packet for a group is sent with the EMR including the child egress routers in the flow within the group. As such, ingress router 1 generates the following group packets: (1) group packet 1 with EMR={IP-2, IP-3, IP-4}, (2) group packet 2 with EMR={IP-5, IP-6, IP-7}, (3) group packet 3 with EMR={IP-8, IP-9, IP-10}, and (4) group packet 4 with EMR={IP-11, IP-12, IP-13}.

In Model-A, the term GROUP_LIMIT may be used to denote the maximum number of routers to share a group and the term EMR_MAX may be used to denote the maximum IP addresses allowed within EMR in the stateless IP multicast domain. It will be appreciated that the EMR_MAX is directly proportional to the GROUP_LIMIT. In at least some embodiments, routers may be assigned to groups in such a way that the number of groups is reduced or minimized. For example, if GROUP_LIMIT is 30, then, if the number of egress routers in the stateless IP multicast domain is less than or equal to 30 then all of those routers are assigned to the single group, if the number of egress routers in the stateless IP multicast domain is between 30 and 60 then the routers are distributed across two groups, and so forth.

In Model-A, ingress replication of packets is performed by ingress router per group. Ingress replication grows linearly with the number of groups associated with the flow. It is noted that, in stateful multicast, the ingress router (e.g., S in FIG. 1) multicasts a single copy of the packet. This model may be suitable for applications in which the number of groups is small and the resulting ingress replication is tolerable. For example, assuming that the application is MVPN (BGP based multicast VPNs of RFC 6513) with 30 sites and GROUP_MAX is 30, then there is no ingress replication and an MVPN packet will have a maximum EMR overhead of ~30 IP addresses. Similarly, for example, assume that the MVPN has grown to 50 sites and GROUP_MAX is still 30, then two groups would be formed and, thus, two ingress replications would be performed while the EMR overhead remains the same (namely, ~30 IP addresses since that is the per-group limit).

In FIG. 4, for purposes of clarity, two levels of hierarchy are depicted; however, it will be appreciated that any suitable number of hierarchical layers may be used (e.g., groups may be further partitioned into sub-groups and so forth). In at least some such embodiments, the ingress router would generate a copy of the packet for the lowest sub-group in the hierarchy and, thus, the number of ingress replications would be equal to the number of lowest sub-groups that includes the egress routers for the multicast flow.

In FIG. 4, the group membership is configured and managed by a centralized entity (illustratively, an SDN controller 401, although it will be appreciated that other suitable types of controllers may be used). This approach may be used based on reuse of the IP routing control plane without incurring any extensions therein for stateless IP multicast; however, it will be appreciated that, in at least some embodiments, the IP routing control plane may be configured to exchange group membership information.

It will be appreciated that hierarchical architecture 400 is merely exemplary and that Model-A may be implemented in various other ways.

Figure 5:
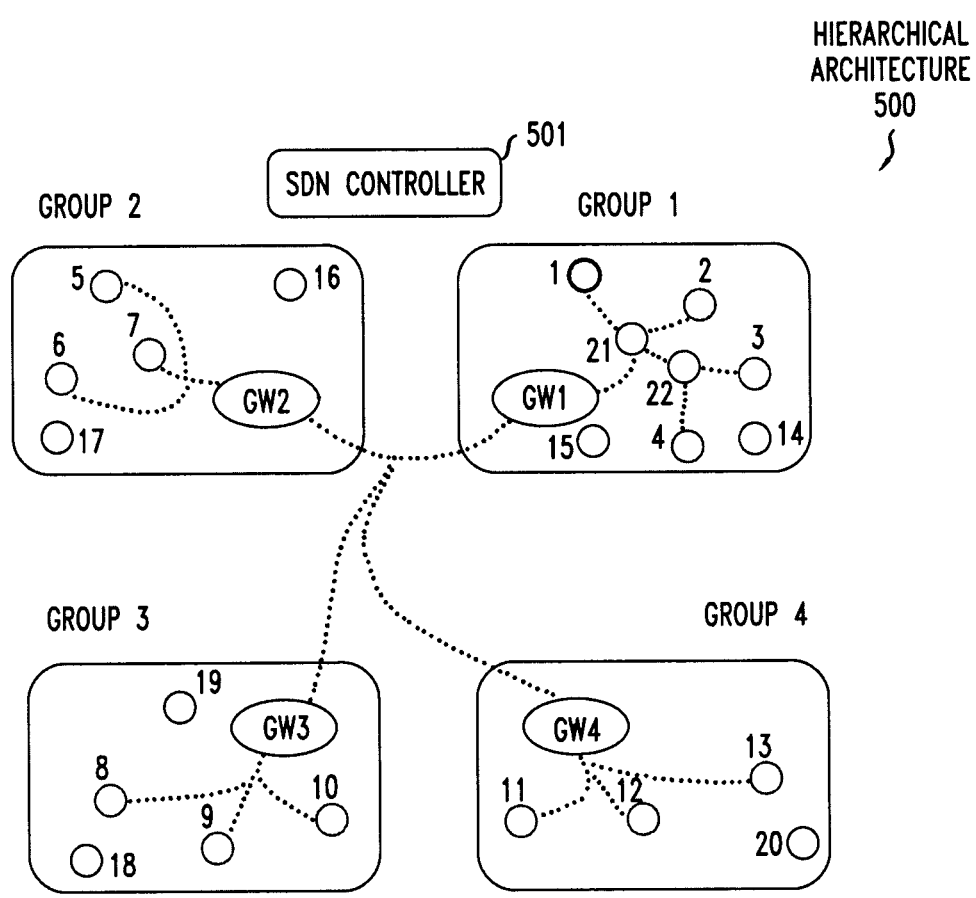
FIG. 5 depicts an example embodiment of a hierarchical architecture, referred to herein as Model-B, configured to support stateless IP multicast.

FIG. 5 depicts an example embodiment of a hierarchical architecture, referred to herein as Model-B, configured to support stateless IP multicast. In Model-B, an example of which is presented in FIG. 5 as hierarchical architecture 500, hierarchical replication is provided by partitioning egress routers into groups (as in Model-A) and providing a gateway router per group. This results in a quasi-stateful approach. It is noted that, due to hierarchical replication, there is no ingress replication, which may make Model-B the preferred approach for certain applications (e.g., where the number of groups is high or ingress replication is not tolerable). In hierarchical architecture 500, twenty-two routers (numbered "1" through "22") and four gateways (numbered "GW1" through "GW4") are presented.

In FIG. 5, for a given multicast flow, router 1 is the ingress router for the multicast flow and routers 2-13 are egress routers for the multicast flow. In this example, for purposes of clarity, it is assumed that 'IP-X' is the loopback address of router 'X' (e.g., "IP-5" is the loopback address for router 5, IP-GW4 is the loopback address for GW4, and so forth).

It is noted that there are other routers (illustratively, routers 14-22) which are not egress routers for the exemplary multicast flow described here.

In FIG. 5, the egress routers of the multicast flow are partitioned into following groups: (1) routers 1-4 are in Group 1, (2) routers 5-7 are in Group 2, (3) routers 8-10 and GW3 are in Group 3, and (3) routers 11-13 are in Group 4. In Group 1, routers 21-22 are transit routers that forward multicast packets of the exemplary flow. For simplicity, the transit routers in Groups 2-4 are omitted from FIG. 5. The Routers GW1-GW4 are the gateway routers for Groups 1-4 respectively. It will be appreciated that any of the gateway routers also may operate as an egress router for a multicast flow. For example, GW3 is the gateway router as well as egress router for the exemplary multicast flow. It will be appreciated that any of the egress routers in a group also may operate as a gateway router for a sub-group with the group, such that hierarchy may be extended to provide additional hierarchical levels. It will be appreciated that there could be more than one gateway router per group for various purposes (e.g., Equal Cost MultiPath (ECMP), load-balancing, resiliency, or the like, as well as various combinations thereof).

In FIG. 5, the group membership and gateway status are configured and managed by a centralized entity (illustratively, an SDN controller 501, although it will be appreciated that other suitable types of controllers may be used). This approach may be used based on reuse of the IP routing control plane without incurring any extensions therein for stateless IP multicast; however, it will be appreciated that, in at least some embodiments, the IP routing control plane may be configured to exchange group membership and gateway status information.

In Model-B, a tree address is introduced, where a tree address is a specific IP address assigned to a gateway router that acts as an identifier for a stateless IP multicast tree to a specific subset of child egress routers. In the IP data plane of the gateway router, a tree address translates to an EMR that encodes the specific subset of child egress routers.

In Model-B, for a multicast flow that has egress routers spanning across multiple groups, the gateway router(s) in each group is programmed with a tree address. As such, a gateway router maintains flow specific states, which adds to the "quasi-statelessness" of this hierarchical paradigm. The tree address allocation and programming at the gateways is performed by a centralized entity (e.g., an SDN controller or other centralized entity). The centralized entity, after setting up the tree address at the gateway routers, provides an ingress router with the tuple <tree address, gateway address> for each external group, where the gateway address is the loopback address of the gateway router and the tree address identifies the EMR that includes the child routers of the gateway router for the multicast flow.

In Model-B, for a multicast flow that has egress routers in groups other than the group that includes the ingress router, the ingress router includes the tuple of <tree address, gateway address> for each external group in the EMR, where the gateway address is the loopback address of the gateway router. Since a tree address is programmed at the gateway routers and the transit routers are agnostic to it, a tree address is encoded in the EMR within the context of the gateway address. The encoding of the tuple <tree address, gateway address> is referred to herein as a tree-and-gateway (TAG) address. When a router receives a packet having a TAG address within an EMR, the router looks up the gateway address to make the forwarding decision for the packet. If the gateway address identifies the router, then the router looks up the tree address, in its tree address table, to translate it to the mapped EMR. If the gateway address does not identify the router (i.e., the receiving router is not a gateway router), then the TAG address is forwarded within the EMR packet to the next-hop router of the gateway address.

In FIG. 5, for the example multicast flow, the tree addresses are programmed as follows: (1) GW1 is programmed with tree address IP-TA1 which maps to EMR={IP-1, IP-2, IP-3, IP-4}, (2) GW2 is programmed with tree address IP-TA2 which maps to EMR={IP-5, IP-6, IP-7}, (3) GW3 is programmed with tree address IP-TA3 which maps to EMR={IP-8, IP-9, IP-10}+egress router, and (4) GW4 is programmed with tree address IP-TA4 which maps to EMR={IP-11, IP-12, IP-13}.

In FIG. 5, a multicast packet is sent from ingress router 1 to egress routers 2-13 and GW3 as follows:

1. Router 1 initiates the multicast packet with EMR={IP-2, IP-3, IP-4, <IP-TA2, IP-GW2>, <IP-TA3, IP-GW3>, <IP-TA4, IP-GW4>} where the target receivers are routers 2, 3, 4, GW2, GW3, and GW4. Router 1 looks up the next-hop for IP addresses IP-2, IP-3, IP-4, IP-GW2, IP-GW3, and IP-GW4 in the IP Route Table and finds router 21 as the common next-hop for all the IP addresses. Router 1 sends the EMR packet to 21.

2. When router 21 receives the EMR packet, it looks up router IP addresses IP-2, IP-3, and IP-4 and gateway IP addresses IP-GW2, IP-GW3, and IP-GW4 in its IP Route Table. The route entry for IP-2 points to next-hop 2. The route entries for IP-3 and IP-4 point to common next-hop 22. The route entries for IP-GW2, IP-GW3, and IP-GW4 point to common next-hop GW1. So, router 21 replicates the received EMR packet into the following three copies and sends them to their respective next-hops:

EMR-1={IP-2} to next-hop 2.
EMR-2={IP-3, IP-4} to next-hop 22.
EMR-3={<IP-TA2, IP-GW2>, <IP-TA3, IP-GW3>, <IP-TA4, IP-GW4>} to next-hop GW1.

3. The EMR-1 packet is received by router 2 and the route entry for IP-2 indicates that this is the egress router. So, router 2 pops the EMR header and delivers the packet to the upper layer.

4. The EMR-2 packet is received by router 22 and is replicated to egress routers 3 and 4 respectively (e.g., using similar procedures as in step 2).

5. The EMR-3 packet is replicated by the network to gateways GW2, GW3, and GW4, respectively (e.g., using similar procedures as in step 2). It is noted that, for purposes of clarity, the transit routers connecting GW1-GW4 are not shown in FIG. 3.

6. The GW3 receives the copy with EMR={<IP-TA3, IP-GW3>}. GW3 looks up the route entry for IP-GW3 and finds that this is the egress router for that IP address. So, it pops the TAG address and looks up the route entry for tree address IP-TA3 in the Tree Address Table, which translates to the mapped EMR={IP-8, IP-9, IP-10}+egress router. Since GW3 is also marked as an egress router for the packet, it makes a local copy of the packet and sends the local copy of the packet to the upper layers. GW3 sends the other copy with EMR={IP-8, IP-9, IP-10}, which is eventually received by routers 8, 9, and 10.

7. The copies of the packet received by GW2 and GW4 are multicast to routers 8, 9, and 10 and routers 11, 12, and 13, respectively (e.g., using similar procedures as in step 6).

It is noted that, in Model-B, the hierarchical paradigm enables multi-point-to-multi-point (MP2MP) communication between routers 1-13, such that any of the routers 1-13 can communicate with the rest of the routers. For example, assuming that router 8 wants to multicast to routers 1-7, GW1, and router 9-13, then router 8 initiates the packet with EMR={IP-8, IP-9, IP-10, <IP-TA1, IP-GW1>, <IP-TA2, IP-GW2>, <IP-TA3, IP-GW3>} and the packet is forwarded as described above for Model-B.

It is noted that, in Model-B, although the routers 1-13 are organized into a hierarchical paradigm, a router can still send a multicast packet directly to egress routers across all groups. For example, router 1 can directly send a multicast packet to routers 2-13 with EMR={IP-2, IP-3, IP-4, IP-5, IP-6, IP-7, IP-8, IP-9, IP-10, IP-11, IP-12, IP-13}.

It is noted that, in Model-B, a tree address can be included in a source routed IP stack without being encoded as part of the TAG address. In general, Source Routing, also called explicit path addressing, allows a head-end router to partially or completely specify the path a packet takes through the network. The path is encoded into the packet itself, where each hop in the path is denoted by an IP address representing a link or a router along the path. A transit router pops the first hop from the received path and looks up that hop in its IP Route Table to make a forwarding decision. The pop-and-forward action continues at each router along the path until the path becomes empty (i.e., reaches the last hop of the specified path). Source Routing minimizes the states required in transit routers to forward a packet, since each node only maintains forwarding information to one of its next-hops and does not need to maintain forwarding information to each possible packet destination. Source Routing in IPv4 is defined in the original specification of the IPv4 Protocol (namely, in Section 3.1 in RFC 791). Source Routing in IPv6 is defined in the original specification of the IPv6 Protocol (namely, in Section 4.4 in RFC 2460). An example of such IP source routing in stateless IP multicast (including use of a tree address in a Source Routed IP packet) is presented in FIG. 4.

It will be appreciated that hierarchical architecture 500 is merely exemplary and that Model-B may be implemented in various other ways.

Figure 6:
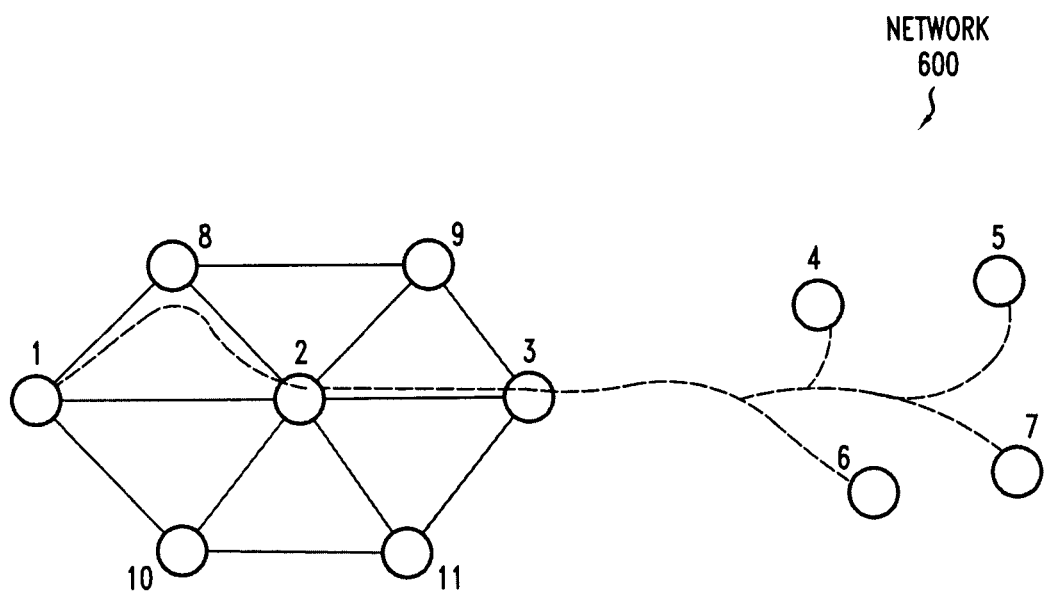
FIG. 6 depicts an example network illustrating an example embodiment of IP source routing in stateless IP multicast.

FIG. 6 depicts an example network illustrating an example embodiment of IP source routing in stateless IP multicast.

In FIG. 6, a network 600 includes a set of eleven routers (numbered "1" through "11") configured to support IP source routing in stateless IP multicast.

In FIG. 6, a source routed IP packet is sent by router 1 along links 1→8→2→3 as a unicast packet and then the source routed IP packet is multicast by router 3 to end receivers 4-7.

In FIG. 6, assume that IP-X is the loopback IP address of router X and that IP-XY is the IP address at the Y end of the link adjacency between X→Y. For example, IP-6 is the loopback IP address of router 6 and IP-23 is the address on link 2→3.

In FIG. 6, for stateless IP multicast of the source routed IP packet from router 3 to end receivers 4-7, a tree address IP-TA3 is allocated and programmed in router 3 such that it maps to EMR={IP-4, IP-5, IP-6, IP-7}. Router 1 then sends the source routed IP packet, with source route={IP-82, IP-23, IP-TA3}, to router 8. Router 8 pops the top address, IP-82, which identifies the next-hop as 8→2 and forwards the packet to router 2 with source route={IP-23, IP-TA3}. Router 2 pops the top address, IP-23, which identifies the next-hop as 2→3 and forwards the packet to router 3 with source route={IP-3-TA}. Router 3 receives the packet and looks up IP-TA3 in its Tree Address Table, which translates to EMR={IP-4, IP-5, IP-6, IP-7}. Router 3 then sends the EMR packet to the network such that it is eventually received by end receivers 4-7.

It will be appreciated IP source routing in stateless IP multicast may be implemented in various other ways.

In at least some embodiments, as indicated hereinabove, stateless IP multicast may be implemented based on use of the EMR It is noted that the EMR may be used for both Model-A and Model-B. The EMR, as discussed further below, may be different for IPv4 and IPv6.

The EMR, in IPv4, is a list of IPv4 addresses where each IP address in the list identifies (1) an IPv4 loopback address of an egress router (or gateway router) that receives the multicast packet or (2) a part of an IPv4 TAG address. In IPv4, the EMR may be encoded as an IPv4 Header Option, an IP Shim Protocol, or the like.

In IPv4, as indicated above, the EMR may be encoded as an IPv4 Header Option. RFC 791 describes several Options that may be appended to the IPv4 Header as depicted in FIG. 7.

In general, Options provide control functions needed or useful in various situations, but generally unnecessary for the most common communications. The Options include provisions for timestamps, security, and special routing. The only router that is allowed to inspect the IPv4 Option(s) is the router that corresponds to the Destination Address (DA) of the IPv4 packet. All Options start with a 1-octet Type field, followed by type specific encoding. Options are of variable length. Thus, the minimum size of an Option is 1-octet (i.e., only the type field exists) if it does not have any type specific data. The maximum size of an Option is limited by maximum permissible value of the Internet Header Length (IHL) field in the IPv4 Header. The 1-octet Type field is viewed as having 3 fields as follows: (a) a 1-bit Copied Flag field, (b) a 2-bit Option Class field, and (c) a 5-bit Option Number field. The Copied Flag indicates that the Option is copied into all fragments on fragmentation (e.g., "0"=not copied and "1"=copied). The Options Classes include: (a) 0=control, (b) 1=reserved for future use, (c) 2=debugging and measurement, and (d) 3=reserved for future use.

In at least some embodiments, a new IPv4 Option may be defined for encoding the EMR In at least some embodiments, the new IPv4 Option defined for encoding the EMR may be defined as depicted in FIG. 8.

It will be appreciated that the Number for the new IPv4 Option may be assigned from unallocated values in the Internet Assigned Numbers Authority (IANA) Registry (e.g., although presented with respected to use of "15" as the Number, any other suitable value may be used).

In at least some embodiments, the EMR may be encoded within the new IPv4 Option (which also may be referred to as an EMR Option) as depicted in FIG. 9.

The EMR Option, as depicted in FIG. 9, includes a Type field, a Length field, a Flags field, a RESERVED field, and an IPv4-Address-List field.

The EMR Option, as indicated above, includes a Type field. The Type field is a 1-octet field that indicates that the Option type is the EMR Option type in tuples of COPY, CLASS and NUMBER. The value of the Type field may be 143 (i.e., breakdown as COPY=1, CLASS=0, NUMBER=15) or any other suitable value based on the chosen value of NUMBER field.

The EMR Option, as indicated above, includes a Length field. The Length field is a 1-octet field that indicates the length of the EMR Option (including the Type octet, Length octet, Flags octet, RESERVED octet, and all of the octets of the IPv4-Address-List).

The EMR Option, as indicated above, includes a Flags field. The Flags field is an 8 bit field which may be defined as depicted in FIG. 10.

The Flags field, as depicted in FIG. 10, includes an OAM Flag (denoted as an O-flag) and Unused Flags (denoted as a U-Flags). The O-Flag, when set, indicates that the packet is an operations and management (OAM) packet. The U-Flags are unused and reserved for future use (e.g., should be unset on transmission and ignored on receipt).

The EMR Option, as indicated above, includes a RESERVED field. The RESERVED field is unused and reserved for future use (e.g., is should be unset on transmission and ignored on receipt).

The EMR Option, as indicated above, includes an IPv4-Address-List field. The IPv4-Address-List field is the list of the n IPv4 addresses encoded within the EMR (where, as indicated above, an IPv4 address in the list is either a loopback address of an egress router that is to receive the multicast packet or a tree address).

It is noted that, since only the router whose IPv4 address is in the DA field of the IPv4 Header of the IPv4 multicast packet must inspect the EMR Option, the IPv4 address of the next hop of the EMR packet is set as the DA of the IPv4 multicast packet. Thus, the DA of the IPv4 multicast packet changes at each hop of the EMR packet.

In IPv4, as indicated above, the EMR may be encoded as an IP Shim Header. The IP Shim Header may be used under various conditions, but is configured to overcome limitations of IPv4 Options in encoding IP addresses. The IHL field in IPv4 Header has 4 bits, which represents the number of 32-bit words permitted in the IPv4 Header, including the variable number of IPv4 Options. As a 4-bit field, the maximum value of IHL is 15 words (15×32 bits, or 480 bits=60 bytes), whereas the minimum value of IHL is 5 words (which indicates a length of 5×32=160 bits=20 bytes, i.e., the fixed size of IPv4 Header excluding the Options). This means that the maximum size of the Options can be 60−20=40 bytes, which limits the number of IPv4 Addresses that can be included within the EMR Option to 9.

In at least some embodiments, a new IPv4-Shim Layer may be defined for encoding the EMR (and the associated IP-Shim Header may be referred to herein as an IPv4-EMR Shim Header). The IPv4-Shim Layer is configured to carry any "enhancement" related to the IP layer. The IPv4-Shim Layer may be inserted between IP Header (i.e., the IP routing sub-layer) and the upper-layer/transport protocol header (e.g., transport protocols such as Transmission Control Protocol (TCP), User Datagram Protocol (UDP), Internet Control Message Protocol (ICMP), or the like). The IP-Shim Layer may be carried using an IP Protocol number 145 in the IPv4 Header.

In at least some embodiments, the new IPv4-EMR Shim Header defined for encoding the EMR, which may be used by the IPv4-Shim Layer, may be defined as depicted in FIG. 11.

The IPv4-EMR Shim Header, as depicted in FIG. 11, includes a Type field, a Length field, a Next Header field, and a Payload field.

The IPv4-EMR Shim Header, as indicated above, includes a Type field. The Type field is an 8-bit field that indicates that the IP-Shim Header is the type encoding an EMR (and, thus, may be referred to as "IPv4-EMR" as it is carried as a shim for the IPv4 layer). The new IPv4-EMR Shim Header encoding the EMR may be Type 3 (or any other suitable value). It is noted that the IP-Shim Protocol is defined as generic and, thus, may carry different types.

The IPv4-EMR Shim Header, as indicated above, includes a Length field. The Length field is a 16-bit field that carries length of the payload in octets (with the octets of the Type, Length, and Next Header fields being excluded). It is noted that the size of the Payload can be up to 65535 octets.

The IPv4-EMR Shim Header, as indicated above, includes a Next Header field. The Next Header field is indicative of the IP Protocol type of the header next to the IPv4-EMR Shim Header (e.g., TCP, UDP, ICMP, or the like).

The IPv4-EMR Shim Header, as indicated above, includes a Payload field. The Payload field includes the type-specific format for encoding the list of IPv4 addresses encoded within the EMR (where, as indicated above, an IPv4 address in the list is either a loopback address of an egress router that is to receive the multicast packet or a tree address).

In at least some embodiments, the Payload field of the IPv4-EMR Shim Header may have the format depicted in FIG. 12.

The Payload field of the IPv4-EMR Shim Header, as depicted in FIG. 12, includes a Flags field, a RESERVED field, and an IPv4-Address-List field.

The Payload field of the IPv4-EMR Shim Header, as indicated above, includes a Flags field. The Flags field is an 8 bit field which may be defined as depicted in FIG. 13.

The Flags field, as depicted in FIG. 13, includes an OAM Flag (denoted as an O-flag) and Unused Flags (denoted as a U-Flags). The O-Flag, when set, indicates that the packet is an operations and management (OAM) packet. The U-Flags are unused and reserved for future use (e.g., should be unset on transmission and ignored on receipt).

The Payload field of the IPv4-EMR Shim Header, as indicated above, includes a RESERVED field. The RESERVED field is unused and reserved for future use (e.g., is should be unset on transmission and ignored on receipt).

The Payload field of the IPv4-EMR Shim Header, as indicated above, includes an IPv4-Address-List field. The IPv4-Address-List field is the list of the n IPv4 addresses encoded within the EMR (where, as indicated above, an IPv4 address in the list is either a loopback address of an egress router that is to receive the multicast packet or a tree address).

It is noted that, since only the router whose IPv4 address is in the DA field of the IPv4 Header of the IPv4 multicast packet header must inspect the IPv4-EMR Shim Header, the IPv4 address of the next hop of the EMR packet is set as the DA of the IPv4 multicast packet. Thus, the DA of the IPv4 multicast packet changes at each hop of the EMR packet.

The EMR, in IPv6, is a list of IPv6 addresses where each IP address in the list identifies (1) an IPv6 loopback address of an egress router (or gateway router) that receives the multicast packet or (2) a part of an IPv6 TAG address. In IPv6, the EMR may be encoded as an IPv6 Extension Header, an IP Shim Protocol, or the like.

Figure 14:
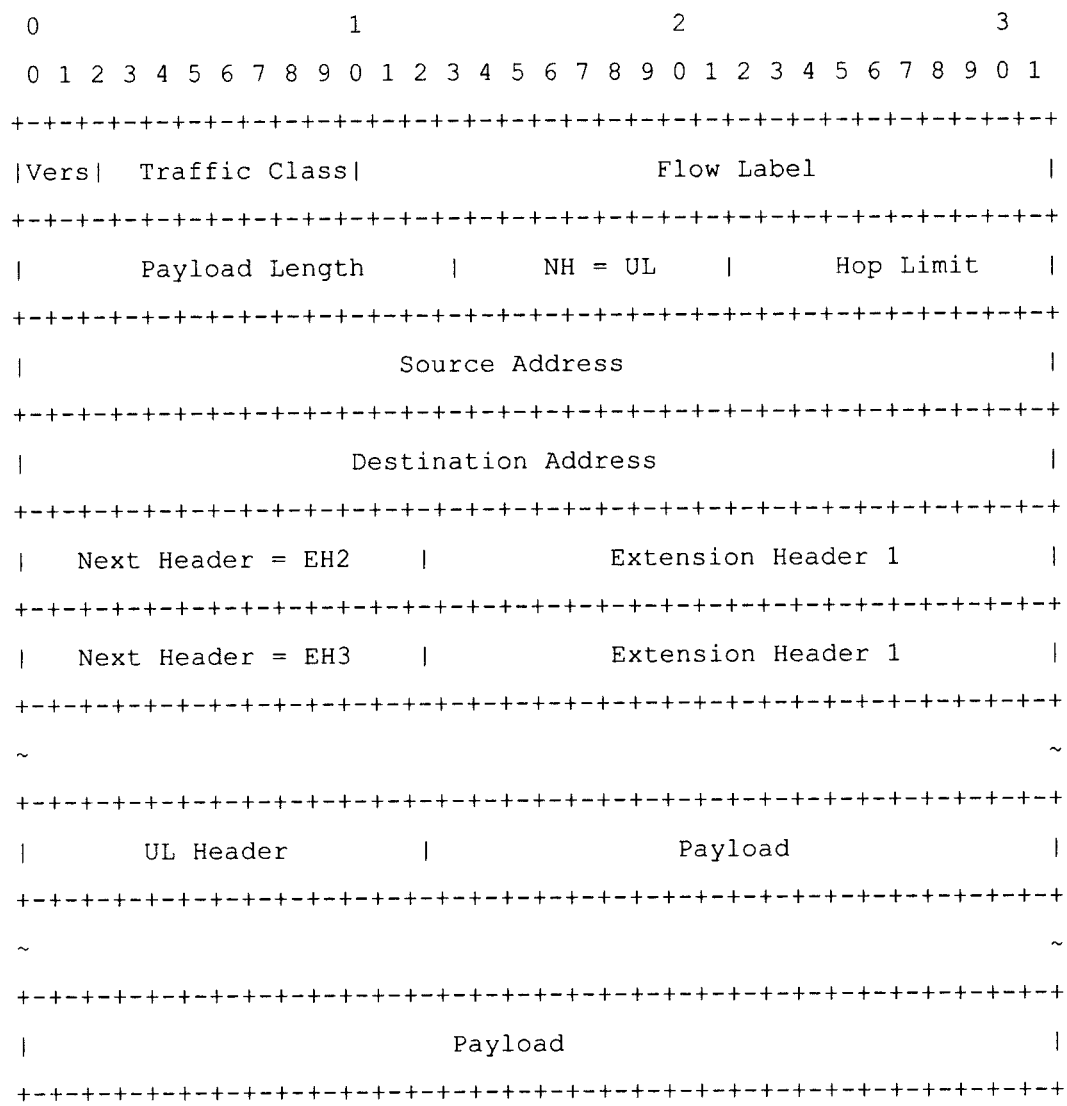
FIG. 14 depicts an example of an IPv6 Header including IPv6 Extension Headers (EHs) configured for use in encoding an EMR as an IPv6 EH.

In IPv6, as indicated above, the EMR may be encoded as an IPv6 Extension Header. Section 4 in RFC 2460 describes several IPv6 Extension Headers (EHs) that may be appended to the IPv6 Header as depicted in FIG. 14.

In general, IPv6 EHs provide control functions needed or useful in various situations, but generally unnecessary for the most common communications. The IPv6 EHs include provisions for timestamps, security, and special routing.

In at least some embodiments, a new IPv6 EH Type may be defined for encoding the EMR. It will be appreciated that the Number for the new IPv6 EH Type may be assigned from unallocated values in the IANA Registry (e.g., although presented with respected to use of "150" as the Number, any other suitable value may be used).

In at least some embodiments, a new IPv6 EH (which may be referred to herein as an IPv6 EMR Header) may be defined for encoding the EMR. In at least some embodiments, the new IPv6 EMR Header defined for encoding the EMR may be defined as depicted in FIG. 15.

The IPv6 EMR Header, as depicted in FIG. 15, includes a Next Header field, a Header Extension Length field, an EMR Type field, a Flags field, and an IPv6-Address-List field.

The IPv6 EMR Header, as indicated above, includes a Next Header field. The Next Header field is an 8-bit selector that identifies the type of header immediately following the IPv6 EMR Header.

The IPv6 EMR Header, as indicated above, includes a Header Extension Length field. The Header Extension Length field includes an 8-bit unsigned integer, which is the length of the IPv6 EMR Header in 8-octet units (excluding the first 8 octets). The header extension length in the Header Extension Length field is equal to two times the number of IPv6-Addresses in the header.

The IPv6 EMR Header, as indicated above, includes an EMR Type field. The EMR Type field indicates the type of the IPv6 EMR Header (e.g., a value of 0 is proposed, although it will be appreciated that other suitable values may be used). It is noted that future extensions may defines subsequent types.

The IPv6 EMR Header, as indicated above, includes a Flags field. The Flags field is an 8 bit field which may be defined as depicted in FIG. 16.

The Flags field, as depicted in FIG. 16, includes an OAM Flag (denoted as an O-flag) and Unused Flags (denoted as a U-Flags). The O-Flag, when set, indicates that the packet is an operations and management (OAM) packet. The U-Flags are unused and reserved for future use (e.g., should be unset on transmission and ignored on receipt).

The IPv6 EMR Header, as indicated above, includes an IPv6-Address-List field. The IPv6-Address-List field is the list of the n IPv6 addresses encoded within the EMR (where, as indicated above, an IPv6 address in the list is either a loopback address of an egress router that is to receive the multicast packet or a tree address).

It is noted that the IPv6 EMR Header is only expected to appear once in the IPv6 multicast packet.

It is noted that, since only the router whose IPv6 address is in the DA field of the IPv6 Header of the IPv6 multicast packet header must inspect the IPv6 EMR Header, the IPv6 address of the next hop of the EMR packet is set as the DA of the IPv6 multicast packet. Thus, the DA of the IPv6 multicast packet changes at each hop of the EMR packet.

In IPv6, as indicated above, the EMR may be encoded as an IP Shim Header. The IP Shim Header may be used under various conditions, but is configured to overcome limitations of IPv6 EHs in encoding IP addresses.

In at least some embodiments, a new IPv6-Shim Layer may be defined for encoding the EMR (and the associated IP-Shim Header may be referred to herein as an IPv6-EMR Shim Header). The IPv6-Shim Layer is configured to carry any "enhancement" related to the IP layer. The IPv6-Shim Layer may be inserted between IP Header (i.e., the IP routing sub-layer) and the upper-layer/transport protocol header (e.g., transport protocols such as TCP, UDP, ICMP, or the like).

In at least some embodiments, the new IPv6-EMR Shim Header defined for encoding the EMR, which may be used by the IPv6-Shim Layer, may be defined as depicted in FIG. 17.

The IPv6-EMR Shim Header, as depicted in FIG. 17, includes a Type field, a Length field, a Next Header field, and a Payload field.

The IPv6-EMR Shim Header, as indicated above, includes a Type field. The Type field is an 8-bit field that indicates that the IP-Shim Header is the type encoding an EMR (and, thus, may be referred to as "IPv6-EMR" as it is carried as a shim for the IPv4 layer). The new IPv6-EMR Shim Header encoding the EMR may be Type 4 (or any other suitable value). It is noted that the IP-Shim Protocol is defined as generic and, thus, may carry different types.

The IPv6-EMR Shim Header, as indicated above, includes a Length field. The Length field is a 16-bit field that carries length of the payload in octets (with the octets of the Type, Length, and Next Header fields being excluded). It is noted that the size of the Payload can be up to 65535 octets.

The IPv6-EMR Shim Header, as indicated above, includes a Next Header field. The Next Header field is indicative of the IP Protocol type of the header next to the IPv6-EMR Shim Header (e.g., TCP, UDP, ICMP, or the like).

The IPv6-EMR Shim Header, as indicated above, includes a Payload field. The Payload field includes the type-specific format for encoding the list of IPv4 addresses encoded within the EMR (where, as indicated above, an IPv6 address in the list is either a loopback address of an egress router that is to receive the multicast packet or a tree address).

In at least some embodiments, the Payload field of the IPv6-EMR Shim Header may have the format depicted in FIG. 18.

The Payload field of the IPv6-EMR Shim Header, as depicted in FIG. 18, includes a Flags field, a RESERVED field, and an IPv6-Address-List field.

The Payload field of the IPv6-EMR Shim Header, as indicated above, includes a Flags field. The Flags field is an 8 bit field which may be defined as depicted in FIG. 19.

The Flags field, as depicted in FIG. 19, includes an OAM Flag (denoted as an O-flag) and Unused Flags (denoted as a U-Flags). The O-Flag, when set, indicates that the packet is an operations and management (OAM) packet. The U-Flags are unused and reserved for future use (e.g., should be unset on transmission and ignored on receipt).

The Payload field of the IPv6-EMR Shim Header, as indicated above, includes a RESERVED field. The RESERVED field is unused and reserved for future use (e.g., is should be unset on transmission and ignored on receipt).

The Payload field of the IPv6-EMR Shim Header, as indicated above, includes an IPv6-Address-List field. The IPv6-Address-List field is the list of the n IPv6 addresses encoded within the EMR (where, as indicated above, an IPv6 address in the list is either a loopback address of an egress router that is to receive the multicast packet or a tree address).

It is noted that the IPv6-EMR Shim Header is only expected to appear once in the IPv6 multicast packet.

It is noted that, since only the router whose IPv6 address is in the DA field of the IPv6 Header of the IPv6 multicast packet header must inspect the IPv6-EMR Shim Header, the IPv6 address of the next hop of the EMR packet is set as the DA of the IPv6 multicast packet. Thus, the DA of the IPv6 multicast packet changes at each hop of the EMR packet.

Figure 20:
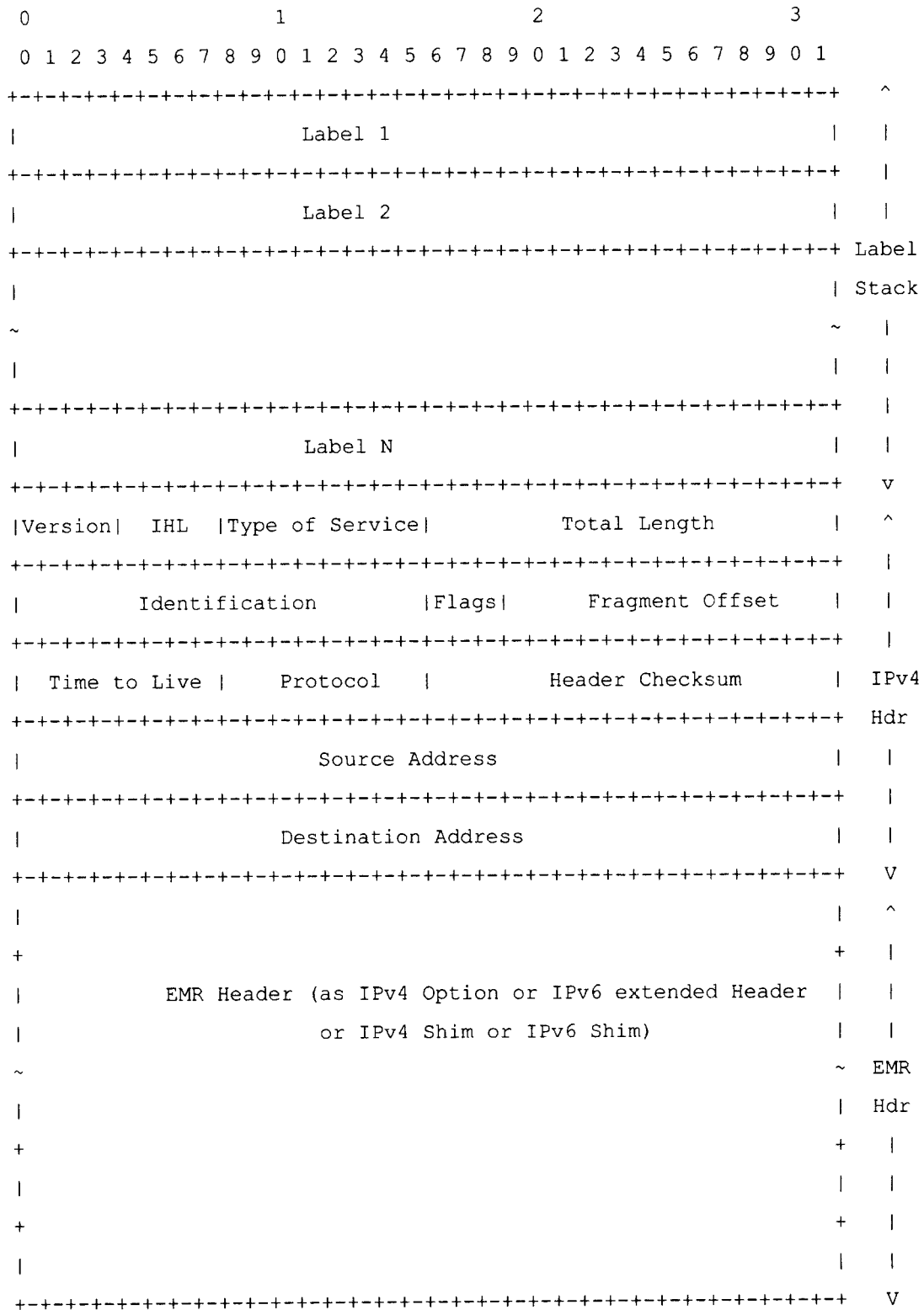
FIG. 20 depicts an example encoding of an EMR over an MPLS-based IGP shortcut.

In at least some embodiments, the encoding of the EMR over MPLS-based IGP shortcuts may be performed as depicted in FIG. 20.

In the encoding of the EMR over MPLS-based IGP shortcuts, as depicted in FIG. 20, the IPv4+EMR Header is encapsulated by a MPLS Label Stack, where the Label Stack represents the LSP used for the IGP shortcut. The encoding is shown in a bottom-up fashion, i.e., the first 4-octet word is nearest to the outermost header in the transmitted or received packet and the last 4-octet word is the farthest from the outermost header in the transmitted or received packet. The Destination Address (DA) in the IPv4 Header is set to the address at the router that terminates the MPLS LSP. When the packet is received by the termination router of the LSP, the last label in the stack would be popped up. In the absence of another label (e.g., an application label, such as a VPRN Label or the like), the LSR assumes the payload of the LSP to be an IP packet and, thus, the IPv4 header is processed. The DA in the IPv4 header indicates a local address and, thus, the router would process the EMR Header. It is noted that, when the LSP used in IGP shortcut is signaled by RSVP-TE, the label stack usually will not exceed more than 3 labels; however, when the LSP is SR-TE, then size of the label stack would depend of the number of network segments encoded in the SR-TE LSP.

In at least some embodiments, the encoding of the EMR over IP source routing based IGP shortcuts may be performed as follows, where embodiments for encoding IPv4-EMR or IPv6-EMR over IPv4 source routed IGP shortcuts are presented and embodiments for encoding IPv4-EMR or IPv6-EMR over IPv6 source routed IGP shortcuts are presented.

In at least some embodiments, the encoding of an IPv4-EMR or an IPv6-EMR over IPv4 source routed IGP shortcuts may be performed as follows.

The Base IPv4 Specification (RFC 791) defined the IPv4 Source Route Options (SSR and LSR Options) which can be used to encode an IPv4 Source Route (e.g., in Section 3.1 of RFC 791); however, chaining together of multiple IPv4 Options is not supported and, thus, it may not be possible to support a combination of EMR Header as IPv4 Option and IP Source Route as IPv4 Option as a chain of IPv4 Options. Accordingly, in at least some embodiments, transporting IPv4-EMR or IPv6-EMR over IPv4 Source Route may be supported using an IPv4-EMR Shim or an IPv6-EMR Shim over an IPv4 Source Route Option, over an IPv4 Source Route Shim, or the like, as well as various combinations thereof.

Figure 21:
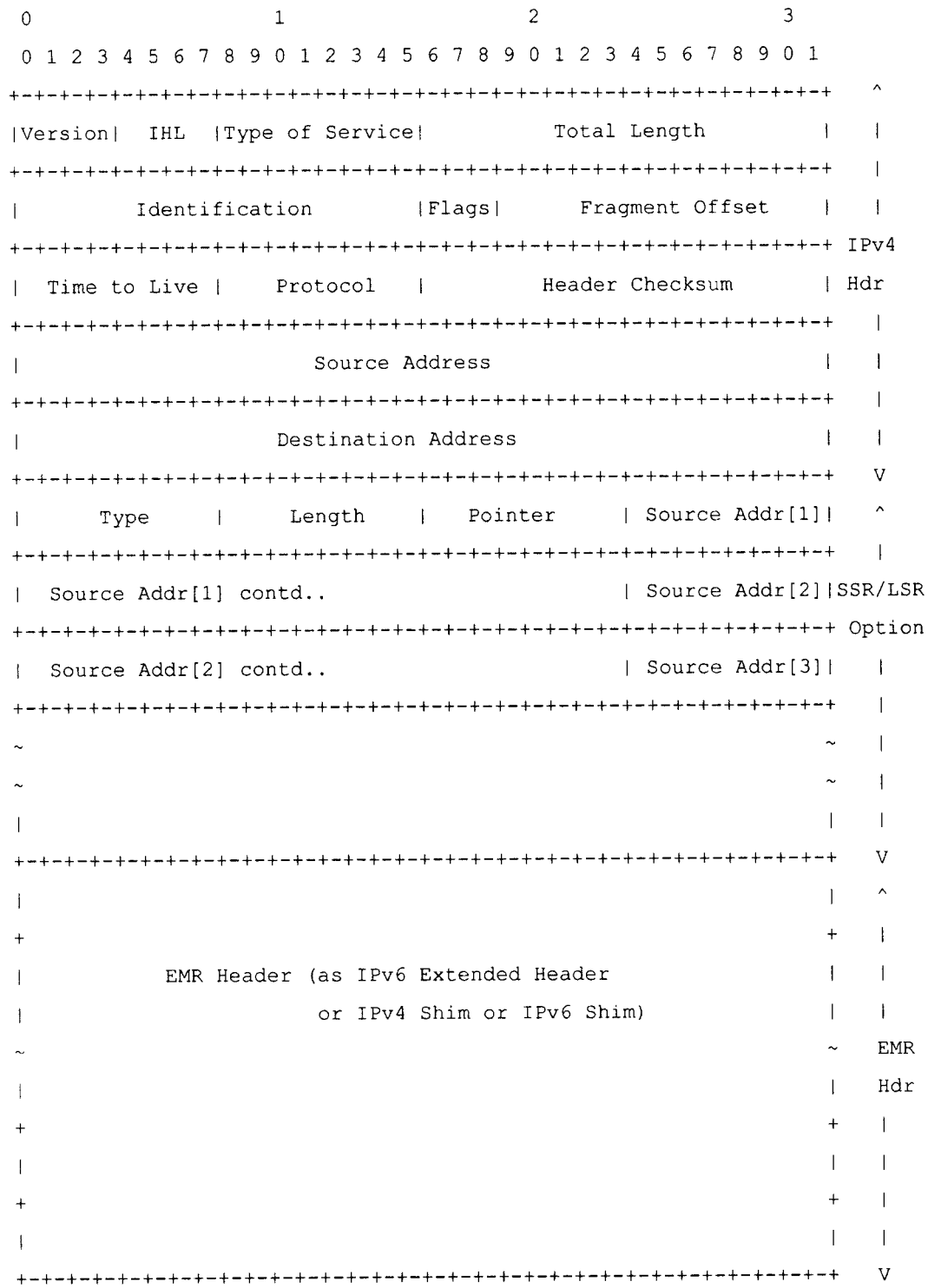
FIG. 21 depicts an example format for transporting an IPv4-EMR Shim or an IPv6-EMR Shim over an IPv4 Source Route Option.

In at least some embodiments, transporting an IPv4-EMR Shim or IPv6-EMR Shim over an IPv4 Source Route Option (SSR or LSR types) may be supported as depicted in FIG. 21.

In the encoding of the IPv4-EMR Shim or IPv6-EMR Shim over an IPv4 Source Route Option (SSR or LSR types), as depicted in FIG. 21, the encoding is shown in a bottom-up fashion, i.e., the first 4-octet word is nearest to the outermost header in the transmitted or received packet and the last 4-octet word is the farthest from the outermost header in the transmitted or received packet. The IPv4 Header and SSR/LSR Option are encoded as per the IPv4 Source Routing rules described in section 3.1 in RFC 791. The packet, until reaching the terminating router of the shortcut, would be forwarded as a unicast packet based on the IPv4 Header and SSR/LSR Option. When the packet is received by the termination router of the shortcut, the IPv4 Header and SSR/LSR Option are removed and EMR Header is processed.

It will be appreciated that transporting an IPv4-EMR Shim or IPv6-EMR Shim over an IPv4 Source Route Option (SSR or LSR types) may be supported in various other ways.

In at least some embodiments, transporting an IPv4-EMR Shim or IPv6-EMR Shim over an IPv4 Source Route Shim may be supported as follows.

The Internet Header Length (IHL) field in the IPv4 header has 4 bits, which represents the number of 32-bit words on the IPv4 header, including the variable number of IPv4 options. As a 4-bit field, the maximum value is 15 words (15×32 bits, or 480 bits=60 bytes). The minimum value of IHL is 5, which indicates a length of 5×32=160 bits=20 bytes, i.e., the fixed size of the IPv4 header excluding IPv4 options. This means that the maximum size of the IPv4 options can be 60−20=40 bytes, which limits the number of IPv4 network segments that can be included within LSR and SSR options. Accordingly, in at least some embodiments, a generic IP Shim Layer may be used to carry explicit source route data in a manner which removes the limits imposed by the IPv4 Header IHL on the number of IPv4 network segments that can be carried as Options. In at least some embodiments, the generic IP Shim Layer may be supported as depicted in FIG. 22 (with two new Types being defined for IPv4 Strict Source Routes (SSRs) and IPv4 Loose Source Routes (LSRs), as discussed further below).

The IPv4 Source Route Shim, as depicted in FIG. 22, includes a Type field, a Length field, a Next Header field, and a Payload that includes a Segments Left field, a Flags field, a RESERVED field, and a Source Address List field.

The IPv4 Source Route Shim, as indicated above, includes a Type field. The Type field supports two new Types being defined for IPv4 SSRs (e.g., having a value of "5" or any other suitable value) and for IPv4 LSRs (e.g., having a value of "6" of any other suitable value).

The IPv4 Source Route Shim, as indicated above, includes a Length field. The Length field is a 16-bit field that carries length of the payload in octets. The octets of the Type, Length, and Next Header fields are excluded.

The IPv4 Source Route Shim, as indicated above, includes a Next Header field. The Next Header field includes the IP Protocol type of the header next to the IP-Shim Header (e.g., TCP, UDP, ICMP, or the like).

The Payload field of the IPv4 Source Route Shim, as indicated above, includes a Segments Left field. The Segments Left field is a 16-bit field that contains the index, in the Source Addr list, of the next hop to inspect. Segments Left is decremented at each Source Addr.

The Payload field of the IPv4 Source Route Shim, as indicated above, includes a Flags field. The Flags field is an 8 bit field which may be defined as depicted in FIG. 23.

The Flags field, as depicted in FIG. 23, includes an OAM Flag (denoted as an O-flag), Carry Flag (denoted as a C-Flag), and Unused Flags (denoted as a U-Flags). The O-Flag, when set, indicates that the packet is an operations and management (OAM) packet. The C-Flag, when unset, indicates that IPv4 Source Route Shim is to be removed when Segments Left field becomes 0 (i.e., the packet reaches the last hop indicated in the IPv4 Source Route Shim), or else carry forward the IPv4 Source Route Shim until the final destination of the packet. The U-Flags are unused and reserved for future use (e.g., should be unset on transmission and ignored on receipt).

The Payload field of the IPv4 Source Route Shim, as indicated above, includes a Source Address List field. The Source Address List field includes a list that includes identification of network segments by their IPv4 addresses.

Figure 24:
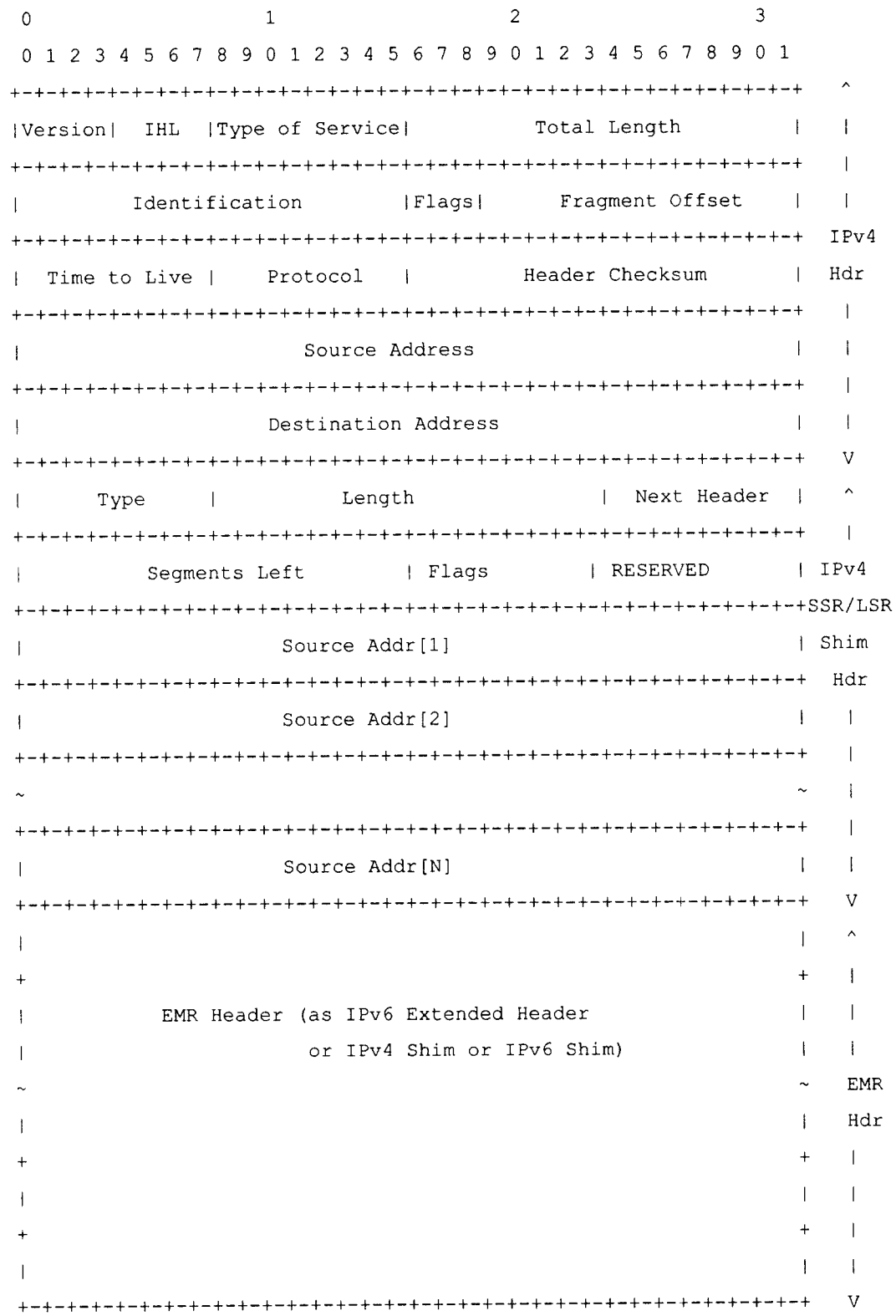
FIG. 24 depicts an example format for an IPv4-EMR Shim or an IPv6-EMR Shim over an IPv4 Source Route Shim.

In at least some embodiment, the format of an IPv4-EMR Shim or IPv6-EMR Shim over an IPv4 Source Route Shim (SSR or LSR types) may be defined as depicted in FIG. 24.

In the encoding of the IPv4-EMR Shim or IPv6-EMR Shim over an IPv4 Source Route Shim (SSR or LSR types), as depicted in FIG. 24, the encoding is shown in a bottom-up fashion, i.e., the first 4-octet word is nearest to the outermost header in the transmitted or received packet and the last 4-octet word is the farthest from the outermost header in the transmitted or received packet. The DA in the IPv4 Header is set to the address of the next network segment to be traversed by the packet. The protocol field in the IPv4 Header must be set to indicate the IP-Shim Protocol. The Next Header field in SSR/LSR Shim Header must be set to one of the following: (1) if the EMR Header is an IPv6 Extended Header then set the type value as EMR-IPv6 Extended Header or (2) if the EMR Header is IPv4-EMR Shim or IPv6-EMR Shim then set the type value as IP Shim Protocol. The C-Flag in SSR/LSR Shim Header is set to 0, such that terminating router of the shortcut path removes the Shim Header. The packet, until being received by the terminating router of the shortcut, would be forwarded as a unicast packet based on the IPv4 Header and the IPv4 SSR/LSR Shim Header. When the packet is received by the terminating router of the shortcut, the IPv4 Header and IPv4 SSR/LSR Shim Header are removed and EMR Header is processed.

It will be appreciated that transporting an IPv4-EMR Shim or IPv6-EMR Shim over an IPv4 Source Route Shim may be supported in various other ways.

It will be appreciated that transporting IPv4-EMR or IPv6-EMR over IPv4 Source Route may be supported using an IPv4-EMR Shim or an IPv6-EMR Shim over an IPv4 Source Route Option or over an IPv4 Source Route Shim in various other ways.

It will be appreciated that the encoding of IPv4-EMR or IPv6-EMR over IPv4 source routed IGP shortcuts may be performed in various other ways.

In at least some embodiments, the encoding of IPv4-EMR or IPv6-EMR over IPv6 source routed IGP shortcuts may be performed as follows.

In at least some embodiments, transporting IPv4-EMR or IPv6-EMR over an IPv6 Source Routed IGP shortcut may be supported using an IPv4-EMR Shim or an IPv6-EMR Shim over an IPv6 Routing Header, over an IPv6 Routing Shim Header, or the like, as well as various combinations thereof.

In at least some embodiments, transporting an IPv4-EMR Shim or IPv6-EMR Shim over an IPv6 Routing Header may be supported as follows.

The IPv6 Protocol in defined in RFC 2460 (namely, in Section 4.4 in RFC 2460). Section 4.4 in RFC 2460 defines an EH type 0 which is a "Routing Header" which is used for source routing in IPv6. The format of an IPv6 Routing Header is depicted in FIG. 25.

The IPv6 Routing Header, as depicted in FIG. 25, includes a Next Header field, a Header Extension Length field, a Routing Type field, a Segments Left field, a Reserved field, and an IPv6 Address List field.

The IPv6 Routing Header, as indicated above, includes a Next Header field. The Next Header field is an 8-bit selector that identifies the type of header immediately following the IPv6 Routing Header. This may use the same values as the IPv4 Protocol field (e.g., [RFC-1700 et seq.]).

The IPv6 Routing Header, as indicated above, includes a Header Extension Length field. The Header Extension Length field includes an 8-bit unsigned integer, which is the length of the IPv6 Routing Header in 8-octet units (excluding the first 8 octets). For the Type 0 IPv6 Routing Header, the header extension length in the Header Extension Length field is equal to two times the number of IPv6 Addresses in the header.

The IPv6 Routing Header, as indicated above, includes an Routing Type field. The Routing Type field indicates the type of the IPv6 Routing Header (e.g., a value of 0 is used for the IPv6 EH).

The IPv6 Routing Header, as indicated above, includes a Segments Left field. The Segments Left field includes an 8-bit unsigned integer indicative of the number of route segments remaining, i.e., the number of explicitly listed intermediate routers still to be visited before reaching the final destination.

The IPv6 Routing Header, as indicated above, includes a Reserved field. The Reserved field is unused and reserved for future use (e.g., is should be unset on transmission and ignored on receipt).

The IPv6 Routing Header, as indicated above, includes an IPv6 Address List field. The IPv6 Address List field is the list of the n IPv6 addresses encoded within the Routing Header as an Address[ ] vector).

It is noted that, if Segments Left is 0, the source route is considered as empty (and the recorded route is full) and the routing is to be based on the Destination Address field in IPv6 Header.

It is further noted that, if the address in Destination Address field has been reached and the Segments Left is not 0, the next address in the source route (=Address [n-Segments_Left+1]) replaces the address in the Destination Address field, and the replaced Destination Address is recorded in Address[n-Segments_Left+1], and Segments_Left is decremented by 1). Thus, the packet gets forwarded along each hop specified in the Address[ ] vector.

Figure 26A:
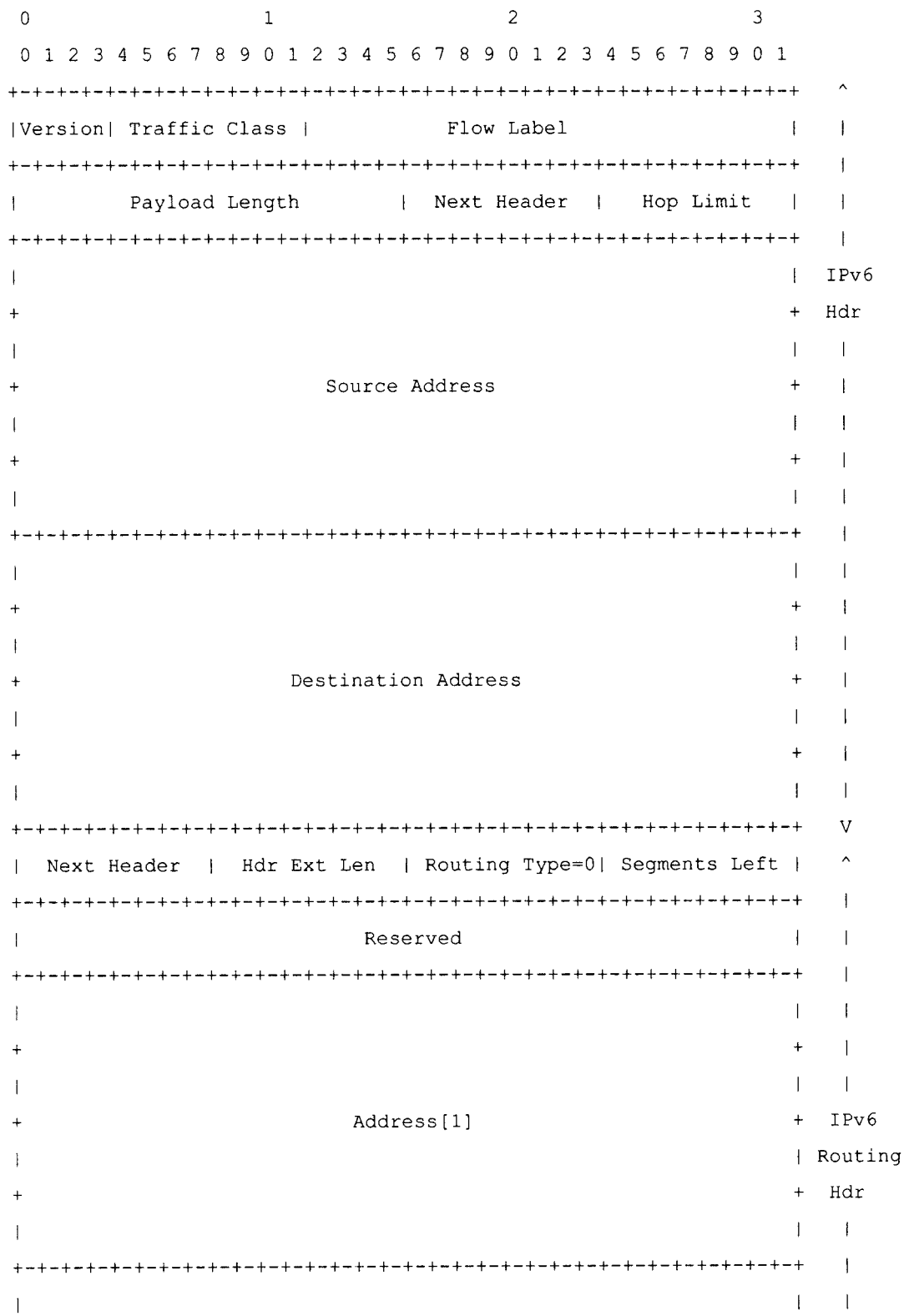

In at least some embodiments, the format of an IPv4-EMR Shim or IPv6-EMR Shim over an IPv6 Routing Header may be as depicted in FIGS. 26A-B.

In the encoding of the IPv4-EMR Shim or IPv6-EMR Shim over an IPv6 Routing Header, as depicted in FIGS. 26A-B, the encoding is shown in a bottom-up fashion, i.e., the first 4-octet word is nearest to the outermost header in the transmitted or received packet and the last 4-octet word is the farthest from the outermost header in the transmitted or received packet. The IPv6 Header and IPv6 Routing Header may be encoded as per the IPv6 Source Routing rules described in Section 4.4 in RFC 2460. The Next Header field in the IPv6 Routing Header may be set to the IP Shim Protocol (to indicate that the EMR Header is included). The packet, until reaching the terminating router of the IGP shortcut, would be forwarded as unicast packet based on the IPv6 Header and IPv6 Routing Header. When the packet is received by the terminating router of the IGP shortcut, the IPv6 Header and IPv6 Routing Header are removed and the EMR Header is processed.

It will be appreciated that, although primarily presented with respect to embodiments in which the IPv4-EMR Shim or IPv6-EMR Shim are encoded within an IPv6 Routing Header, in at least some embodiments the IPv4-EMR Shim or IPv6-EMR Shim may be encoded within an IPv6 Segment Routing Header. Segment Routing defined a new type of IPv6 Extension Header (referred to as the "Segment Routing Header") which offers the same functionality as the IPv6 Routing Header, but with some additional changes in format. The definitions of the Segment Routing Header can be found in the IPv6 Segment Routing Header (SRH). The IPv4-EMR Shim or IPv6-EMR Shim may be encoded within an IPv6 Segment Routing Header in a manner similar to that described above for encoding of the IPv4-EMR Shim or IPv6-EMR Shim within an IPv6 Routing Header (e.g., by replacing the IPv6 Routing Header with the IPv6 Segment Routing Header).

It will be appreciated that transporting an IPv4-EMR Shim or IPv6-EMR Shim over an IPv6 Routing Header may be supported in various other ways.

In at least some embodiments, transporting an IPv4-EMR Shim or IPv6-EMR Shim over an IPv6 Routing Shim Header may be supported as follows.

In at least some embodiments, the IPv6 Routing Shim Header may be defined using a new IP Shim Type (e.g., Type 7 or using any other suitable Type value), which indicates that the IPv6 Routing Shim Header is to be carried as a shim for the IPv6 layer. In general, the only node that is allowed to inspect the IPv6 Routing Shim Header is the node corresponding to DA of the packet. In at least some embodiments, the format for the IPv6 Routing Shim Header may be as depicted in FIG. 27.

The IPv6 Routing Shim Header, as depicted in FIG. 27, includes a Segments Left field, a Flags field, a RESERVED field, and an Address List field.

The IPv6 Routing Shim Header, as indicated above, includes a Segments Left field. The Segments Left field is a 16-bit field that contains the index, in the Address[ ] List, of the next hop to inspect. The Segments Left value is decremented at each IPv6 Address.

The IPv6 Routing Shim Header, as indicated above, includes a Flags field. The Flags field is an 8 bit field which may be defined as depicted in FIG. 28.

The Flags field, as depicted in FIG. 28, includes an OAM Flag (denoted as an O-flag), a Carry Flag (denoted as a C-Flag), and Unused Flags (denoted as a U-Flags). The O-Flag, when set, indicates that the packet is an operations and management (OAM) packet. The C-Flag, when unset, means remove this IPv6-Shim Header when Segments Left becomes 0, or else carry forward the IPv6-Shim Header in the packet. The U-Flags are unused and reserved for future use (e.g., should be unset on transmission and ignored on receipt).

The IPv6 Routing Shim Header, as indicated above, includes a RESERVED field. The RESERVED field is unused and reserved for future use (e.g., is should be unset on transmission and ignored on receipt).

The IPv6 Routing Shim Header, as indicated above, includes an IPv6-Address-List field. The IPv6-Address-List field is the list of the n IPv6 addresses encoded within the EMR.

It is noted that, if Segments Left is 0, the source route is considered as empty (and the recorded route is full) and the routing is to be based on the Destination Address field in IPv6 Header.

It is noted that, if the address in Destination Address field has been reached and the Segments Left is not 0, the next address in the source route (=Address [n-Segments_Left+1]) replaces the address in the Destination Address field, and the replaced Destination Address is recorded in Address[n-Segments_Left+1], and Segments_Left is decremented by 1. Thus, the packet gets forwarded along each hop specified in the Address[ ] vector.

Figure 29A:
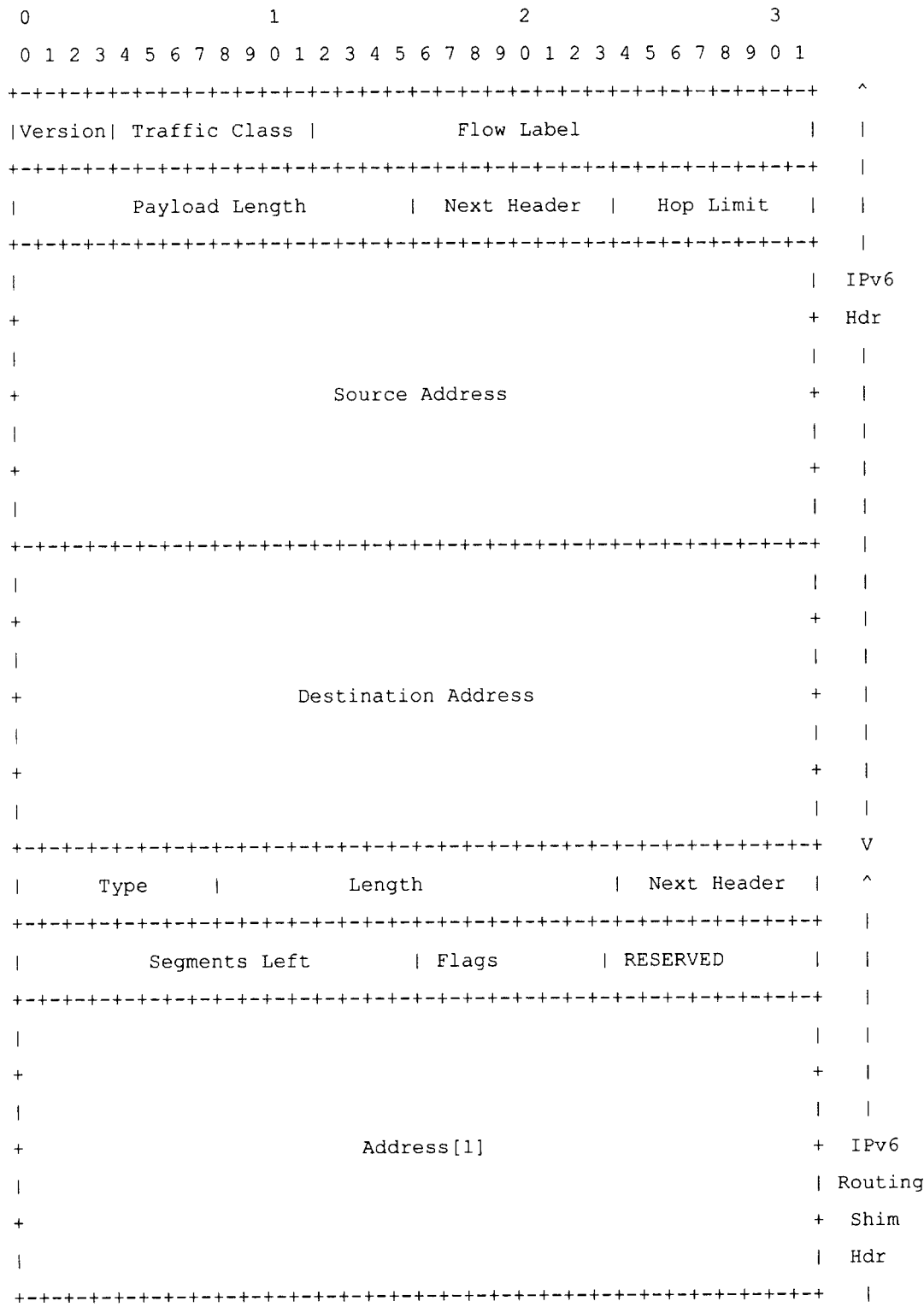
FIGS. 29A-B depict an example format for an IPv4-EMR Shim or an IPv6-EMR Shim over an IPv6 Routing Shim Header.
Figure 29B:
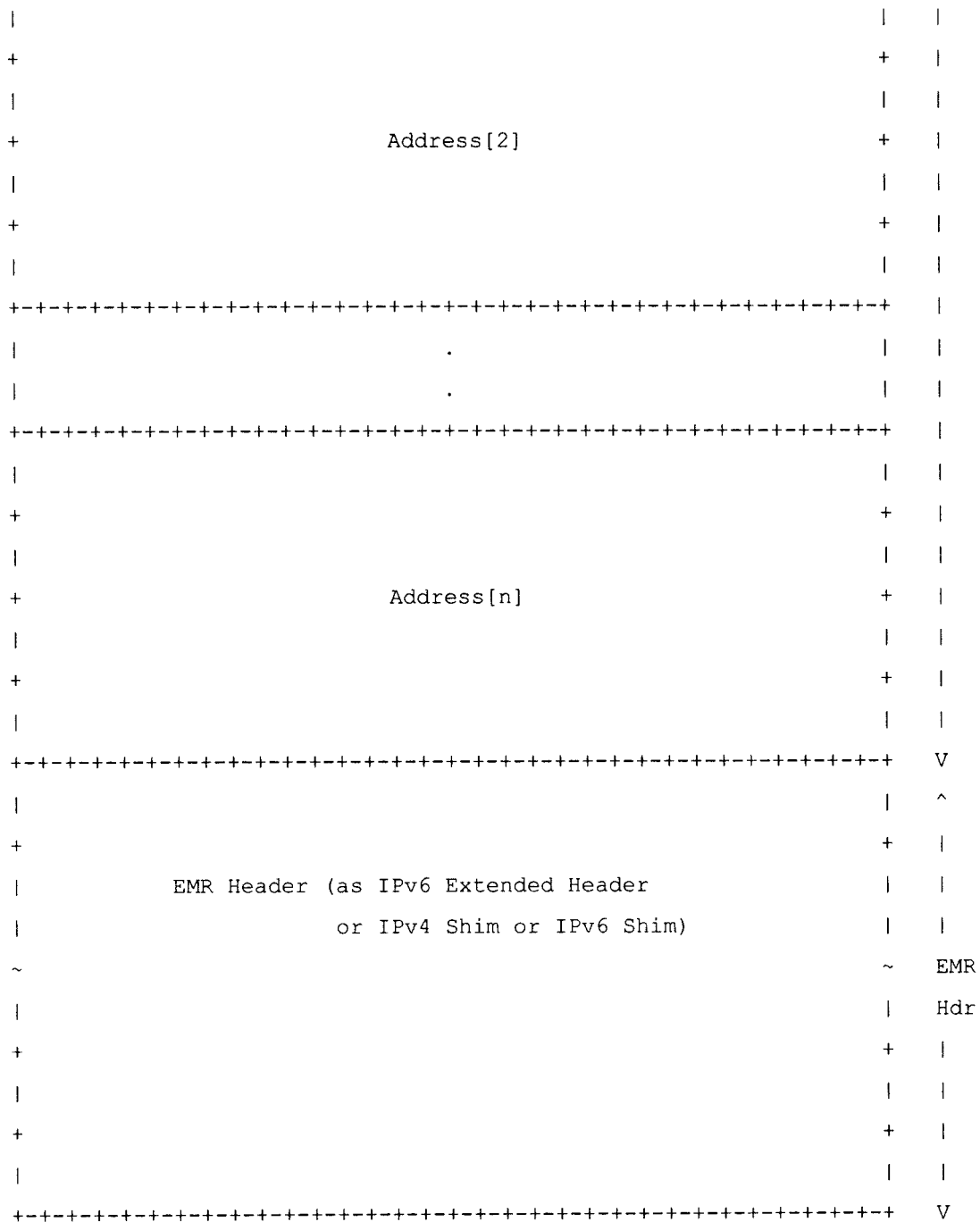

In at least some embodiments, the format of an IPv4 EMR Shim or IPv6-EMR Shim over an IPv6 Routing Shim Header is as depicted in FIGS. 29A-B.

In the format of an IPv4 EMR Shim or IPv6-EMR Shim over an IPv6 Routing Shim Header, as depicted in FIGS. 29A-B, the encoding is shown in bottom-up fashion, the first 4-octet word is nearest to the outermost header in the transmitted or received packet and the last 4-octet word is the farthest from the outermost header in the transmitted or received packet. The DA in the IPv6 Header may be set to the next segment to be traversed (picked up from the Address[ ] list in IPv6 Routing Shim Header). The Next Header field in IPv6 Header is set as IP Shim Protocol to indicate the IPv6 Routing Shim Header. The Next Header field in the IPv6 Routing Shim Header is set as one of the following: (1) if the EMR Header is an IPv6 Extended Header then set the type value of EMR-IPv6 Extended Header or (2) if EMR Header is an IPv4-EMR Shim or IPv6-EMR Shim then set the type value as IP Shim Protocol. The C-flag in the IPv6 Routing Shim Header may be set to 0, such that terminating router of the shortcut path removes the Shim Header. The packet, until reaching the terminating router of the IGP shortcut, would be forwarded as a unicast packet based on the IPv6 Header and IPv6 Routing Shim Header. When the packet is received by the termination router of the IGP shortcut, the IPv6 Header and IPv6 Routing Shim Header are removed and EMR Header is processed.

It will be appreciated that transporting an IPv4-EMR Shim or IPv6-EMR Shim over an IPv6 Routing Shim Header may be supported in various other ways.

It will be appreciated that transporting IPv4-EMR or IPv6-EMR over an IPv6 Source Routed IGP shortcut may be supported using an IPv4-EMR Shim or an IPv6-EMR Shim over an IPv6 Routing Header or over an IPv6 Routing Shim Header in various other ways.

It will be appreciated that the encoding of IPv4-EMR or IPv6-EMR over IPv6 source routed IGP shortcuts may be performed in various other ways.

It will be appreciated that the encoding of the EMR over IP source routing based IGP shortcuts (e.g., encoding IPv4-EMR or IPv6-EMR over IPv4 source routed IGP shortcuts, encoding IPv4-EMR or IPv6-EMR over IPv6 source routed IGP shortcuts, or the like) may be performed in various other ways.

In at least some embodiments, as indicated hereinabove, stateless IP multicast may be implemented based on use of the tree address. It is noted that the tree address may be used for Model-B. In Model-B, the single address that is used to represent a stateless IP multicast is a tree address.

In IPv4, the tree address may be allocated from a private-use address block as defined and reserved in the IANA registry of IPv4 Special Purpose Addresses. The IANA registry of IPv4 Special Purpose Addresses defines the following address blocks to be used for private use: (1) 10.0.0.0/8, (2) 172.16.0.0/12, and (3) 192.168.0.0/16. The term "IPv4 Tree Address Space" may be used herein to denote the private-use address blocks as defined and reserved in the IANA registry of IPv4 Special Purpose Addresses.

In IPv6, the tree address may be allocated from the IPv6 Unique Local Address (ULA) block, as defined in Section 3 of RFC 4193 and reserved in the IANA registry of IPv6 Special Purpose Addresses, which can be used in private/local communications within IPv6 networks. The IANA registry reserves the following ULA block containing 72-trillion IPv6 addresses: FC00::/7. The term "IPv6 Tree Address Space" may be used herein to denote the ULA blocks as reserved in the IANA registry of IPv6 Special Purpose Addresses.

In IPv4-mapped IPv6, the tree address may be allocated from a private-use address block as defined and reserved in the IANA registry of IPv4 Special Purpose Addresses. Section 2.5.5.2 in RFC 4291 defines the concept of IPv4-mapped IPv6 addresses, which are regular IPv4 addresses that have been mapped into the IPv6 address space and which are used for devices that are only IPv4 capable. In an IPv4 network where the IPv4-mapped IPv6 addressing scheme is used, the tree address may be allocated from one of the private-use IPv4 address blocks discussed above. The term "IPv6 Tree Address Space" also may be used herein to denote the blocks of private-use IPv4 mapped IPv6 addresses.

It is noted that the term "Tree Address Space" may be used to refer to the combination of the "IPv4 Tree Address Space" and the "IPv6 Tree Address Space".

In general, a tree address is locally significant to the ingress router of the stateless IP multicast tree that is represented by the tree address. The ingress router of the stateless IP multicast tree allocates the tree address from its local Tree Address Space. As such, tree addresses assigned to stateless IP multicast trees originating from different ingress routers may overlap. In Model-B, a tree address is programmed only at the gateway router as the tree address is only locally significant to the gateway router (i.e., the tree address is allocated from the Tree Address Space of the gateway router). A tree address translates to the EMR that encodes the child egress routers of the stateless IP multicast tree associated with the tree address. An example of programming of a tree address at an ingress router is presented in FIG. 30. It will be appreciated that a tree address also may be programmed in other use cases (e.g., for IP source routing in stateless IP multicast, as presented with respect to FIG. 6).

Figure 30:
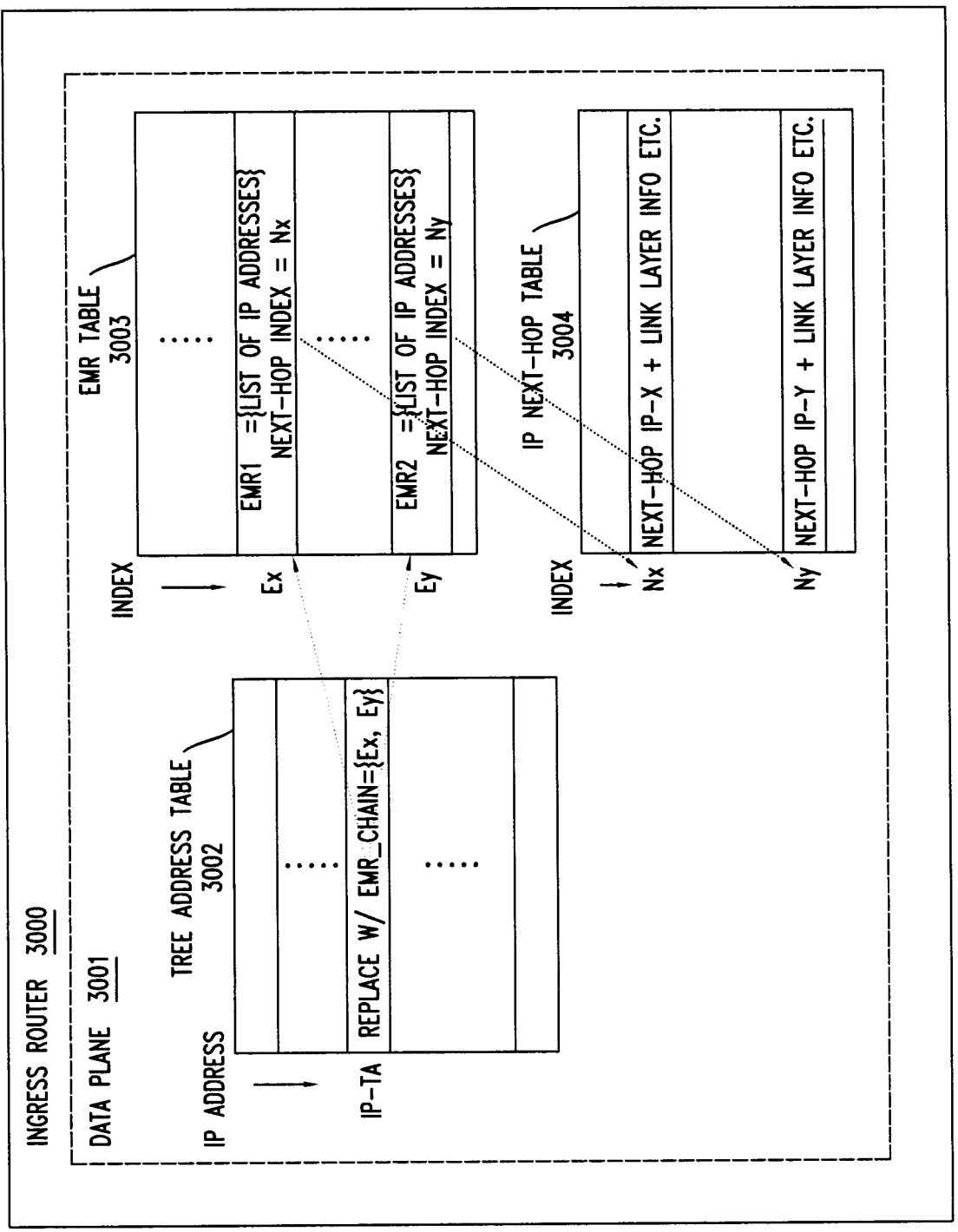
FIG. 30 depicts an example embodiment of an ingress router for illustrating an example embodiment of programming of a tree address in a data plane of an ingress router.

FIG. 30 depicts an example embodiment of an ingress router for illustrating an example embodiment of programming of a tree address in a data plane of an ingress router.

In FIG. 30, an ingress router 3000 includes a data plane 3001. In the data plane 3001 of the ingress router 3000, an exemplary tree address (TA) of an exemplary tree is programmed. The data plane 3001 includes the following three tables to map the tree address to its EMR: a Tree Address Table 3002, an EMR Table 3003, and an IP Next-Hop Table 3004. It will be appreciated, although omitted from FIG. 30 for purposes of clarity, a separate set of tables can be maintained for each IP version (namely, IPv4 and IPv6).

The Tree Address Table 3002 is indexed by the tree address (TA in FIG. 30) and the starting point for processing a tree address. An entry in Tree Address Table 3002 includes indices to the EMR Table 3003. It is noted that, although, conceptually, a tree address maps to a single EMR, for optimization the EMR can be segregated into individual EMRs per next-hop(s) and, thus, it can map to multiple entries in the EMR Table 3003.

The EMR Table 3003 is indexed by a number (e.g., Ex in FIG. 30) and an entry in the EMR Table 3003 includes the list of IP addresses of an EMR, wherein all IP addresses are routable to a common next-hop. The entry of the EMR Table 3003 also includes the index to the IP Next-Hop Table 3004.

The IP Next-Hop Table 3004 is indexed by a number (e.g., Ny in FIG. 30) and an entry in IP Next-Hop Table 3004 includes the required information for forwarding a packet to an immediate next-hop. It is noted that the IP Next-Hop Table 3004 may already exist in the IP dataplane for unicast IP packet forwarding. An entry in the IP Route Table (not shown in FIG. 30) includes the index to the IP Next-Hop Table 3004, which indicates the next-hop for the IP Route Table entry.

As per the data plane state in the data plane 3001 of the ingress router 3000, if TA is an IP address to be processed by the ingress router 3000, then the following actions may be performed in the following order:

1. Looks up the entry for TA in the Tree Address Table 3002. The entry for TA in the Tree Address Table 3002 indicates that the TA in the packet is to be replaced with the EMRs indexed at Ex, Ey.

2. Looks up the entry for Ex in the EMR Table 3002, builds the EMR packet from the list of IP addresses, and forwards the packet to next-hop identified by Nx.

3. Looks up the entry for Ey in the EMR Table 3002, builds the EMR packet from the list of IP addresses, and forwards the packet to next-hop identified by Ny.

In at least some embodiments, as indicated hereinabove, stateless IP multicast may be implemented based on use of the TAG address. It is noted that the TAG address may be used for Model-B. When a tree address is encoded in the EMR, it may be encoded in the context of the gateway router that owns the tree address. The encoding of the tree address in the context of its gateway router is referred to as a TAG address (which may be denoted by the tuple <tree address, gateway address>). An example of the encoding of a TAG address is depicted in FIG. 31.

The TAG address, as depicted in FIG. 31, includes a Tree Address field and a Gateway Address field.

The TAG address, as indicated above, includes a Tree Address field. The Tree Address field includes the tree address, which identifies the stateless IP multicast tree that originates at the gateway router indicated in the Gateway Address field.

The TAG address, as indicated above, includes a Gateway Address field. The Gateway Address field includes the loopback IP address of the gateway router at which the stateless IP multicast tree, identified by the tree address indicated in the Tree Address field, originates.

It is noted that, when an IP address in an EMR is identified as a tree address (i.e., the address is from the Tree Address Space, then the receiver is expected to interpret the next IP address in the list of IP addresses as the associated gateway address (e.g., based on the TAG Address encoding indicated above, in which the Gateway Address field follows the Tree Address field). The encoding of the TAG Address within the IPv4-EMR Option, the IPv4-EMR-Shim Header, the IPv6-EMR Extension Header, and the IPv6-EMR-Shim Header may be further understood with respect to the following examples.

In at least some embodiments, for example, the encoding of a TAG Address within the IPv4-EMR Option may be provided as depicted in FIG. 32.

In at least some embodiments, for example, the encoding of a TAG Address within the IPv4-EMR-Shim Header (within the Payload field) may be provided as depicted in FIG. 33.

In at least some embodiments, for example, the encoding of a TAG Address within the IPv6-EMR Extension Header may be provided as depicted in FIG. 34.

In at least some embodiments, for example, the encoding of a TAG Address within the IPv6-EMR-Shim Header (within the Payload field) may be provided as depicted in FIG. 35.

In at least some embodiments, the framework for stateless IP multicast may be considered to include a stateless IP multicast layer and a multicast flow overlay on top of the stateless IP multicast layer. The multicast flow overlay uses the stateless IP multicast layer for stateless IP multicast of a packet for a flow. The multicast flow overlay may include the set of protocols and procedures that enabled the following functions: (1) when an ingress router receives a multicast data packet from outside the stateless IP multicast domain, the ingress router determines the set of egress routers (e.g., the loopback addresses for the egress routers) for that packet and this information may be provided by the multicast flow overlay and (2) when an egress router receives an EMR packet from inside the stateless IP multicast domain, the egress router determines how to further forward the packet and this information is provided by the multicast flow overlay. This may be further understood by way of an example associated with FIG. 3. For example, assume that in the exemplary flow in FIG. 3, the ingress and the egress routers are PE routers providing a Multicast Virtual Private Network (MVPN) service. The multicast flow overlay includes the protocols and procedures between ingress router 1 and all of the egress routers 2-13 as described in RFC 6513 and RFC 6514. The MVPN signaling described in these RFCs enables an ingress router to determine the set of egress routers for a given multicast flow (or set of flows) and enables an egress router to determine the virtual routing and forwarding tables (VRFs) to which multicast packets from the backbone network are to be sent. MVPN signaling also has several components that depend on the type of tunneling technology used to carry multicast data through the network. For example, in FIG. 3, MVPN routes will be advertised by a PE (i.e., routers 1-13) with its loopback address as the next-hop for MVPN routes. When router 1 wants to multicast to a specific MVPN route destination, it determines the loopback addresses of egress routers 2-13 that would receive the packet. A loopback address of an egress router is translated to the unicast IP route to that egress router, and the stateless IP multicast layer is used to multicast the packet. It will be appreciated that MVPN is just one example of a multicast flow overlay and that the multicast flow overlay may be implemented in other ways (e.g., using a centralized controller (e.g., an SDN controller) or the like).

Various example embodiments for supporting stateless IP multicast may be configured to support handling of multicast packets based on stateless IP multicast, where handling of multicast packets based on stateless IP multicast may include origination of multicast packets by ingress routers, processing of multicast packets by transit routers, processing of multicast packets by egress routers, or the like, as well as various combinations thereof. The handling of EMR packets by routers, as discussed herein, may be performed based on Model-A or Model-B, various embodiments of which are discussed further below.

Various example embodiments for supporting stateless IP multicast may be configured to support handling of multicast packets based on stateless IP multicast using Model-A.

In at least some embodiments, origination of an EMR packet by an ingress router in Model-A may be performed using the following process.

1. The inputs to the process may include (a) Payload (which is the payload to be multicast with EMR) and (b) List_of_Egress_Routers[ ] (which is a list of egress routers for the multicast flow, where each entry in the list may identify the respective egress router (e.g., using the loopback addresses of the egress routers or other suitable identifiers)). This may be referred to as EMR_Multicast_Model_A (Payload, List_of_Egress_Routers[ ]), which may be an entry point for stateless IP Multicast for Model-A.

2. The ingress router obtains a payload to be multicast (e.g., from an upper layer, in a packet from another device, or the like). The ingress router, if this is the first packet for the multicast flow, sends, to the centralized controller, a resolution request for the centralized controller to classify the egress routers (from the List_of_Egress_Routers[ ], which is included as part of the resolution request) into groups. This resolution request may be referred to as Send-GroupResolutionRequest_Model_A(List_of_Egress_Routers).

3. The centralized controller receives the resolution request from the ingress router. The centralized controller, based on receipt of a resolution request from an ingress router, classifies the egress routers (from the List_of_Egress_Routers[ ] included in the resolution request) into groups. The result is a list of mappings of group identifiers of the groups to the egress routers included in the groups, respectively. The centralized controller sends the list of mappings of group identifiers of the groups to the egress routers included in the groups back to the ingress router as a resolution response. This resolution response may be referred to as GroupResolutionResponse_Model_A(List_of_Groupwise_Egress_Routers[ ]), where the (List_of_Groupwise_Egress_Routers[ ]) element represents the list of mappings of group identifiers of the groups to the egress routers included in the groups (which may be indicated using <Group-id, List_of_Child_Egress_Routers[ ]>.

4. The ingress router receives the resolution response from the centralized controller. The ingress router, based on the resolution response from the centralized controller, multicasts the payload to each of the egress routers (e.g., based on List_of_Groupwise_Egress_Routers[ ] that is received in the resolution response). This multicasting of the payload by the ingress router based on the resolution response received from the centralized controller may be referred to as EMR_Multicast_Proceed_Model_A(Payload, List_of_Groupwise_Egress_Routers[ ]).

4.1. The ingress router initializes a list, where each entry in the list is the tuple of <Group-id, Next-hop, AddressList>, where AddressList is the list of IP addresses of a group packet to each next-hop. Here, AddressList is of the type {numAddresses, Address[ ]}. The list, which may be referred to as a next-hop address list (which may be denoted as NextHopAddressList[ ]), is initialized to be NULL to start. This may be denoted as NextHopAddressList (List_of_<Group-id, NextHop, AddressList>NextHopAddressList[ ])=0.

4.2. The ingress router performs an iterative process for each group in the list of mappings of group identifiers of the groups to the egress routers included in the groups (i.e., for each of the <Group-id, List_of_Child_Egress_Routers[ ]> entries included in the List_of_Groupwise_Egress_Routers[ ]). The iterative process may include the following iterative process which may be performed for each of the egress routers in the selected group of egress routers (e.g., each loopback address in List_of_Child_Egress_Routers[ ]):

4.2.1. The ingress router, for each of the egress routers in the selected group of egress routers (e.g., for each loopback address in List_of_Child_Egress_Routers [ ]), performs a lookup in the IP Route Table of the ingress router to map the egress router (e.g., the loopback address of the egress router) to the Next-Hop entry of the ingress router that includes the loopback address and next-hop address for the egress router. This may be denoted as NextHop NH=Route_Table[Address].

4.2.2. The ingress router looks up the entry corresponding to the next-hop for the group in the next-hop address list. This may be denoted as NextHopEntry=NextHopAddressList[Group-id+NH].

4.2.3. The ingress router, based on a determination that the next-hop for the group does not exist in the next-hop address list (e.g., next-hop for Group-id does not exist in NextHopAddressList), creates the next-hop for the group and adds the next-hop for the group to the next-hop address list. This may be denoted as, if NextHopEntry not found, then (1) NextHopEntry=new <Group-id, NH, AddressList=empty> and (2) NextHopAddressList [Group-id+NH]=NextHopEntry.

4.2.4. The ingress router then inserts the loopback address of the egress router into the address list of the next-hop. This may be denoted as (1) NextHopEntry→AddressList. Address[NextHopEntry→AddressList.numAddresses]=Address and (2) NextHopEntry→AddressList.numAddresses= NextHopEntry→AddressList.numAddresses+1.

4.3. The ingress router then builds a copy of the packet for each next-hop in each group, pushes the EMR onto each of the copies of the packet, and forwards the copies of the packets to the next-hops of the groups. This may be considered to include performing the following operations for each <Group-id, NextHop, AddressList> in NextHopAddressList[ ]: (1) create the copy of the packet and push the EMR onto the packet (which may be denoted as PacketCopy=EMR(AddressList)+Copy(Payload)) to form an EMR packet and (2) forward the EMR packet to the next-hop (which may be denoted as PacketSend(PacketCopy, NextHop)). With respect to PacketSend(PacketCopy, NextHop), which sends the EMR packet to the next hop (NextHop) by adding appropriate encapsulations (e.g., depending on whether the next hop is a typical unicast IP route or an IGP shortcut), it is noted that PacketSend(PacketCopy, NextHop) may be performed as follows:

4.3.1. The ingress router determines whether the next hop (NextHop) is a typical unicast IP route or an IGP shortcut.

4.3.2. The ingress router, based on a determination that the next hop is a typical unicast IP route, adds a link layer header to the packet and sends the packet. This may be denoted as (1) Packet=NextHop→LinkLayerHeader+Packet and (2) Send(Packet).

4.3.3. The ingress router, based on a determination that the next hop is an IGP shortcut, determines the type of IGP shortcut in order to determine appropriate handling of the packet based on the type of IGP shortcut. The IGP shortcut, as indicated above and discussed further below, may be an MPLS IGP shortcut (e.g., RSVP-TE tunnel or SR-TE tunnel) or an IP Source Routed IGP Shortcut (e.g., IP SR-TE).

4.3.3.1. The ingress router, based on a determination that an MPLS IGP shortcut (e.g., RSVP-TE tunnel or SR-TE tunnel) is being used (which may be denoted as "if (NextHop→IGPShortcutIsMPLS=true)"), may perform the following processing. The ingress router determines the label stack to push for the shortcut LSP (which may be denoted as <numLabels, Label[ ]> LabelStack). The ingress router looks up the MPLS FTN Table for the shortcut LSP (which may be denoted as FTN_Entry=FTN_Table[NextHop→IGPShortcutLsp]). The ingress router looks up the first NHLFE (which may be denoted as NHLFE=NHLFE_Table[FTN_Entry→NHLFE]). The ingress router determines and keeps track of the last NHLFE (which may be denoted as LastNHLFE=NHLFE), although it is noted that this last NHLFE does not need to be encoded into the label stack since it is the immediate next hop to which the packet will be sent. The ingress router then fills the label stack from the bottom to the top starting with the first NHLFE which starts with the bottom most label nearest to the payload (which may be denoted as LabelIndex=NHLFE→NumNext−1). The ingress router, for each NHLFE and, thus, for each label to be encoded into the label stack, processes the NHLFE to encode the associated label into the label stack where such processing for a given NHLFE may include the following operations: (1) LabelStack.Label[LabelIndex]=NHLFE→Label, (2) LabelStack.numLabels=LabelStack.num Labels+1, (3) LabelIndex=LabelIndex−1, (4) LastNHLFE=NHLFE, and (5) NHLFE=NHLFE_Table[NHLFE→Next]. The ingress router, based on a determination that the IGP shortcut is an MPLS SR-TE tunnel, then inserts the label stack except for the first label that came from the last NHLFE (which may be denoted as "If (NextHop→IGPShortcutSRM-PLS)" then "LabelStack.Label[ ]=LabelStack.Label[ ]−LabelStack.Label[0]"). The ingress router may then use the EMR on MPLS stack encoding functions as discussed above in order to form the packet (which may be denoted as Packet=LastNHLFE→LinkLayerHeader+Label-Stack.Label[ ]+Packet).

4.3.3.2. The ingress router, based on a determination that an IP Source Routed IGP shortcut (e.g., IP SR-TE) is being used, may perform the following processing. The ingress router inserts the IP segments on the IGP shortcut (which may be denoted as <numAddresses, Address[ ]>AddressList and AddressList.numAddresses=0). The ingress router performs a lookup in the SR Tunnel Table for the shortcut LSP (which may be denoted as SR_Entry=SR_Tunnel_Table[NextHop→IGP-ShortcutSRTunnel]). The ingress router performs a lookup for the first segment (which may be denoted as firstSegment=Segment Table[SR_Entry→SegmentID] and Segment=firstSegment→Next), although it is noted that the first segment is not encoded into the source routing header. The ingress router then performs processing for each of the other IP segments on the IGP shortcut in order to insert the IP segments into the source routing header (which may be denoted as (1) AddressList.Address[AddressList.numAddresses]=Segment→Address, (2) AddressList.numAddresses=AddressList. numAddresses+1, and (3) Segment=Segment_Table[Segment→Next]). The ingress router may then use the EMR on MPLS stack encoding functions as discussed above in order to form the packet (which may be denoted as Packet=firstSegment→LinkLayerHeader+AddressList. Address[ ]+Packet). In at least some embodiments, a prebuilt NextHopAddressList may be cached and, for each packet in the flow, the ingress router may make a copy for each entry in NextHopAddressList and send the copy to its next-hop.

It will be appreciated that various embodiments of the process for origination of an EMR packet by an ingress router in Model-A may be further understood by considering an example based on FIG. 4 (which illustrates an example hierarchical architecture for Model-A).

In the example for Model-A, router 1 initiates an EMR packet that is eventually received by routers 2 through 13.

Figure 36:
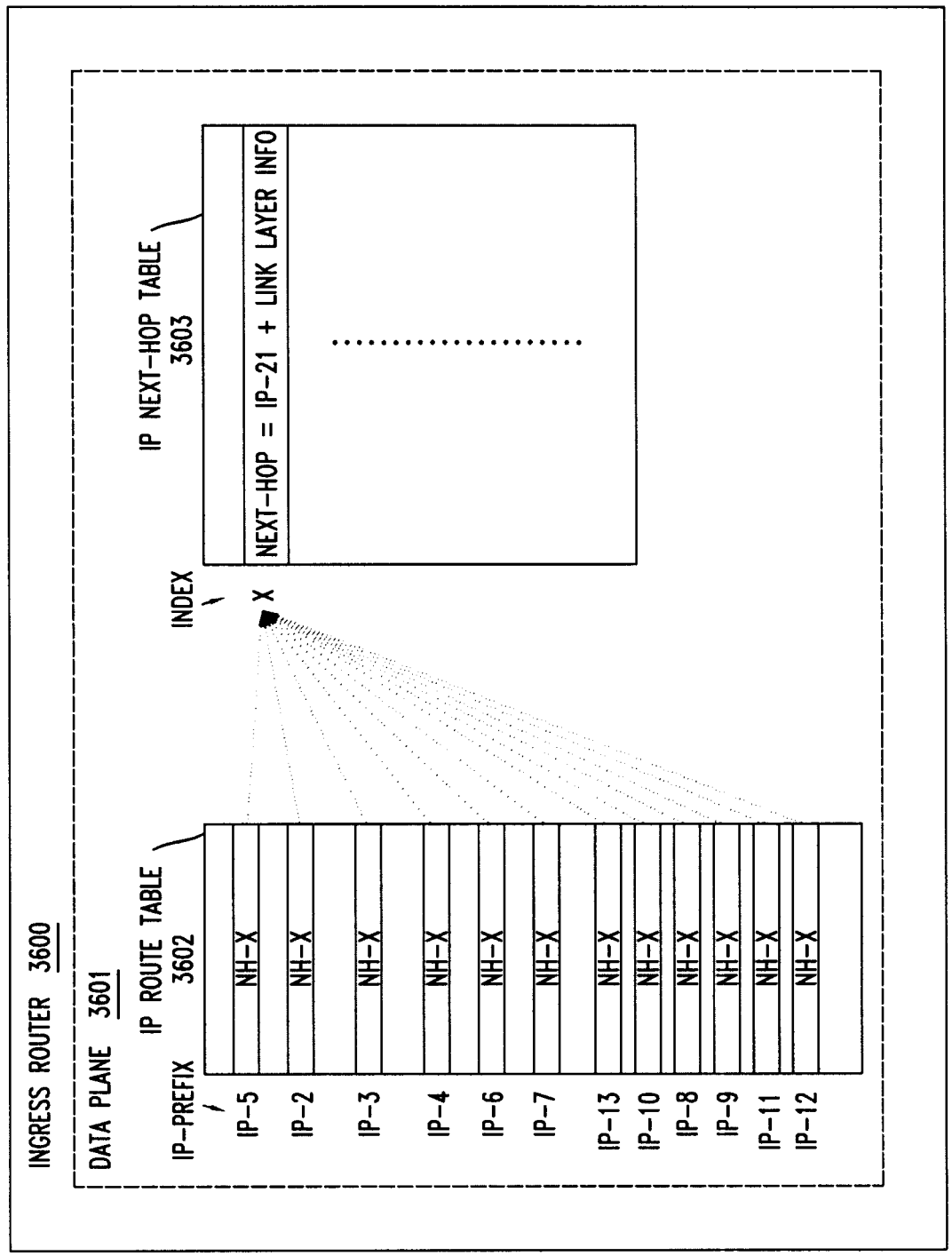
FIG. 36 depicts example dataplane states at an example ingress router, for unicast IP routes at the example ingress router, for stateless IP multicast based on Model-A.

In the example for Model-A, router 1 multicasts a payload to a set of egress routers based on data plane states of the unicast routes in router 1, an example of which is presented with respect to FIG. 36.

FIG. 36 depicts example dataplane states at an example ingress router, for unicast IP routes at the example ingress router, for stateless IP multicast based on Model-A. In FIG. 36, an ingress router 3600 includes a dataplane 3601 including an IP Route Table 3602 and an IP Next-Hop Table 3603. It is noted that, while the IP Route Table 3602 shows one IP-Prefix for each egress router, it is possible that multiple egress routers may be summarized by a single IP-Prefix.

In the example for Model-A, the router 1 generates the EMR packet with EMR_Multicast_Model_A( . . . ) as follows:

1. If this is the first packet for the multicast flow, then the router 1 invokes SendGroupResolutionRequest_Model_A (2-13) to resolve the group association of egress routers 2-13. This may result in sending an on-demand resolution request to a centralized entity (e.g., an SDN controller or the like). If the flow set-up is initiated by the centralized controller, then the centralized controller may do an unsolicited push of group membership info to the routers 1-13 participating in the multicast flow.

2. The invocation of SendGroupResolutionRequest_Model_A(2-13) results in GroupResolutionResponse_Model_A( . . . ), which returns List_of_Groupwise_Egress_Routers [ ] including <Group 1, {IP-2, IP-3, IP-4}>, <Group 2, {IP-5, IP-6, IP-7}>, <Group 3, {IP-8, IP-9, IP-10}>, <Group 4, {IP-11, IP-12, IP-13}>. Steps 3-7 are performed by EMR_Multicast_Proceed_Model_A( . . . ).

3. For each entry/group in List_of_Groupwise_Egress_Routers[ ], a copy of the packet is generated with an EMR encoding IP addresses all egress routers in that group. Each IP address is looked up in the IP Route Table by its address. The best matching IP Route Table entry points to an entry in the IP Next-Hop Table entry that is programmed with the next-hop address and link layer information. The EMR is build up in steps 4-7 discussed below.

4. For entry <Group 1, {IP-2, IP-3, IP-4}>, the following actions are performed:

4.1. Looks up the address IP-2 in the IP Route Table, which points to IP Next-Hop index X (which also may be referred to as NH index X). The IP Next-Hop Table entry X is programmed with Next-hop=IP-21, so a NextHopAddressList is created as NAL-G1-21={IP-2}.

4.2. Looks up the address IP-3 in the IP Route Table, which points to NH index X. The IP Next-Hop Table entry X is programmed with Next-hop=IP-21, so NAL-G1-21 is updated to ={IP-2, IP-3}.

4.3. Looks up the address IP-4 in the IP Route Table, which points to NH index Z. The IP Next-Hop Table entry Z is programmed with Next-hop=IP-21, so NAL-G1-21 is updated to ={IP-2, IP-3, IP-4}.

4.4. At this point, there are no more IP addresses to process in Group 1. There is only one NAL for this group, which is NAL-G1-21 to next-hop IP-21. An EMR packet is created for NAL-G1-21 and is sent to next-hop 21. The encoding of the EMR packet originated by router 1, using an IPv4 Option, is depicted in FIG. 37.
  5. For entry <Group 2, {IP-5, IP-6, IP-7}>, the following actions are performed:
    5.1. Looks up the address IP-5 in the IP Route Table, which points to IP Next-Hop index X (which also may be referred to as NH index X). The IP Next-Hop Table entry X is programmed with Next-hop=21, so a NextHopAddressList (NAL) is created as NAL-G2-21={IP-5}.
    5.2. Looks up the address IP-6 in the IP Route Table, which points to NH index X. The IP Next-Hop Table entry X is programmed with Next-hop=21, so NAL-G2-21 is updated to ={IP-5, IP-6}.
    5.3. Looks up the address IP-7 in the IP Route Table, which points to NH index X. The IP Next-Hop Table entry X is programmed with Next-hop=21, so NAL-G2-21 is updated to ={IP-5, IP-6, IP-7}.
    5.4 At this point, there are no more IP addresses to process in Group 2. There is only one NAL for this group, which is NAL-G2-21 to next-hop 21. An EMR packet is created for NAL-G2-21 and is sent to next-hop IP-21. The encoding of the EMR packet originated by router 1, using an IPv4 Option, is depicted in FIG. 38.
  6. For entry <Group 3, {IP-8, IP-9, IP-10}>, the following actions are performed:
    6.1. Looks up the address IP-8 in the IP Route Table, which points to IP Next-Hop index X (which also may be referred to as NH index X). The IP Next-Hop Table entry X is programmed with Next-hop=21, so a NextHopAddressList (NAL) is created as NAL-G3-21={IP-8}.
    6.2. Looks up the address IP-9 in the IP Route Table, which points to NH index X. The IP Next-Hop Table entry X is programmed with Next-hop=21, so NAL-G3-21 is updated to ={IP-8, IP-9}.
    6.3. Looks up the address IP-10 in the IP Route Table, which points to NH index X. The IP Next-Hop Table entry X is programmed with Next-hop=21, so NAL-G3-21 is updated to ={IP-8, IP-9, IP-10}.
    6.4. At this point, there are no more IP addresses to process in Group 3. There is only one NAL for this group, which is NAL-G3-21 to next-hop 21. An EMR packet is created for NAL-G3-21 and is sent to next-hop IP-21. The encoding of the EMR packet originated by router 1, using an IPv4 Option, is depicted in FIG. 39.
  7. For entry <Group 4, {IP-11, IP-12, IP-13}>, the following actions are performed:
    7.1. Looks up the address IP-11 in the IP Route Table, which points to IP Next-Hop index X (which also may be referred to as NH index X). The IP Next-Hop Table entry X is programmed with Next-hop=21, so a NextHopAddressList (NAL) is created to as NAL-G4-21={IP-11}.
    7.2. Looks up the address IP-12 in the IP Route Table, which points to NH index X. The IP Next-Hop Table entry X is programmed with Next-hop=21, so NAL-G4-21 is updated to ={IP-11, IP-12}.
    7.3. Looks up the address IP-13 in the IP Route Table, which points to NH index X. The IP Next-Hop Table entry X is programmed with Next-hop=21, so NAL-G4-21 is updated to ={IP-11, IP-12, IP-13}.
    7.4. At this point, there are no more IP addresses to process in Group 4. There is only one NAL for this group, which is NAL-G4-21 to next-hop 21. An EMR packet is created for NAL-G4-21 and is sent to next-hop IP-21. The encoding of the EMR packet originated by router 1, using an IPv4 Option, is depicted in FIG. 40.

It will be appreciated, although primarily presented within the context of origination of an IPv4 EMR packet by an ingress router based on an IPv4 Option, an IPv4 EMR packet in Model-A may be originated in a similar manner based on other encoding capabilities (e.g., based on an IPv4-EMR Shim Header), an IPv6 EMR packet may be originated in a similar manner based on various encoding capabilities (e.g., based on an IPv6 EH, an IPv6-EMR Shim Header, or the like), or the like, as well as various combinations thereof.

The EMR packet generated by an ingress router is forwarded by the ingress router such that the EMR packet may be received by routers on the paths to the egress routers of the multicast tree and, thus, processed by routers on the paths to the egress routers of the multicast tree In at least some embodiments, processing of an EMR packet by a router in Model-A may be performed using the following process.
  1. The processing router initializes a list where each entry in the list is a tuple of <Next-hop, AddressList> (i.e., a list of IP addresses to each next-hop). Here, AddressList is of the type {numAddresses, Address[ ]}. The list, which may be referred to as a next-hop address list (which may be denoted as NextHopAddressList), is initialized to be NULL to start. This may be denoted as List_of_<NextHop, AddressList>NextHopAddressList=0.
  2. The processing router computes the number of addresses in the EMR header, based on the length field (which may vary for different types of received EMR headers). This may be denoted as numAddresses=getNumAddresses(Packet→EMR→Length).
  3. The processing router performs an iterative processing for processing each address in the EMR header.
    3.1. The processing router, for the given address being processed, looks up the address in the IP Route Table. This may be denoted as NextHop NH=IP_Route_Table[Packet→EMR.Address[Index]].
    3.2. The processing router determines whether it is the egress router for the address or a transit router for the address.
      3.2.1. If the processing router is the egress router for the address, the processing router makes a copy of the packet (which may be denoted as PacketCopy=Copy (Packet) and sends the packet to its upper layers (which may be denoted as SendToUpperLayer(PacketCopy→PayLoad)).
      3.2.2. If the processing router is a transit router for the address, the processing router performs the following:
        3.2.2.1. The processing router determines whether the next-hop for the group exists in the next-hop address list, i.e NextHopEntry=NextHopAddressList[NH]. The processing router, based on a determination that the next-hop for the group does not exist in the next-hop address list, creates the next-hop for the group and adds the next-hop for the group to the next-hop address list. This may be denoted as, if NextHopEntry not found, then (1) NextHopEntry=new <NH, AddressList [ ]=empty> and (2) NextHopAddressList[NH]=NextHopEntry.

3.2.2.2. The processing router inserts the address of the egress router into the EMR packet. This may be denoted as NextHopEntry→AddressList.Address[NextHopEntry→AddressList.numAddresses]=Packet→EMR. Address[Index] and NextHopEntry→AddressList.numAddresses=[NextHopEntry→AddressList.numAddresses+1.

4. The processing router then builds a copy of the packet for each next-hop in the next-hop address list, pushes the EMR onto each of the copies of the packet, and forwards the copies of the packets to the next-hops in the next-hop address list. This may be considered to include performing the following operations for each <NextHop, AddressList> in NextHopAddressList[ ]: (1) create the copy of the packet (which may be denoted as PacketCopy=Copy(Packet)), (2) removes the received EMR and inserts the next-hop EMR onto the packet (which may be denoted as Remove(PacketCopy→EMR) and PacketCopy→EMR→Address[ ]=AddressList.Address[ ]) to form a modified EMR packet, and (3) forwards the modified EMR packet to the next-hop (which may be denoted as PacketSend(PacketCopy, NextHop)). With respect to PacketSend(PacketCopy, NextHop), which sends the EMR packet to the next hop (NextHop) by adding appropriate encapsulations (e.g., depending on whether the next hop is a typical unicast IP route or an IGP shortcut), it is noted that PacketSend (PacketCopy, NextHop) may be performed as follows:

4.1. The ingress router determines whether the next hop (NextHop) is a typical unicast IP route or an IGP shortcut.

4.2. The ingress router, based on a determination that the next hop is a typical unicast IP route, adds a link layer header to the packet and sends the packet. This may be denoted as (1) Packet=NextHop→LinkLayerHeader+Packet and (2) Send(Packet).

4.3. The ingress router, based on a determination that the next hop is an IGP shortcut, determines the type of IGP shortcut in order to determine appropriate handling of the packet based on the type of IGP shortcut. The IGP shortcut, as indicated above and discussed further below, may be an MPLS IGP shortcut (e.g., RSVP-TE tunnel or SR-TE tunnel) or an IP Source Routed IGP Shortcut (e.g., IP SR-TE).

4.3.1. The ingress router, based on a determination that an MPLS IGP shortcut (e.g., RSVP-TE tunnel or SR-TE tunnel) is being used (which may be denoted as "if (NextHop→IGPShortcutIsMPLS=true)"), may perform the following processing. The ingress router determines the label stack to push for the shortcut LSP (which may be denoted as <numLabels, Label[ ]> LabelStack). The ingress router looks up the MPLS FTN Table for the shortcut LSP (which may be denoted as FTN_Entry=FTN_Table [NextHop→IGPShortcutLsp]). The ingress router looks up the first NHLFE (which may be denoted as NHLFE=NHLFE_Table[FTN_Entry→NHLFE]). The ingress router determines and keeps track of the last NHLFE (which may be denoted as LastNHLFE=NHLFE), although it is noted that this last NHLFE does not need to be encoded into the label stack since it is the immediate next hop to which the packet will be sent. The ingress router then fills the label stack from the bottom to the top starting with the first NHLFE which starts with the bottom most label nearest to the payload (which may be denoted as LabelIndex=NHLFE→NumNext−1). The ingress router, for each NHLFE and, thus, for each label to be encoded into the label stack, processes the NHLFE to encode the associated label into the label stack where such processing for a given NHLFE may include the following operations: (1) LabelStack.Label[LabelIndex]=NHLFE→Label, (2) LabelStack.numLabels=LabelStack.numLabels+1, (3) LabelIndex=LabelIndex−1, (4) LastNHLFE=NHLFE, and (5) NHLFE=NHLFE_Table[NHLFE→Next]. The ingress router, based on a determination that the IGP shortcut is an MPLS SR-TE tunnel, then inserts the label stack except for the first label that came from the last NHLFE (which may be denoted as "If (NextHop→IGPShortcutSRMPLS)" then "LabelStack.Label [ ]=LabelStack.Label[ ]−LabelStack.Label[0]"). The ingress router may then use the EMR on MPLS stack encoding functions as discussed above in order to form the packet (which may be denoted as Packet=LastNHLFE→LinkLayer Header+LabelStack.Label[ ]+Packet).

4.3.2. The ingress router, based on a determination that an IP Source Routed IGP shortcut (e.g., IP SR-TE) is being used, may perform the following processing. The ingress router inserts the IP segments on the IGP shortcut (which may be denoted as <numAddresses, Address[ ]> AddressList and AddressList.numAddresses=0). The ingress router performs a lookup in the SR Tunnel Table for the shortcut LSP (which may be denoted as SR_Entry=SR_Tunnel_Table [NextHop→IGPShortcutSRTunnel]). The ingress router performs a lookup for the first segment (which may be denoted as firstSegment= Segment_Table[SR_Entry→SegmentID] and Segment=firstSegment→Next), although it is noted that the first segment is not encoded into the source routing header. The ingress router then performs processing for each of the other IP segments on the IGP shortcut in order to insert the IP segments into the source routing header (which may be denoted as (1) AddressList. Address [AddressList.numAddresses]=Segment→Address, (2) AddressList.numAddresses=AddressList.numAddresses+1, and (3) Segment=Segment_Table[Segment→Next]). The ingress router may then use the EMR on MPLS stack encoding functions as discussed above in order to form the packet (which may be denoted as Packet=firstSegment→LinkLayerHeader+AddressList.Address[ ]+Packet).

5. The processing router may discard the received EMR packet as it has been replicated to each of the next-hops.

In at least some embodiments, a prebuilt NextHopAddressList may be cached and, for each packet in the flow, the ingress router may make a copy for each entry in NextHopAddressList and send the copy to its next-hop.

It will be appreciated that processing of an EMR packet by a processing router (e.g., transit router, egress router, or the like) in Model-A may be performed using various other processing capabilities.

It will be appreciated that various embodiments of the process for origination of an EMR packet by an ingress router in Model-A may be further understood by considering an example based on FIG. 4 (which illustrates an example hierarchical architecture for Model-A).

In the example for Model-A, router 1 initiates an EMR packet that is eventually received by routers 2 through 13.

Figure 41:
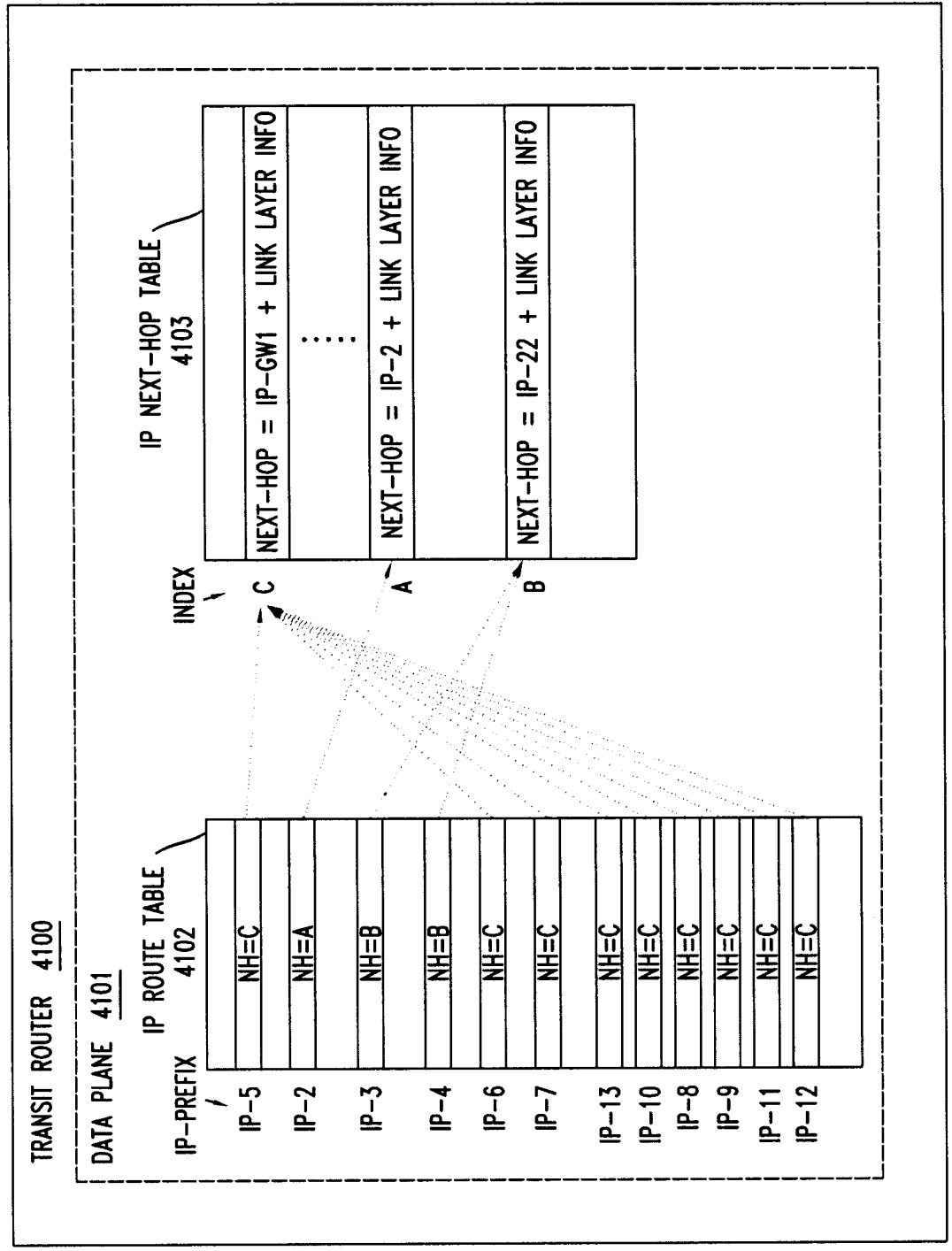
FIG. 41 depicts example dataplane states at an example transit router, unicast IP routes at the example transit router, for stateless IP multicast based on Model-A.

In the example for Model-A, router 21 receives the EMR packet from router 1 and multicasts the EMR packet to local egress routers and remote routers based on dataplane states at router 21, an example of which is presented with respect to FIG. 41.

FIG. 41 depicts example dataplane states at an example transit router, unicast IP routes at the example transit router, for stateless IP multicast based on Model-A. In FIG. 41, a transit router 4100 includes a dataplane 4101 including an IP Route Table 4102 and IP Next-Hop Table 4103.

In the exemplary multicast flow in FIG. 4, the Group-1 EMR packet that is received by Router 21 (where the encoding of the EMR is described as an IPv4 Option) is formatted as depicted in FIG. 42.

The Router 21 receives the Group-1 EMR packet and processes the Group-1 EMR packet with Process_EMR_Packet_Model_A( . . . ) as follows:

1. Looks up the first address IP-2 in IP Route Table, which points to IP Next-Hop Index A (which may be denoted as NH index A). The IP Next-Hop Table entry A is programmed with Next-hop=2, so a NextHopAddressList (NAL) entry is created as NAL-2={IP-2}.

2. Looks up the next address IP-3 in IP Route Table, which points to NH Index B. IP Next-Hop Table entry B is programmed with Next-hop=22, so a NAL is created as NAL-22={IP-3}.

3. Looks up the next address IP-4 in IP Route Table, which points to NH Index B. IP Next-Hop Table entry B is programmed with Next-hop=22, so NAL-22 is updated to ={IP-3, IP-4}.

4. At this point, there are no more addresses to process. The NALs are as follows: (1) NAL-2={IP-2} to Next-hop 1 and (2) NAL-22={IP-3, IP-4} to Next-hop 22.

5. For each NAL, an EMR packet is created and is sent to its respective next-hop, as follows:
   5.1 The EMR packet for NAL-2 (replicated by router 21 to next-hop 2) may be formatted, using an IPv4 Option, as depicted in FIG. 43.
   5.2 The EMR packet for NAL-22 (replicated by router 21 to next-hop 22) may be formatted, using an IPv4 Option, as depicted in FIG. 44.

In the exemplary multicast flow in FIG. 4, the Group-2 EMR packet that is received by Router 21 (where the encoding of the EMR is described as an IPv4 Option) is formatted as depicted in FIG. 45.

The Router 21 receives the Group-2 EMR packet and processes the Group-2 EMR packet with Process_EMR_Packet_Model_A( . . . ) as follows:

1. Looks up the first address IP-5 in IP Route Table, which points to IP Next-Hop Index C (aka NH index C). IP Next-Hop Table entry C is programmed with Next-hop=GW1, so a NextHopAddressList (NAL) entry is created as NAL-GW1={IP-5}.

2. Looks up the next address IP-6 in IP Route Table, which points to NH Index C. IP Next-Hop Table entry C is programmed with Next-hop=GW1, so a NAL-GW1 is updated to NAL-GW1={IP-5, IP-6}.

3. Looks up the next address IP-7 in IP Route Table, which points to NH Index C. IP Next-Hop Table entry C is programmed with Next-hop=GW1, so NAL-GW1 is updated to ={IP-5, IP-6, IP-7}.

4. At this point, there are no more addresses to process. The NAL is as follows: NAL-GW1={IP-5, IP-6, IP-7} to Next-hop GW1.

5. An EMR packet is created for the NAL and is sent to its next hop. The EMR packet for NAL-GW1 (replicated by router 21 to next-hop GW1) may be formatted, using an IPv4 Option, as depicted in FIG. 46.

In the exemplary multicast flow in FIG. 4, the Group-3 EMR packet that is received by Router 21 (where the encoding of the EMR is described as an IPv4 Option) is formatted as depicted in FIG. 47.

The Router 21 receives the Group-3 EMR packet and processes the Group-3 EMR packet with Process_EMR_Packet_Model_A( . . . ) as follows:

1. Looks up the first address IP-8 in IP Route Table, which points to IP Next-Hop Index C (aka NH index C). IP Next-Hop Table entry C is programmed with Next-hop=GW1, so a NextHopAddressList (NAL) entry is created as NAL-GW1={IP-8}.

2. Looks up the next address IP-9 in IP Route Table, which points to NH Index C. IP Next-Hop Table entry C is programmed with Next-hop=GW1, so a NAL-GW1 is updated to NAL-GW1={IP-8, IP-9}.

3. Looks up the next address IP-10 in IP Route Table which points to NH Index C. IP Next-Hop Table entry C is programmed with Next-hop=GW1, so NAL-GW1 is updated to={IP-8, IP-9, IP-10}.

4. At this point, there are no more addresses to process. The NAL is as follows: NAL-GW1={IP-8, IP-9, IP-10} to Next-hop GW1.

5. An EMR packet is created for the NAL and is sent to its next hop. The EMR packet for NAL-GW1 (replicated by router 21 to next-hop GW1) may be formatted, using an IPv4 Option, as depicted in FIG. 48.

In the exemplary multicast flow in FIG. 4, the Group-4 EMR packet that is received by Router 21 (where the encoding of the EMR is described as an IPv4 Option) is formatted as depicted in FIG. 49.

The Router 21 receives the Group-4 EMR packet and processes the Group-4 EMR packet with Process_EMR_Packet_Model_A( . . . ) as follows:

1. Looks up the first address IP-11 in IP Route Table which points to IP Next-Hop Index C (aka NH index C). IP Next-Hop Table entry C is programmed with Next-hop=GW1, so a NextHopAddressList (NAL) entry is created as NAL-GW1={IP-8}.

2. Looks up the next address IP-12 in IP Route Table which points to NH Index C. IP Next-Hop Table entry C is programmed with Next-hop=GW1, so a NAL-GW1 is updated to NAL-GW1={IP-8, IP-9}.

3. Looks up the next address IP-13 in IP Route Table which points to NH Index C. IP Next-Hop Table entry C is programmed with Next-hop=GW1, so NAL-GW1 is updated to ={IP-8, IP-9, IP-10}.

4. At this point, there are no more addresses to process. The NAL is as follows: NAL-GW1={IP-11, IP-12, IP-13} to Next-hop GW1.

5. An EMR packet is created for the NAL and is sent to its next hop. The EMR packet for NAL-GW1 (replicated by router 21 to next-hop GW1) may be formatted, using an IPv4 Option, as depicted in FIG. 50.

It will be appreciated, although primarily presented within the context of processing of an IPv4 EMR packet by an ingress router based on an IPv4 Option, an IPv4 EMR packet in Model-A may be processed in a similar manner based on other encoding capabilities (e.g., based on an IPv4-EMR Shim Header), an IPv6 EMR packet may be originated in a similar manner based on various encoding capabilities (e.g., based on an IPv6 EH, an IPv6-EMR Shim Header, or the like), or the like, as well as various combinations thereof.

It will be appreciated that various example embodiments for supporting stateless IP multicast may be configured to support handling of multicast packets based on stateless IP multicast using Model-A using various other processing capabilities.

Various example embodiments for supporting stateless IP multicast may be configured to support handling of multicast packets based on stateless IP multicast using Model-B.

In at least some embodiments, origination of an EMR packet by an ingress router in Model-B may be performed using the following process.

1. The inputs to the process may include (a) Payload (which is the payload to be multicast with EMR) and (b) List_of_Egress_Routers[ ] (which is a list of egress routers for the multicast flow, where each entry in the list may identify the respective egress router (e.g., using the loopback addresses of the egress routers or other suitable identifiers)). This may be referred to as EMR_Multicast_Model_B(Payload, List_of_Egress_Routers[ ]), which may be an entry point for stateless IP Multicast for Model-B.

2. The ingress router obtains a payload to be multicast (e.g., from an upper layer, in a packet from another device, or the like). The ingress router, if this is the first packet for the multicast flow, sends, to the centralized controller, a resolution request for the centralized controller to classify the egress routers (from the List_of_Egress_Routers[ ], which is included as part of the resolution request) into groups and to perform tree address programming as necessary (which may include allocating and programming tree addresses in the gateway routers of the resolved groups). This resolution request may be referred to as SendGroupResolutionRequest_Model_B(List_of_Egress_Routers[ ]).

3. The centralized controller receives the resolution request from the ingress router. The centralized controller, based on receipt of a resolution request from an ingress router, classifies the egress routers (from the List_of_Egress_Routers[ ] included in the resolution request) into groups and performs tree address programming as necessary (which may include allocating and programming tree addresses in the gateway routers of the resolved groups). The result is a list of local egress routers in the same group as the ingress router (which may be referred to as List_of_Local_Egress_Routers[ ], where the entries in the list may be the loopback addresses of the egress routers, respectively) and a list of gateway routers for external groups (i.e., not the same group as the ingress router) that have child egress routers for the multicast flow (which may be referred to as List_of_Gateway_Routers[ ], where the entries in the list are tuples of <TreeAddress, GatewayAddress> including the tree addresses and the loopback addresses for the associated gateway routers of the groups, respectively). The centralized controller sends the list of local egress routers and the list of gateway routers back to the egress router as a resolution response. This resolution response may be referred to as GroupResolutionResponse_Model_B(List_of_Local_Egress_Routers[ ], List_of_Gateway_Routers[ ]), where the (List_of_Local_Egress_Routers[ ]) element represents the list of local egress routers in the same group as the ingress router and the List_of_Gateway_Routers[ ] elements represents the list of gateway routers for external groups that have child egress routers for the multicast flow (which may be indicated using <TreeAddress, Gateway Address>).

4. The ingress router receives the resolution response from the centralized controller. The ingress router, based on the resolution response from the centralized controller, multicasts the payload to each of the egress routers in the local group (e.g., based on List_of_Local_Egress_Routers[ ] that is received in the resolution response) and to each of the gateway routers of the external groups (e.g., based on List_of_Gateway_Routers[ ] that is received in the resolution response). This multicasting of the payload by the ingress router based on the resolution response received from the centralized controller may be referred to as EMR_Multicast_Proceed_Model_B(Payload, List_of_Local_Egress_Routers[ ], List_of_Gateway_Routers[ ]).

4.1. The ingress router initializes a list, where each entry in the list is the tuple of <Next-hop, AddressList>, where AddressList is the list of IP addresses of a group packet to each next-hop. Here, AddressList is of the type {numAddresses, Address[ ]}. The list, which may be referred to as a next-hop address list (which may be denoted as NextHopAddressList), is initialized to be NULL to start. This may be denoted as NextHopAddressList (List_of_<NextHop, AddressList> NextHopAddressList[ ]=0.

4.2. The ingress router performs an iterative process for each address in the list of local egress routers (i.e., for each of the entries included in the List_of_Local_Egress_Routers[ ]). The iterative process may include the following iterative process which may be performed for each of the egress routers in the list of local egress routers (e.g., each loopback address in List_of_Local_Egress_Routers[ ]):

4.2.1. The ingress router, for each of the local egress routers in the list of local egress routers (e.g., for each loopback address in List_of_Local_Egress_Routers[ ]), performs a lookup in the IP Route Table of the ingress router to map the egress router (e.g., the loopback address of the egress router) to the IP Next-Hop entry of the ingress router that includes the loopback address for the egress router. This may be denoted as NextHop NH=IP_Route_Table[Address].

4.2.2. The ingress router, looks up if the next hop exists in next-hop address list. This may be denoted as <NextHop, AddressList> NextHopEntry= NextHopAddressList[NH].

4.2.3. The ingress router, based on a determination that the next-hop does not exist in the next-hop address list (e.g., next-hop of the IP Next-Hop entry does not exist in NextHopAddressList), creates the next-hop for the IP Next-Hop entry and adds the next-hop for the IP Next-Hop entry to the next-hop address list. This may be denoted as, if NextHopEntry not found, then (1) NextHopEntry=new <NH, AddressList=empty> and (2) NextHopAddressList[NH]=NextHopEntry.

4.2.4. The ingress router then inserts the IP address of the egress router into the address list of the next-hop. This may be denoted as (1) NextHopEntry→AddressList. Address[NextHopEntry→AddressList.numAddresses]=Address and (2) NextHopEntry→AddressList.numAddresses=NextHopEntry→AddressList.numAddresses+1.

4.3. The ingress router performs an iterative process for each entry in the list of gateway routers (i.e., for each of the <TreeAddress, GatewayAddress> entries included in the List_of_Gateway_Routers[ ]). The iterative process may include the following iterative process which may be performed for each of the entries in the list of gateway routers (e.g., each <TreeAddress, GatewayAddress> entry in List_of_Gateway_Routers[ ]):

4.3.1. The ingress router, for each of the entries in the list of gateway routers (e.g., for each of the <TreeAddress, GatewayAddress> entries included in the List_of_Gateway_Routers[ ]), performs a lookup in the IP Route Table of the ingress router to map the address of the gateway router (e.g., the loopback address of the gateway router) to the IP Route Table entry of the ingress router that includes the loopback address and next-hop address for the gateway router. This may be denoted as < > NextHop NH=IP_Route_Table[GatewayAddress].

4.3.2. The ingress router, looks up if the next hop exists in next-hop address list. This may be denoted as <NextHop, AddressList> NextHopEntry=NextHopAddressList[NH].

4.3.3. The ingress router, based on a determination that the next-hop does not exist in the next-hop address list (e.g., next-hop does not exist in NextHopAddressList), creates the next-hop and adds the next-hop to the next-hop address list. This may be denoted as, if NextHopEntry not found, then (1) NextHopEntry=new <NH, AddressList=empty> and (2) NextHopAddressList[NH]=NextHopEntry.

4.3.4. The ingress router then updates the address list of the next-hop. The ingress router inserts the gateway address into the address list of the next-hop and then inserts the tree address into the address list of the next-hop. The pushing of the gateway address onto the address list may be denoted as NextHop Entry→AddressList. Address [NextHopEntry→AddressList.numAddresses+1]=GatewayAddress. The pushing of the tree address may be denoted as NextHopEntry→AddressList.Address[NextHopEntry→AddressList.numAddresses]=TreeAddress. The size of the next-hop address list is updated as NextHopEntry→AddressList.numAddresses= NextHopEntry→AddressList.numAddresses+2.

4.4. The ingress router then builds a copy of the packet for each next-hop, pushes the EMR onto each of the copies of the packet, and forwards the copies of the packets to the next-hops. This may be considered to include performing the following operations for each <NextHop, AddressList> in NextHopAddressList: (1) create the copy of the packet and push the EMR onto the packet (which may be denoted as PacketCopy=EMR(AddressList)+Copy(Payload)) to form an EMR packet and (2) forward the EMR packet to the next-hop (which may be denoted as PacketSend (PacketCopy, NextHop)). With respect to PacketSend (PacketCopy, NextHop), which sends the EMR packet to the next hop (NextHop) by adding appropriate encapsulations (e.g., depending on whether the next hop is a typical unicast IP route or an IGP shortcut), it is noted that PacketSend(PacketCopy, NextHop) may be performed as follows:

4.4.1. The ingress router determines whether the next hop (NextHop) is a typical unicast IP route or an IGP shortcut.

4.4.2. The ingress router, based on a determination that the next hop is a typical unicast IP route, adds a link layer header to the packet and sends the packet. This may be denoted as (1) Packet=NextHop→LinkLayerHeader+Packet and (2) Send(Packet).

4.4.3. The ingress router, based on a determination that the next hop is an IGP shortcut, determines the type of IGP shortcut in order to determine appropriate handling of the packet based on the type of IGP shortcut. The IGP shortcut, as indicated above and discussed further below, may be an MPLS IGP shortcut (e.g., RSVP-TE tunnel or SR-TE tunnel) or an IP Source Routed IGP Shortcut (e.g., IP SR-TE).

4.4.3.1. The ingress router, based on a determination that an MPLS IGP shortcut (e.g., RSVP-TE tunnel or SR-TE tunnel) is being used (which may be denoted as "if (NextHop→IGPShortcutIsMPLS=true)"), may perform the following processing. The ingress router determines the label stack to push for the shortcut LSP (which may be denoted as <numLabels, Label[ ]> LabelStack). The ingress router looks up the MPLS FTN Table for the shortcut LSP (which may be denoted as FTN_Entry=FTN_Table[NextHop→IGPShortcutLsp]). The ingress router looks up the first NHLFE (which may be denoted as NHLFE=NHLFE_Table[FTN_Entry→NHLFE]). The ingress router determines and keeps track of the last NHLFE (which may be denoted as LastNHLFE=NHLFE), although it is noted that this last NHLFE does not need to be encoded into the label stack since it is the immediate next hop to which the packet will be sent. The ingress router then fills the label stack from the bottom to the top starting with the first NHLFE which starts with the bottom most label nearest to the payload (which may be denoted as LabelIndex=NHLFE→NumNext−1). The ingress router, for each NHLFE and, thus, for each label to be encoded into the label stack, processes the NHLFE to encode the associated label into the label stack where such processing for a given NHLFE may include the following operations: (1) LabelStack.Label[LabelIndex]=NHLFE→Label, (2) LabelStack.numLabels=LabelStack. numLabels+1, (3) LabelIndex=LabelIndex−1, (4) LastNHLFE=NHLFE, and (5) NHLFE=NHLFE_Table[NHLFE→Next]. The ingress router, based on a determination that the IGP shortcut is an MPLS SR-TE tunnel, then inserts the label stack except for the first label that came from the last NHLFE (which may be denoted as "If (NextHop→IGPShortcutSRMPLS)" then "LabelStack.Label[ ]=LabelStack.Label[ ]−LabelStack.Label[0]"). The ingress router may then use the EMR on MPLS stack encoding functions as discussed above in order to form the packet (which may be denoted as Packet=LastNHLFE→LinkLayerHeader+LabelStack.Label[ ]+Packet).

4.4.3.2. The ingress router, based on a determination that an IP Source Routed IGP shortcut (e.g., IP SR-TE) is being used, may perform the following processing. The ingress router inserts the IP segments on the IGP shortcut (which may be denoted as <numAddresses, Address[ ]>AddressList and AddressList.numAddresses=0). The ingress router performs a lookup in the SR Tunnel Table for the shortcut LSP (which may be denoted as SR_Entry=SR_Tunnel_Table[NextHop→IGPShortcutSRTunnel]). The ingress router performs a lookup for the first segment (which may be denoted as firstSegment=Segment_Table[SR_Entry→SegmentID] and Segment=firstSegment→Next), although it is noted that the first segment is not encoded into the source routing header. The ingress router then performs processing for each of the other IP segments on the IGP shortcut in order to insert the IP segments into the source routing header (which may be denoted as (1) AddressList. Address[AddressList.numAddresses]=Segment→Address, (2) AddressList.numAddresses=AddressList.numAddresses+1, and (3) Segment=Segment_Table[Segment→Next]). The ingress router may then use the EMR on MPLS stack encoding functions as discussed above in order to form the packet (which may be denoted as Packet=firstSegment→LinkLayerHeader+AddressList.Address[ ]+Packet).

In at least some embodiments, a prebuilt NextHopAddressList (with the AddressList) may be cached and, for each packet in the flow, the ingress router may make a copy for each entry in NextHopAddressList and send the copy to its next-hop.

It will be appreciated that various embodiments of the process for origination of an EMR packet by an ingress router in Model-B may be further understood by considering an example based on FIG. 5 (which illustrates an example hierarchical architecture for Model-B).

In the example for Model-B, router 1 initiates an EMR packet that is eventually received by routers 2 through 13.

Figure 51:
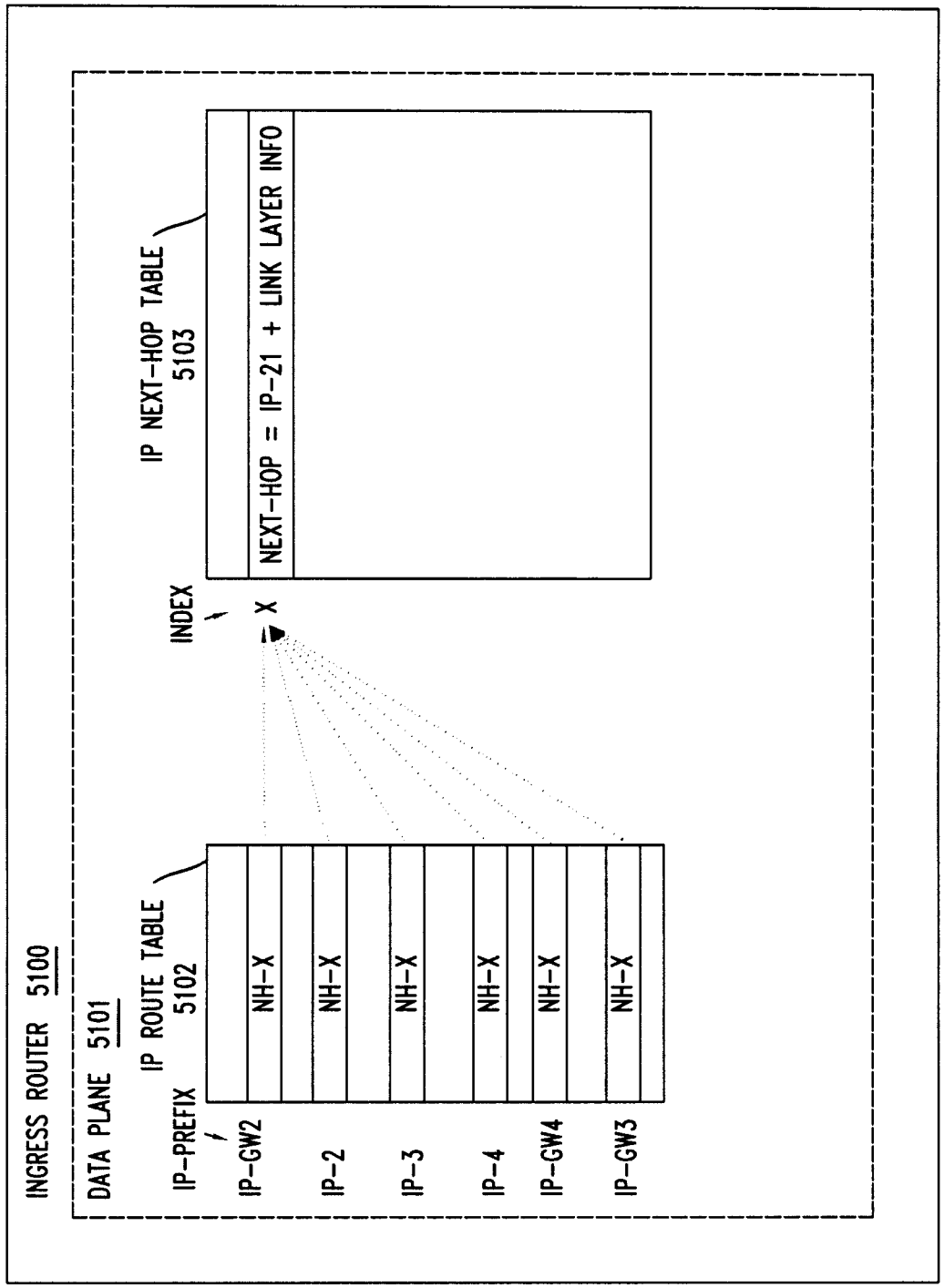
FIG. 51 depicts example dataplane states at an example ingress router, for unicast IP routes at the example ingress router, for stateless IP multicast based on Model-B.

In the example for Model-B, router 1 multicasts a payload to a set of egress routers based on dataplane states for ingress to unicast LSPs in router 1, an example of which is presented with respect to FIG. 51. In FIG. 51, an ingress router 5100 includes a dataplane 5101 including an IP RouteTable 5102 and an IP Next-Hop Table 5103.

In the example for Model-B, the router 1 generates the EMR packet with EMR_Multicast_Model_B( . . . ) as follows:

1. If this is the first packet for the flow, then Router 1 invokes SendGroupResolutionRequest_Model_B(2-13) to resolve the group associations of egress routers 2-13 and the respective gateway router per resolved group. This may result in sending an on-demand resolution request to a centralized entity (e.g., an SDN controller or the like). If the flow set-up is initiated by the centralized controller, then the centralized controller may do an unsolicited push of group membership and respective gateway router info to the routers 1-13 participating in the multicast flow.

2. The invocation of SendGroupResolutionRequest_Model_B(2-13) results in GroupResolutionResponse_Model_B( . . . ), which returns List_of_Local_Egress_Routers[ ] including local routers 2-4 (including {IP-2, IP-3, IP-4) and List_of_Gateway_Routers[ ] including GW2, GW3, and GW4 (including {<IP-GW2, IP-TA2>, <IP-GW3, IP-TA3>, <IP-GW4, IP-TA4>}). Before sending the response, the centralized entity programmed tree address to EMR mappings IP-TA2={IP-5, IP-6, IP-7}, IP-TA3={IP-8, IP-9, IP-10} and IP-TA4={IP-11, IP-12, IP-13} in the gateway routers GW2, GW3, and GW4 respectively. Steps 3-10 are performed by EMR_Multicast_Proceed_Model_B( . . . ).

3. An EMR is generated based on the List_of_Local_Egress_Routers[ ] and List_of_Gateway_Routers[ ]. The EMR encodes each entry in List_of_Local_Egress_Routers[ ] and each entry in the List_of_Gateway_Routers[ ] from step 2 by the respective loopback IP addresses of the respective routers. The loopback IP address is looked up in the IP Route Table. The IP Route Table entry points to an entry in IP Next-Hop Table that is programmed with the next-hop IP address and data link layer information. The process to encode the EMR is described in steps 4-10 below.

4. Looks up the address IP-2 in the IP Route Table, which points to IP Next-Hop index X (which also may be referred to as NH index X). The IP Next-Hop Table entry X is programmed with Next-hop=IP-21, so a NextHopAddressList (NAL) is created to Next-hop 21 as NAL-21={IP-2}.

5. Looks up the address IP-3 in the IP Route Table, which points to NH index X. The IP Next-Hop Table entry X is programmed with Next-hop=21, so NAL-21 is updated to ={IP-2, IP-3}.

6. Looks up the address IP-4 in the IP Route Table, which points to NH index X. The IP Next-Hop Table entry X is programmed with Next-hop=21, so NAL-21 is updated to ={IP-2, IP-3, IP-4}.

7. Next comes the Tree Address IP-TA2 to Gateway IP-GW2. Looks up the Gateway address IP-GW2 in the IP Route Table, which points to NH index X. The IP Next-Hop Table entry X is programmed with Next-hop=21, so TAG=<IP-TA2, IP-GW2> is added to NAL-21. NAL-21 is updated to ={IP-2, IP-3, IP-4, <IP-TA2, IP-GW2>}.

8. Next comes the Tree Address IP-TA3 to Gateway IP-GW3. Looks up the Gateway address IP-GW3 in the IP Route Table, which points to NH index X. The IP Next-Hop Table entry X is programmed with Next-hop=21, so TAG=<IP-TA3, IP-GW3> is added to NAL-21. NAL-21 is updated to ={IP-2, IP-3, IP-4, <IP-TA2, IP-GW2>, <IP-TA3, IP-GW3>}.

9. Next comes the Tree Address IP-TA4 to Gateway IP-GW4. Looks up the Gateway address IP-GW4 in the IP Route Table, which points to NH index X. The IP Next-Hop Table entry X is programmed with Next-hop=21, so TAG=<IP-TA4, IP-GW4> is added to NAL-21. NAL-21 is updated to ={IP-2, IP-3, IP-4, <IP-TA2, IP-GW2>, <IP-TA3, IP-GW3>, <IP-TA4, IP-GW4>}.

Figure 52:
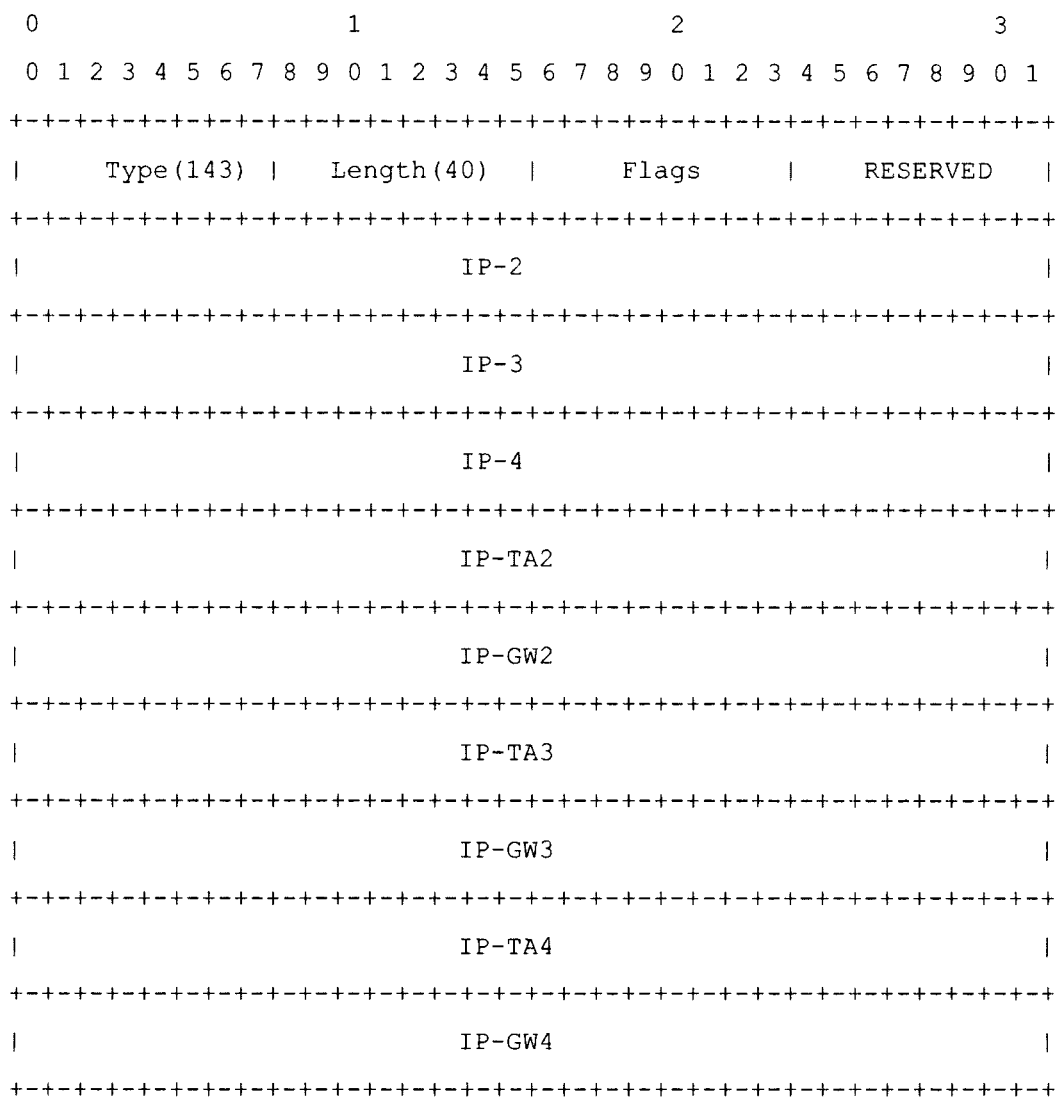
FIG. 52 depicts an example encoding of an EMR packet, using an IPv4 Option, originated by a router for a next-hop router within the context of the example of FIG. 51.

10. At this point, there are no more addresses to process. There is only one NAL, which is NAL-21 to next-hop 21. An EMR packet is created for NAL-21 and is sent to next-hop 21. The encoding of the EMR packet originated by router 1, using an IPv4 Option, is depicted in FIG. 52.

It will be appreciated, although primarily presented within the context of origination of an IPv4 EMR packet by an ingress router based on an IPv4 Option, an IPv4 EMR packet in Model-B may be originated in a similar manner based on other encoding capabilities (e.g., based on an IPv4-EMR Shim Header), an IPv6 EMR packet may be originated in a similar manner based on various encoding capabilities (e.g., based on an IPv6 EH, an IPv6-EMR Shim Header, or the like), or the like, as well as various combinations thereof.

In at least some embodiments, processing of an EMR packet by a router in Model-B may be performed using the following process.

1. The processing router initializes a list where each entry in the list is a tuple of <Next-hop, AddressList> (i.e., a list of IP addresses to each next-hop wherein AddressList if of type <numAddresses, Address[ ]>). The list, which may be referred to as a next-hop address list (which may be denoted as NextHopAddressList[ ]), is initialized to be NULL to start. This may be denoted as List_of_<NextHop, AddressList>NextHopAddressList[ ]=0.

2. The processing router computes the number of addresses in the EMR header, based on the length field (which may vary for different types of received EMR headers). This may be denoted as numAddresses=getNumAddresses(Packet→EMR.Length).

3. The processing router performs an iterative processing for processing each address in the EMR header.
   3.1. The processing router, for the given address being processed, determines whether the address is a tree address and, if the address is a tree address, advances the index to the associated gateway address and provides an indication that it is processing a TAG address.

This may be denoted as "if (Packet→EMAddress[Index] is Tree Address) then Index=Index+1 and isTAG=1; else isTAG=0."

3.2. The processing router, for the given address being processed, looks up the address in the IP Route Table. This may be denoted as NextHop NH=IP_Route_Table [Packet→EMR.Address [Index]].

3.3. The processing router determines whether it is the egress router for the address or a transit router for the address.

3.3.1. If the processing router is the egress router for the address, the processing router determines whether the address is the gateway router address within a TAG address (denoted by check if isTAG is 1). It is noted that, in at least some embodiments, a prebuilt NextHopAddressList may be cached and kept as Child_EMR→NextHopAddressList and, for each packet in the flow, the gateway router may make a copy for each entry in Child_EMR→NextHopAddressList and send the copy to its next-hop.

3.3.1.1. If the address is a gateway router address, then the processing router is a gateway router and the tree address is processed (which may be denoted as Process_EMR_TreeAddress(Packet, Packet→EMR.Address[Index−1])).

3.3.1.1.1 The processing router looks up the tree address in the Tree Address Table (which may be denoted as (EMR_Entry Child_EMR=TreeAddress_Table[TreeAddress]).

3.3.1.1.2. The processing router, based on a determination that the gateway router is also an egress router for the tree, makes a local copy of the EMR packet and sends the copy of the EMR packet to an upper layer. This may be denoted as: if (Child_EMR→isEgressRouter), then (1) PacketCopy=Copy(Packet) and (2) SendToUpperLayer(PacketCopy→PayLoad).

3.3.1.1.3. The processing router initializes a list where each entry is a tuple of <Next-hop, AddressList> (i.e., an EMR for each next-hop, where AddressList is of the type {numAddresses, Address[ ]}. This may be denoted as List_of_<NextHop, AddressList> NextHopList[ ]=0.

3.3.1.1.3. The processing router initializes a child address list (denoted as child_Address_List) which includes addresses of each child egress router in the tree. The processing router then builds the NextHopList in order replicate to the children routers.

3.3.1.1.4. The processing router then performs the following processing for each Address in Child_EMR→child_Address_List as follows. The processing router looks up the child address in the IP Route Table (which may be denoted as NextHop NH=IP_Route_Table[Address]). The processing router, if the next-hop of the Address does not exist in NextHopList[ ](which may be denoted as <NextHop, AddressList> NextHopEntry=NextHopList[NH]), creates the next-hop and adds it into the list (which may be denoted as if NextHopEntry not found, then NextHopEntry=new <NH, AddressList=empty> and NextHopList[NH]= NextHopEntry). The processing router then inserts the address of the egress router into address list of the next-hop (which may be denoted as NextHopEntry→AddressList. Address [NextHopEntry→AddressList.numAddresses]=Address and NextHopEntry→AddressList.numAddresses=NextHopEntry→AddressList.numAddresses+1).

3.3.1.1.5. The processing router then, for each next-hop, builds a copy of the packet for the next-hop, pushes the EMR into the packet for the next-hop, and forwards the copy to the next-hop. The creation of the copy of the packet may be denoted as PacketCopy=Copy(Packet). The pushing of the EMR into the packet for the next-hop, which may include removing received EMR and inserting the next-hop EMR, may be denoted as Remove(Packet Copy→EMR) and PacketCopy→EMR. Address[ ]=AddressList.Address[ ]). The forwarding of the copy to the next-hop may be denoted as PacketSend(PacketCopy, NextHop).

3.3.1.2. If the address is not a gateway router address, then the processing router makes a copy of the packet (which may be denoted as PacketCopy=Copy(Packet) and sends the packet to its upper layers (which may be denoted as SendToUpperLayer(PacketCopy→PayLoad)).

3.3.2. If the processing router is a transit router for the address, the processing router performs the following functions:

3.3.2.1. The processing router determines whether the next-hop for the group exists in the next-hop address list. This may be denoted as NextHopEntry=NextHopAddressList[NH].

3.3.2.2. The processing router, based on a determination that the next-hop does not exist in the next-hop address list, creates the next-hop and adds the next-hop to the next-hop address list. This may be denoted as, ifNextHopEntry not found, then (1) NextHopEntry=new <NH, AddressList=empty> and (2) NextHopAddressList[NH]=NextHopEntry.

3.3.2.2. The processing router determines whether the address is the gateway router address with TAG address (denoted by the check if isTAG is 1). The processing router, based on a determination that the address is a gateway router address, adds the tree address to the next-hop address list. This may be denoted as, if isTAG, then (1) NextHopEntry→AddressList. Address[NextHopEntry→AddressList.numAddresses]=Packet→EMR.Address[Index-1] and (2) NextHopEntry→AddressList. numAddresses=NextHopEntry→ AddressList.numAddresses+1.

3.3.2.3. The processing router inserts the address of the egress router (or the gateway router) into the EMR packet. This may be denoted as (1) NextHopEntry→AddressList.Address[NextHopEntry→AddressList.numAddreses]=Packet→EMR.Address[Index] and (2) NextHopEntry→AddressList.numAddresses=NextHopEntry→AddressList.numAddresses+1.

4. The processing router then builds a copy of the packet for each next-hop in the next-hop address list, pushes the EMR onto each of the copies of the packet, and forwards the copies of the packets to the next-hops in the next-hop address list. This may be considered to include performing the following operations for each <NextHop, AddressList> in NextHopAddressList[ ]: (1) create the copy of the packet (which may be denoted as PacketCopy=Copy(Packet)), (2) removes the received EMR and inserts the next-hop EMR onto the packet (which may be denoted as Remove(PacketCopy→EMR) and PacketCopy→EMR→Address[ ]=AddressList.Address[ ]) to form a modified EMR packet, and (3) forwards the modified EMR packet to the next-hop (which may be denoted as PacketSend(PacketCopy, NextHop)). With respect to PacketSend(PacketCopy, NextHop), which sends the EMR packet to the next hop (NextHop) by adding appropriate encapsulations (e.g., depending on whether the next hop is a typical unicast IP route or an IGP shortcut), it is noted that PacketSend (PacketCopy, NextHop) may be performed as follows:

4.1. The ingress router determines whether the next hop (NextHop) is a typical unicast IP route or an IGP shortcut.

4.2. The ingress router, based on a determination that the next hop is a typical unicast IP route, adds a link layer header to the packet and sends the packet. This may be denoted as (1) Packet=NextHop→LinkLayerHeader+Packet and (2) Send(Packet).

4.3. The ingress router, based on a determination that the next hop is an IGP shortcut, determines the type of IGP shortcut in order to determine appropriate handling of the packet based on the type of IGP shortcut. The IGP shortcut, as indicated above and discussed further below, may be an MPLS IGP shortcut (e.g., RSVP-TE tunnel or SR-TE tunnel) or an IP Source Routed IGP Shortcut (e.g., IP SR-TE).

4.3.1. The ingress router, based on a determination that an MPLS IGP shortcut (e.g., RSVP-TE tunnel or SR-TE tunnel) is being used (which may be denoted as "if (NextHop→IGPShortcutIsMPLS==true)"), may perform the following processing. The ingress router determines the label stack to push for the shortcut LSP (which may be denoted as <numLabels, Label[ ]> LabelStack). The ingress router looks up the MPLS FTN Table for the shortcut LSP (which may be denoted as FTN_Entry=FTN_Table [NextHop→IGPShortcutLsp]). The ingress router looks up the first NHLFE (which may be denoted as NHLFE=NHLFE_Table[FTN_Entry→NHLFE]). The ingress router determines and keeps track of the last NHLFE (which may be denoted as LastNHLFE=NHLFE), although it is noted that this last NHLFE does not need to be encoded into the label stack since it is the immediate next hop to which the packet will be sent. The ingress router then fills the label stack from the bottom to the top starting with the first NHLFE which starts with the bottom most label nearest to the payload (which may be denoted as LabelIndex=NHLFE→NumNext−1). The ingress router, for each NHLFE and, thus, for each label to be encoded into the label stack, processes the NHLFE to encode the associated label into the label stack where such processing for a given NHLFE may include the following operations: (1) LabelStack.Label[LabelIndex]=NHLFE→Label, (2) LabelStack.numLabels=LabelStack.numLabels+1, (3) LabelIndex=LabelIndex−1, (4) LastNHLFE=NHLFE, and (5) NHLFE=NHLFE_Table[NHLFE→Next]. The ingress router, based on a determination that the IGP shortcut is an MPLS SR-TE tunnel, then inserts the label stack except for the first label that came from the last NHLFE (which may be denoted as "If (NextHop→IGPShortcutSRMPLS)" then "LabelStack.Label[ ]=LabelStack.Label[ ]−LabelStack.Label[0]"). The ingress router may then use the EMR on MPLS stack encoding functions as discussed above in order to form the packet (which may be denoted as Packet=LastNHLFE→LinkLayerHeader+LabelStack.Label[ ]+Packet).

4.3.2. The ingress router, based on a determination that an IP Source Routed IGP shortcut (e.g., IP SR-TE) is being used, may perform the following processing. The ingress router inserts the IP segments on the IGP shortcut (which may be denoted as <numAddresses, Address[ ]> AddressList and AddressList.numAddresses=0). The ingress router performs a lookup in the SR Tunnel Table for the shortcut LSP (which may be denoted as SR_Entry=SR_Tunnel_Table [NextHop→IGPShortcutSRTunnel]). The ingress router performs a lookup for the first segment (which may be denoted as firstSegment=Segment_Table [SR_Entry→SegmentID] and Segment=firstSegment→Next), although it is noted that the first segment is not encoded into the source routing header. The ingress router then performs processing for each of the other IP segments on the IGP shortcut in order to insert the IP segments into the source routing header (which may be denoted as (1) AddressList.Address [AddressList.numAddresses]=Segment→Address, (2) AddressList.numAddresses=AddressList.numAddresses+1, and (3) Segment=Segment_Table[Segment→Next]). The ingress router may then use the EMR on MPLS stack encoding functions as discussed above in order to form the packet (which may be denoted as Packet=firstSegment→LinkLayerHeader+AddressList.Address[ ]+Packet).

5. The processing router may discard the received EMR packet as it has been replicated to each of the next-hops.

It will be appreciated that processing of an EMR packet by a processing router (e.g., transit router, egress router, or the like) in Model-B may be performed using various other processing capabilities.

It will be appreciated that various embodiments of the process for processing of an EMR packet by a router in Model-B may be further understood by considering an example based on FIG. 5 (which illustrates an example hierarchical architecture for Model-B).

In the example for Model-B, router 1 initiates an EMR packet that is eventually received by routers 2 through 13.

Figure 53:
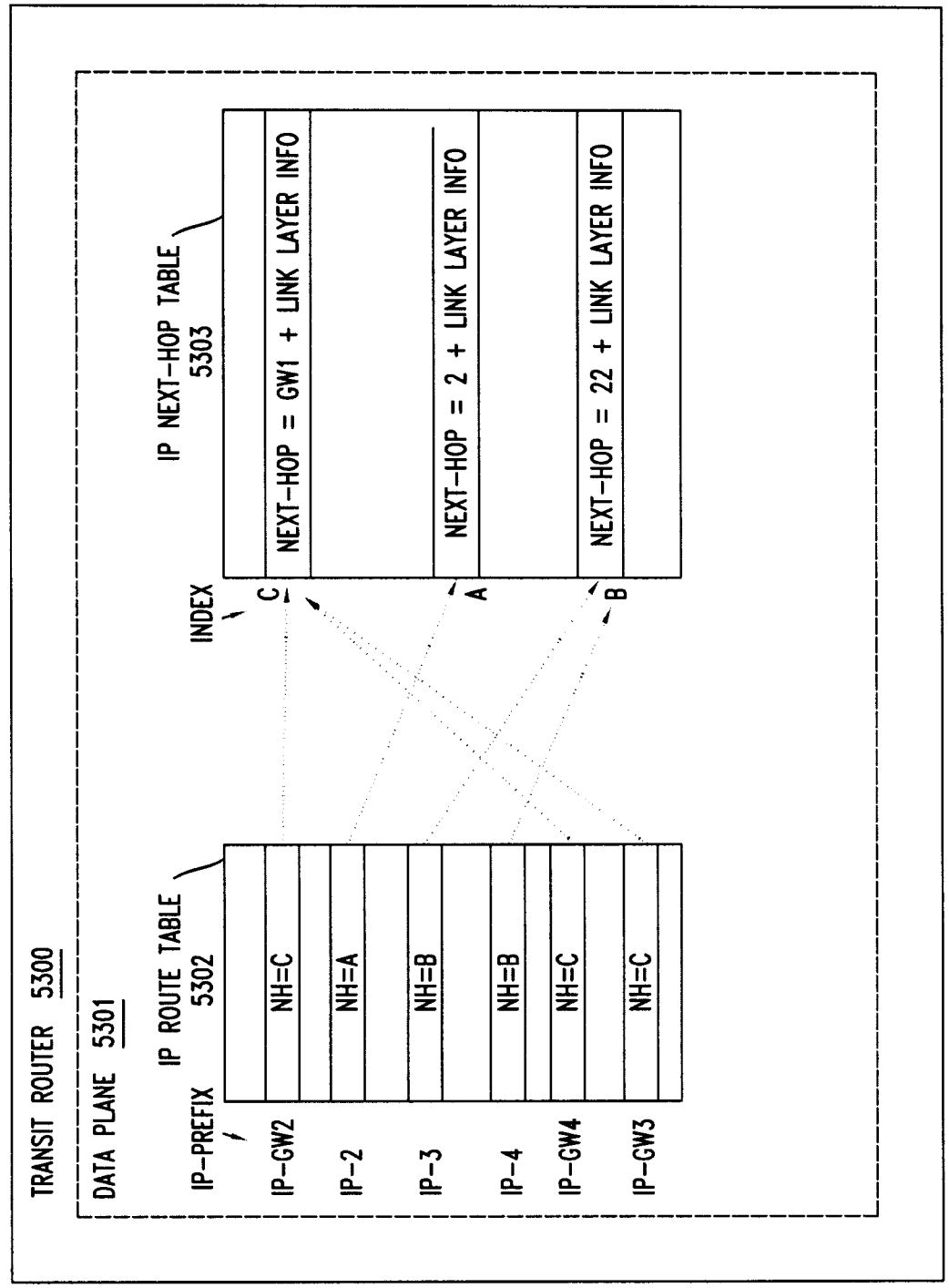
FIG. 53 depicts example dataplane states at an example transit router, for unicast IP routes at the example transit router, for stateless IP multicast based on Model-B.

In the example for Model-B, router 21 receives the EMR packet from router 1 and multicasts the EMR packet to local egress routers and gateway routers based on dataplane states at router 21, an example of which is presented with respect to FIG. 53.

FIG. 53 depicts example dataplane states at an example transit router, for unicast IP routes at the example transit router, for stateless IP multicast based on Model-B. In FIG. 53, a transit router 5300 includes a dataplane 5301 including an IP Route Table 5302 and an IP Next-Hop Table 5303.

Figure 54:
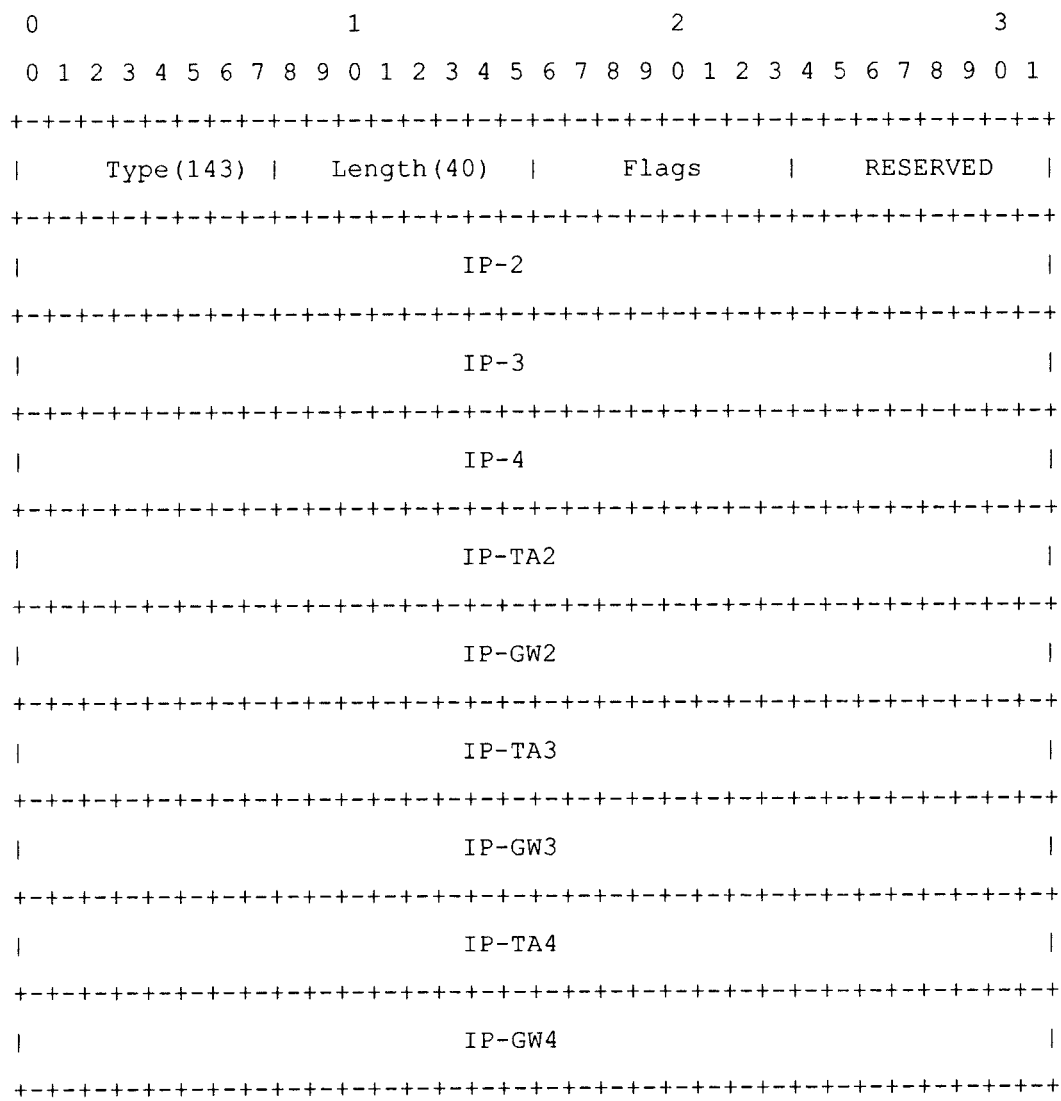
FIG. 54 depicts an example encoding of an EMR packet, using an IPv4 Option, received by a router within the context of the example of FIG. 53.

In the exemplary multicast flow in FIG. 5, the EMR packet that is received by Router 21 is formatted as depicted in FIG. 54.

The Router 21 receives the EMR packet and processes the EMR packet with Process_EMR_Packet_Model_B( . . . ) as follows:

1. Looks up the first address IP-2 in the IP Route Table, which points to IP Next-Hop Index A (which also may be referred to as NH index A). The IP Next-Hop Table entry A is programmed with Next-hop-2, so a NextHopAddress List (NAL) is created as NAL-2={IP-2}.

2. Looks up the next address IP-3 in the IP Route Table, which points to the NH Index B. The IP Next-Hop Table entry B is programmed with Next-hop=22, so a NAL is created as NAL-22={IP-3}.

3. Looks up the next address IP-4 in the IP Route Table which points to the NH Index B. The IP Next-Hop Table entry B is programmed with Next-hop=22, so NAL-22 is updated to ={IP-3, IP-4}.

4. Next is the TAG={IP-TA2, IP-GW2}. Looks up the Gateway Address IP-GW2 in the IP Route Table which points to the NH index C. The Next-Hop Table entry C is programmed with Next-hop=GW1, so a NAL is created as NAL-GW1={<IP-TA2, IP-GW2>}.

5. Next is the TAG={IP-TA3, IP-GW3}. Looks up the Gateway Address IP-GW3 in the IP Route Table which points to the NH index C. The Next-Hop Table entry C is programmed with Next-hop=GW1, so a NAL-GW1 is updated to ={<IP-TA2, IP-GW2>, <IP-TA3, IP-GW3>}.

6. Next is the TAG={IP-TA4, IP-GW4}. Looks up the Gateway Address IP-GW4 in the IP Route Table, which points to the NH index C. The Next-Hop Table entry C is programmed with Next-hop=GW1, so NAL-GW1 is updated to ={<IP-TA2, IP-GW2>, <IP-TA3, IP-GW3>, <IP-TA4, IP-GW4>}.

7. At this point, there are no more addresses to process. The NALs are as follows: (1) NAL-2={IP-2} to Next-hop 1, (2) NAL-22={IP-3, IP-4} to Next-hop 22, and (3) NAL-GW1={<IP-TA2, IP-GW2>, <IP-TA3, IP-GW3>, <IP-TA4, IP-GW4>} to Next-hop GW1.

8. For each NAL, an EMR packet is created and is sent to its respective next-hop, as follows:
   8.1 The EMR packet for NAL-2 (replicated by router 21 to next-hop 2) may be formatted, using an IPv4 Option, as depicted in FIG. 55.
   8.2. The EMR packet for NS-22 (replicated by router 21 to next-hop 22) may be formatted, using an IPv4 Option, as depicted in FIG. 56.
   8.3. The EMR packet for NS-GW1 (replicated by router 21 to next-hop GW1) may be formatted, using an IPv4 Option, as depicted in FIG. 57.

When GW1 receives the packet above from GW1, it replicates it further to GW2, GW3 and GW4.

The copy of the packet eventually received by GW3 is depicted in FIG. 58. This packet is chosen to demonstrate the processing of TAG.

The GW3 processes the EMR packet (which includes processing of TAG). The GW3 may process the EMR packet based on data plane states of unicast routes and tree addresses maintained in GW3, an example of which is presented with respect to FIG. 59.

Figure 59:
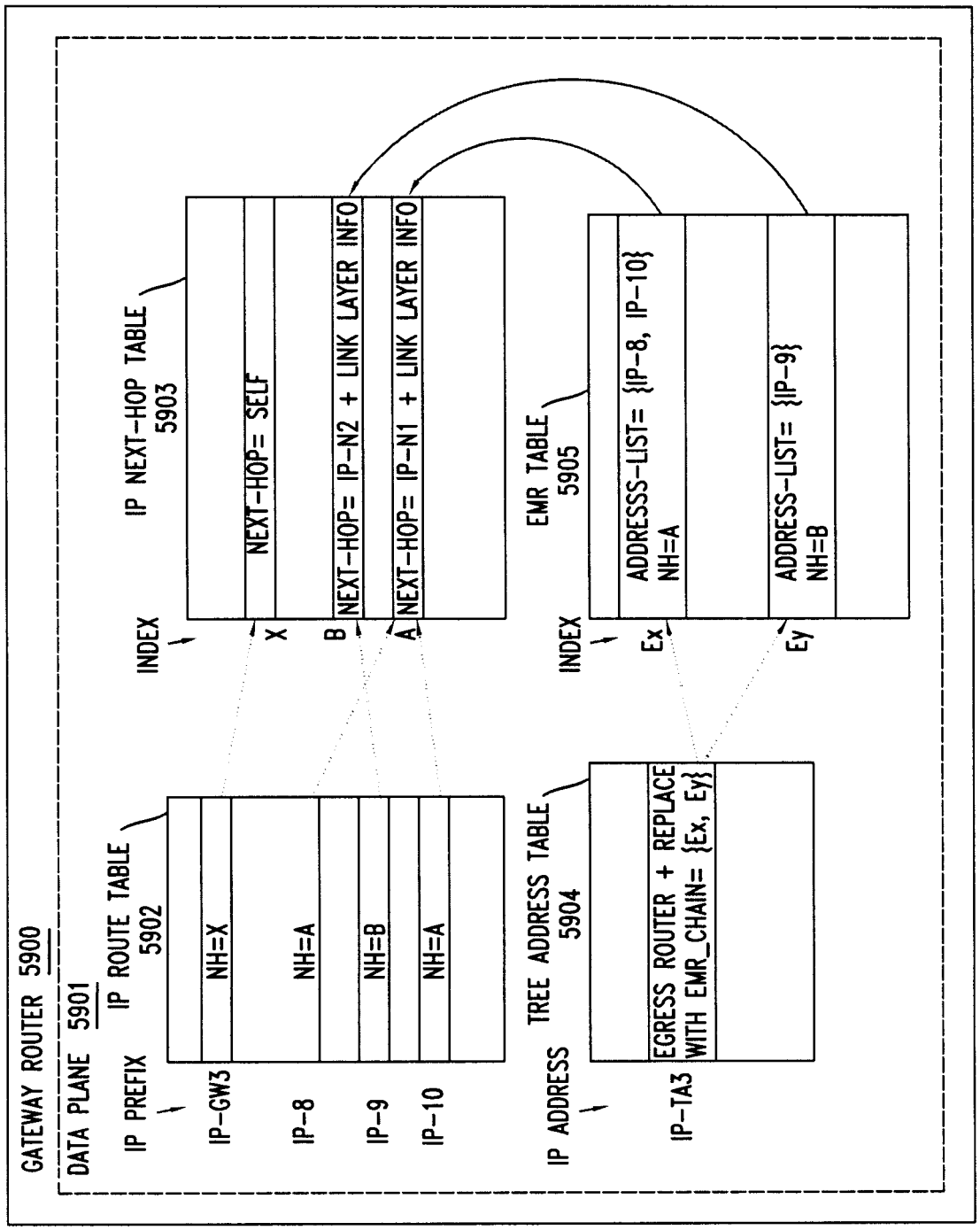
FIG. 59 depicts example dataplane states at an example gateway router, for unicast IP routes at the example gateway router, for stateless IP multicast based on Model-B.

FIG. 59 depicts example dataplane states at an example gateway router, for unicast IP routes at the example gateway router, for stateless IP multicast based on Model-B. In FIG. 59, a gateway router 5900 includes a dataplane 5901 including an IP Route Table 5902, an IP Next-Hop Table 5903, a Tree Address Table 5904, and an EMR Table 5905.

The GW3 may process the EMR packet from GW1, with Process_EMR_Packet_Model_B( . . . ), as follows:

1. The first IP address in the EMR address indicates that it is a Tree Address, which is part of a TAG. So, it processes the TAG={IP-TA3, IP-GW3}. Looks up the Gateway Address IP-GW3 in the IP Route Table, which points to the NH Index X. The Next-Hop Table entry X indicates that IP-GW3 is a local address, so it processes the Tree Address IP-TA3. Steps 2-5 below follow the procedure Process_EMR_TreeAddress( . . . ).

2. Looks up IP-TA3 in the Tree Address Table which contains the pointers to build the mapped EMR. The entry in Tree Address Table includes a EMR_Chain. The EMR_Chain holds the list of pointers to EMR Table entries Ex and Ey. The mapped EMR is further segregated into "sub" EMRs per next-hop, so the EMR_Chain is the list of sub-EMRs. In this case, there are 2 sub-EMRs—Ex and Ey. Additionally, the Tree Address Table entry also indicates that this is also an egress router, so a local copy of the packet is created and is sent to the upper layer. It is noted that an entry in EMR Table is prebuilt, which is an entry from NextHopAddressList[ ] per next-hop, as indicated as an optimization for Process_EMR_TreeAddress( . . . ). The mapped EMR is ={IP-8, IP-9, IP-10}. Each address is looked up in the Route Table and then segregated into groups by common next-hops. Each group (e.g., Ex or Ey) is then programmed as an entry in EMR Table. Thus, the IP Route Table lookup for each address in the mapped EMR is eliminated during processing of the packet.

3. EMR table entry Ex includes Address-List {IP-8, IP10} and NH Index A. The Next-Hop Table entry A is programmed with Next-Hop N1. So, a NAL is created as NAL-N1={IP8, IP10}.

4. EMR table entry Ey includes Address-List {IP-9} and NH Index B. The Next-Hop Table entry B is programmed with Next-Hop N2. So, a NAL is created as NAL-N2={IP-9}.

5. At this point, there are no more EMR entries to process. The resultant NALs are as follows: (1) NAL-N1={IP-8, IP-10} to Next-hop IP-N1 and (2) NAL-N2={IP-9} to Next-hop IP-N2.

6. For each NAL, an EMR packet is created and is sent to its respective next-hop. The EMRs are follows:
   6.1. The EMR packet for NAL-N1 (replicated by router GW3 to next-hop N1) may be formatted, using an IPv4 Option, as depicted in FIG. 60.
   6.2. The EMR packet for NAL-N2 (replicated by router GW3 to next-hop NAL) may be formatted as depicted in FIG. 61 (since this EMR contains only one IP address (i.e., IP-9) it may, as an optimization, be sent as regular unicast packet with DA=IP-9).

It will be appreciated, although primarily presented within the context of processing of an IPv4 EMR packet by based on an IPv4 Option, an IPv4 EMR packet may be processed in a similar manner based on other encoding capabilities (e.g., based on an IPv4-EMR Shim Header), an IPv6 EMR packet may be originated in a similar manner based on various encoding capabilities (e.g., based on an IPv6 EH, an IPv6-EMR Shim Header, or the like), or the like, as well as various combinations thereof.

It will be appreciated that various example embodiments for supporting stateless IP multicast may be configured to support handling of multicast packets based on stateless IP multicast using Model-B using various other processing capabilities.

Various example embodiments for supporting stateless IP multicast may be configured to support handling of multicast packets based on stateless IP multicast, where handling of multicast packets based on stateless IP multicast may include origination of multicast packets by ingress routers, processing of multicast packets by transit routers, processing of multicast packets by egress routers, or the like, as well as various combinations thereof. Various embodiments for supporting handling of multicast packets for stateless IP multicast are discussed further below.

Figure 62:
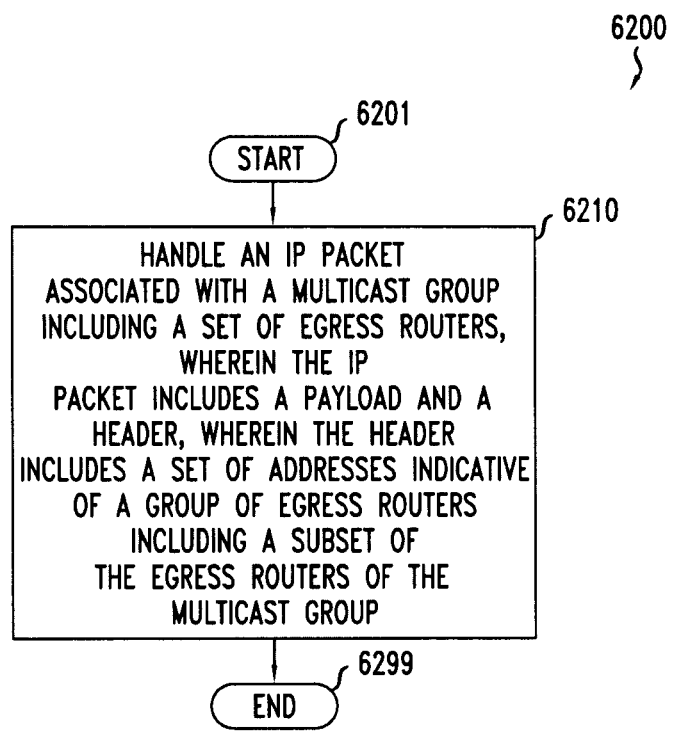
FIG. 62 depicts an example embodiment of a method for use by a router to handle an IP packet based on stateless IP multicast in an IP network.

FIG. 62 depicts an example embodiment of a method for use by a router to handle an IP packet based on stateless IP multicast in an IP network. It will be appreciated that, although primarily presented as being performed serially, at least a portion of the functions of method 6200 of FIG. 62 may be performed contemporaneously or in a different order than as presented with respect to FIG. 62. At block 6201, method 6200 begins. At block 6210, handle an Internet Protocol (IP) packet for a multicast group, wherein the IP packet includes a payload and a header, wherein the header includes a set of addresses indicative of a group of egress routers including a subset of the egress routers of the multicast group. At block 6299, method 6200 ends. It will be appreciated that various embodiments presented herein with respect to handling of multicast packets by routers may be used within the context of method 6200 of FIG. 62.

Figure 63:
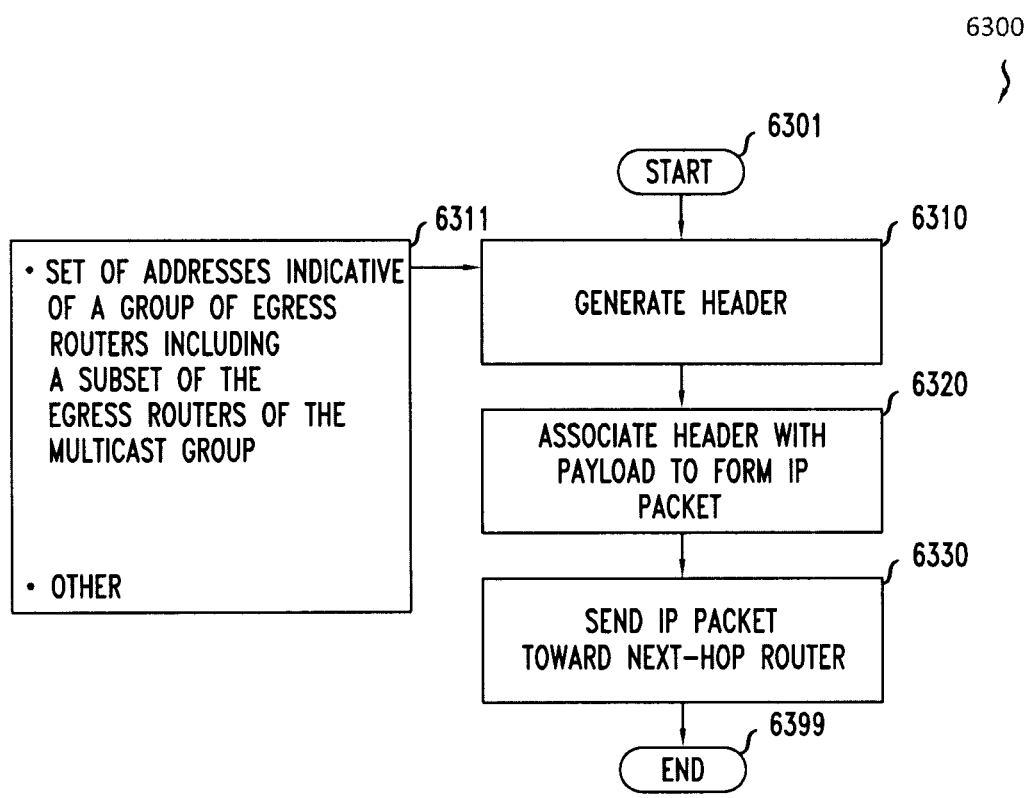
FIG. 63 depicts an example embodiment of a method for use by an ingress router of a multicast group to handle an IP packet based on stateless IP multicast in an IP network.

FIG. 63 depicts an example embodiment of a method for use by an ingress router of a multicast group to handle an IP packet based on stateless IP multicast in an IP network. It will be appreciated that, although primarily presented as being performed serially, at least a portion of the functions of method 6300 of FIG. 63 may be performed contemporaneously or in a different order than as presented with respect to FIG. 63. At block 6301, method 6300 begins. At block 6310, a header is generated. As indicated by block 6311, the header includes a set of addresses indicative of a group of egress routers including a subset of the egress routers of the multicast group. It will be appreciated that the header may include various other information. At block 6320, the header is associated with a payload to form an IP packet. At block 6330, the IP packet is sent toward a next-hop router. At block 6399, method 6300 ends. It will be appreciated that various embodiments presented herein with respect to handling of multicast packets by routers may be used within the context of method 6300 of FIG. 63.

Figure 64:
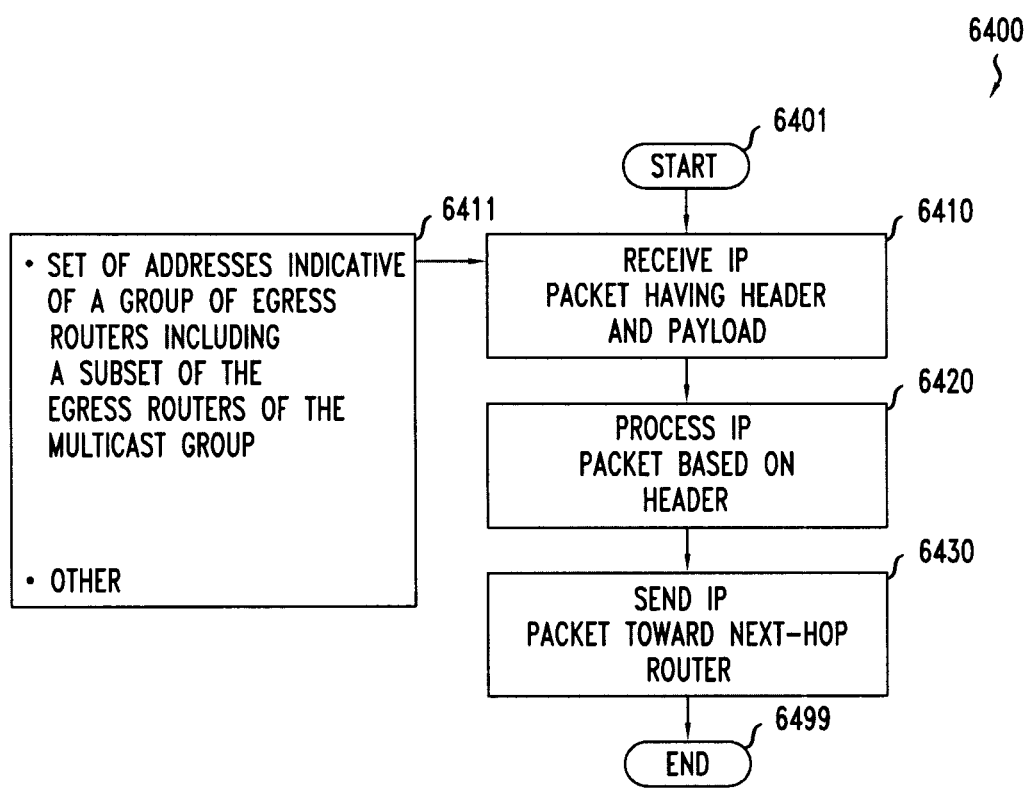
FIG. 64 depicts an example embodiment of a method for use by a transit router to handle an IP packet based on stateless IP multicast in an IP network.

FIG. 64 depicts an example embodiment of a method for use by a transit router to handle an IP packet based on stateless IP multicast in an IP network. It will be appreciated that, although primarily presented as being performed serially, at least a portion of the functions of method 6400 of FIG. 64 may be performed contemporaneously or in a different order than as presented with respect to FIG. 64. At block 6401, method 6400 begins. At block 6410, an IP packet is received. The IP packet includes a header and a payload. As indicated by block 6411, the header includes a set of addresses indicative of a group of egress routers including a subset of the egress routers of the multicast group. It will be appreciated that the header may include various other information. At block 6420, the IP packet is processed based on the header. The processing of the IP packet may include identifying a next-hop router for the IP packet based on the header. At block 6430, the IP packet is sent toward the next-hop router. At block 6499, method 6400 ends. It will be appreciated that various embodiments presented herein with respect to handling of multicast packets by transit routers (including gateway routers that are also transit routers) may be used within the context of method 6400 of FIG. 64.

Figure 65:
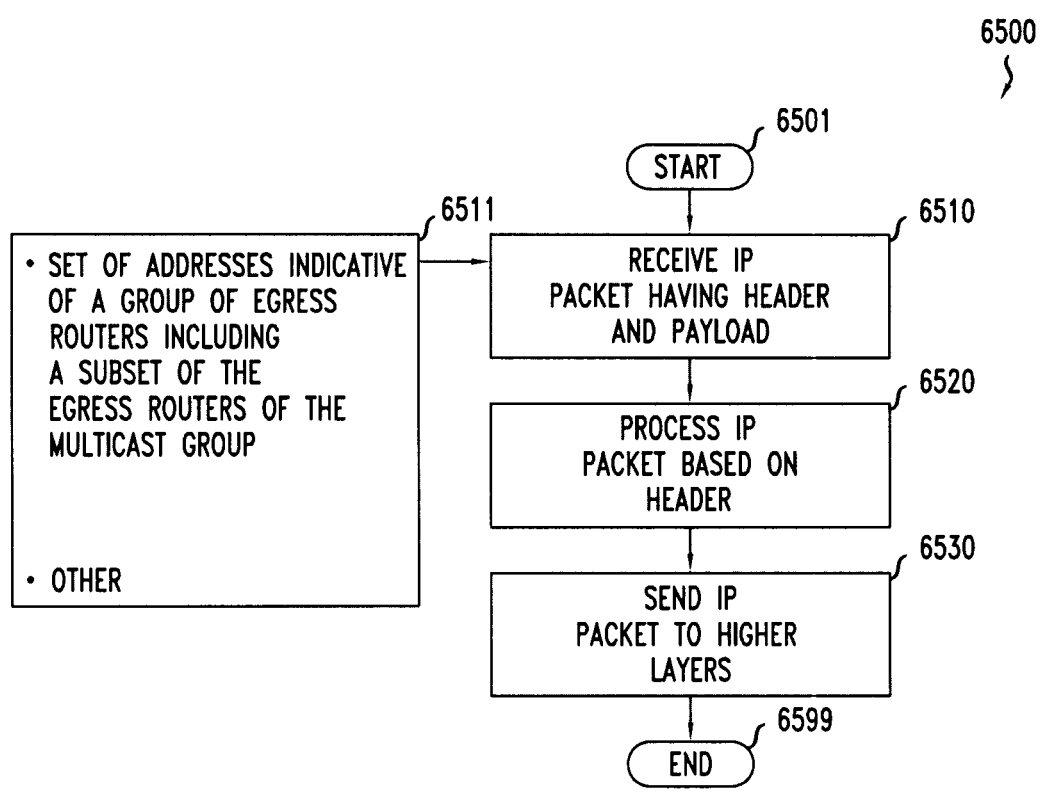
FIG. 65 depicts an example embodiment of a method for use by an egress router of a multicast group to handle an IP packet based on stateless IP multicast in an IP network.

FIG. 65 depicts an example embodiment of a method for use by an egress router of a multicast group to handle an IP packet based on stateless IP multicast in an IP network. It will be appreciated that, although primarily presented as being performed serially, at least a portion of the functions of method 6500 of FIG. 65 may be performed contemporaneously or in a different order than as presented with respect to FIG. 65. At block 6501, method 6500 begins. At block 6510, an IP packet is received. The IP packet includes a header and a payload. As indicated by block 6511, the header includes a set of addresses indicative of a group of egress routers including a subset of the egress routers of the multicast group. It will be appreciated that the header may include various other information. At block 6520, the IP packet is processed based on the header. The processing of the IP packet may include identifying that the IP packet is intended for the egress router. At block 6530, the IP packet is sent to higher layers of the egress router. At block 6599, method 6500 ends. It will be appreciated that various embodiments presented herein with respect to handling of IP packets by egress routers may be used within the context of method 6500 of FIG. 65.

Figure 66:
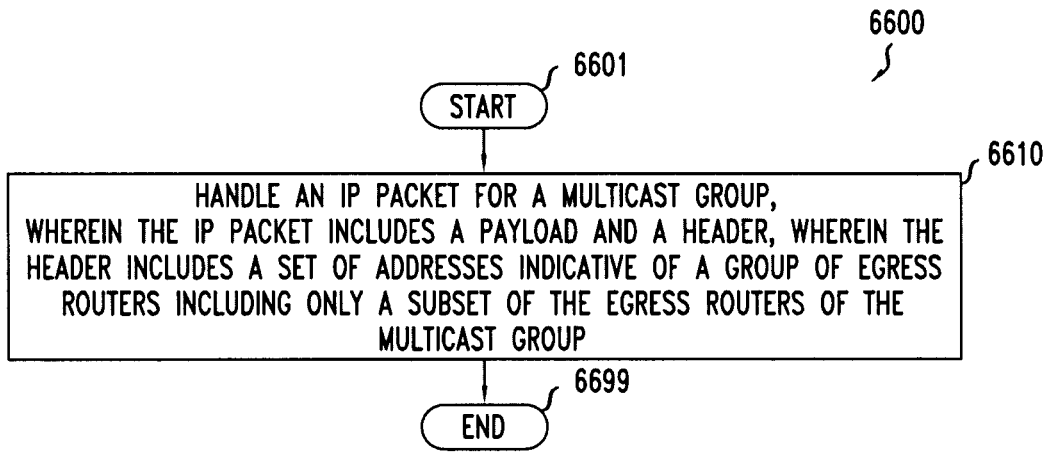
FIG. 66 depicts an example embodiment of a method for use by a router to handle an IP packet based on stateless IP multicast in an IP network based on Model-A.

FIG. 66 depicts an example embodiment of a method for use by a router to handle an IP packet based on stateless IP multicast in an IP network based on Model-A. It will be appreciated that, although primarily presented as being performed serially, at least a portion of the functions of method 6600 of FIG. 66 may be performed contemporaneously or in a different order than as presented with respect to FIG. 66. At block 6601, method 6600 begins. At block 6610, handle an Internet Protocol (IP) packet for a multicast group, wherein the IP packet includes a payload and a header, wherein the header includes a set of addresses indicative of a group of egress routers including only a subset of the egress routers of the multicast group. At block 6699, method 6600 ends. It will be appreciated that various embodiments presented herein with respect to handling of multicast packets by routers may be used within the context of method 6600 of FIG. 66.

Figure 67:
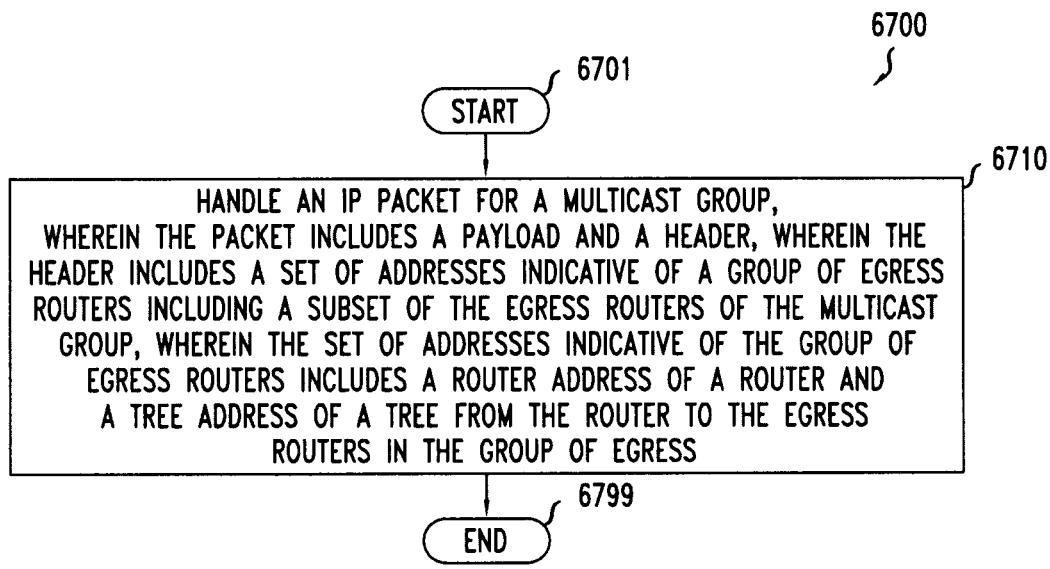
FIG. 67 depicts an example embodiment of a method for use by a router to handle an IP packet based on stateless IP multicast in an IP network based on Model-B.

FIG. 67 depicts an example embodiment of a method for use by a router to handle an IP packet based on stateless IP multicast in an IP network based on Model-B. It will be appreciated that, although primarily presented as being performed serially, at least a portion of the functions of method 6700 of FIG. 67 may be performed contemporaneously or in a different order than as presented with respect to FIG. 67. At block 6701, method 6700 begins. At block 6710, handle an Internet Protocol (IP) packet for a multicast group, wherein the IP packet includes a payload and a header, wherein the header includes a set of addresses indicative of a group of egress routers including a subset of the egress routers of the multicast group, wherein the set of addresses indicative of the group of egress routers includes a router address of a router and a tree address of a tree from the router to the egress routers in the group of egress routers. At block 6799, method 6700 ends. It will be appreciated that various embodiments presented herein with respect to handling of multicast packets by routers may be used within the context of method 6700 of FIG. 67.

Various example embodiments for supporting stateless IP multicast may be configured to support various operational features configured to support stateless IP multicast.

In at least some embodiments, for example, the number of routers that can be configured to share a group (i.e., GROUP_MAX) may be configurable. In at least some embodiments, for example, the maximum number of routers per group may be limited based on the maximum tolerable overhead of the EMR (i.e., EMR_MAX). For example, assume that up to 30 routers are allowed to share a group. If the ingress and egress routers of a multicast flow are confined to the same group, then an EMR may carry up to 30 IP addresses. If the MTU on the IP network is 1500 bytes, then the IPv4 encoded EMR overhead is ~8% and the IPv6 encoded EMR overhead is ~32%. If the MTU is 9000 bytes (e.g., jumbo frames), then the IPv4 encoded overhead becomes 1.33% and the IPv6 encoded EMR overhead becomes 5%.

In at least some embodiments, for example, for a new multicast flow that has egress routers spanning across multiple groups, the gateway routers are programmed (e.g., by the centralized controller) with the tree addresses. In the example of IP-TV deployments, the egress routers are usually added or removed from the multicast flow (e.g., program channel) incrementally. As such, the tree address mapped EMR in the gateway router needs be updated when individual subscribers join and leave. So, bulk programming of gateway routers across all groups generally does not arise in this use case. Whenever an egress router is added or removed from the flow, the Tree Address→EMR mapping in the parent gateway router of the egress router only needs to be updated with the updated EMR.

In at least some embodiments, for example, for sporadic multicast traffic such as in a distributed storage cluster, the ingress router sporadically multicasts packets to various subsets of the egress routers; however, such subsets are not chosen at random every time as the number of such subsets is finite. When stateless IP multicast is used to handle such sporadic flows, the tree address may be allocated and pre-programmed in the stakeholder gateway routers for each possible subset.

In at least some embodiments, for example, if there is a use case where tree address programming latency on gateway routers is not tolerable, then ingress router can start sending EMR packets "directly" to all egress routers (i.e., with sub-optimal EMR overhead) until the programming of the gateway routers is complete.

In at least some embodiments, for example, since most of the cost in stateless IP multicast resides in the tree address related states at the gateway routers. For example, since a tree address is allocated at a gateway router per flow, so the Tree Table entries at the gateway router grow linearly with the number of flows passing through the gateway router.

It will be appreciated that various other operational features may be configured to support stateless IP multicast.

Various example embodiments for supporting stateless IP multicast may be configured to support various control plane functions configured to support stateless IP multicast. EMR multicast re-uses the data plane state of the unicast IP routes (e.g., set-up by Routing protocols such as IS-IS, OSPFv2, OSPFv3, BGP-LS, or the like), and, thus, may operate with little or no control plane extensions. In at least some embodiments, stateless IP may be supported using one or more of group membership management (e.g., group membership of routers (for Model-A and Model-B), assignment of gateway routers per group (for Model-B), or the like, as well as various combinations thereof), tree address management (e.g., allocation and programming of tree addresses at gateway routers (for Model-B)), or the like, as well as various combinations thereof.

In at least some embodiments, stateless IP may be supported using group membership management (e.g., group membership of routers (for Model-A or Model-B), assignment of gateway routers per group (for Model-B), or the like, as well as various combinations thereof). Group membership of a router is configured in a controller (e.g., an SDN Controller). The controller maintains a database of the group membership of the routers in a stateless IP multicast domain, where the group membership includes the member routers and the gateway routers (within the member routers). For example, the group membership database maintained for the topology in FIG. 5 may be as follows:

TABLE 1

| Group | Member Routers | Gateway Routers |
|---|---|---|
| 1 | IP-1, IP-2, IP-3, IP-4, IP- 14, IP-15, IP-21, IP-22, IP-GW1 | IP-GW1 |
| 2 | IP-5, IP-6, IP-7, IP-16, IP-17, IP-GW2 | IP-GW2 |
| 3 | IP-8, IP-9, IP-10, IP-18, IP-19, IP-GW3 | IP-GW3 |
| 4 | IP-11, IP-12, IP-13, IP-20, IP-GW4 | IP-GW4 |

The group membership information may be distributed in various ways. In at least some embodiments, the group membership information may be distributed by the SDN controller to the routers. In at least some embodiments, the group membership information may be distributed by configuring the group membership information at the router and using one or more control protocols (e.g., IS-IS, OSPFv2, OSPFv3, BGP-LS, or the like) to distribute the group membership information. In at least some such embodiments, segment routing capabilities of the control protocols may be extended with group membership information in order to support distribution of the group membership information, e.g., using SR Extensions to IS-IS (e.g., as defined in the draft-ietf-isis-segment-routing-extensions-15 document), SR Extensions to OSPFv2 (e.g., as defined in the draft-ietf-ospf-segment-routing-extensions-24 document), SR Extensions to OSPFv3 (e.g., as defined in the draft-ietf-ospf-ospfv3-segment-routing-extensions-11 document), SR Extensions to BGP-LS (e.g., as defined in the draft-ietf-idr-bgp-ls-segment-routing-ext-04 document), or the like, as well as various combinations thereof.

In at least some embodiments of Model-A, group membership information may be pulled on demand from the centralized controller by using an ingress router initiated paradigm. In at least some embodiments, for a P2MP flow, an ingress router may initiate resolution of group membership of the egress routers. The ingress router learns the list of egress routers from the multicast flow overlay and sends a resolution request (including <ingress router, list of egress routers>) to the centralized controller (e.g., by using the procedure SendGroupResolutionRequest_A ( )). The centralized controller, upon receiving the resolution request from the controller, may perform the following: (1) resolve the group membership of the ingress router and the egress routers by referring to the group membership database, and (2) notify the ingress router with the <list of <group id, list of child egress routers>>.

In at least some embodiments of Model-A, group membership information may be pushed by the centralized controller to egress routers using a centralized controller initiated paradigm. In at least some embodiments, for a MP2MP flow (e.g., where the centralized controller may participate in the multicast flow overlay, such as where a centralized controller may participate in BGP to learn about MVPN routes), the centralized controller may push group membership information to all PE (Provider Edge) routers (e.g., MVPN sites) participating in the flow. Here, the centralized controller has the database of PE routers learned from MVPN routes and, thus, may perform the following: (1) resolve the group membership of all PE routers by referring to group membership database, (2) provides each PE router with the <list of <group id, list of child PE routers>>.

In at least some embodiments of Model-A, a group management protocol (GMP) may be configured to operate between the centralized controller and the ingress router(s). It is noted that transit routers do not need to participate in GMP, may be completely agnostic to it, and, thus, no control plane extension is required. The GMP may use a transport channel that is reliable (e.g., TCP, SCTP, or the like) and efficient (e.g., minimal delay, minimal response time, high throughput, or the like), and that operates on IP. The GMP may be based on configuration of the ingress router(s) for IP reachability to the centralized controller (e.g., having the IP address of the centralized controller and being able route to it). It is noted that a router may use the loopback address to set up the IP connectivity. The GMP may operate based on request→response transactions. The GMP may operate based on request→response transactions in which each message includes a message-id (e.g., a requester generates a locally unique message-id and includes that in a request and the responder includes the same message-id in its response back to requester, such that the message-id sets the context of a unique request→response transaction).

In at least some embodiments of Model-A, when an ingress router sets up a new multicast flow then the following procedure may be performed based on GMP:

1. The ingress router sends a <Group Resolution Request> message to the centralized controller. The <Group Resolution Request> message includes the following information: {message-id, ingress router, list of egress routers}, where the "message-id" is the unique message-id generated locally by ingress router, the "ingress router" is the loopback address of the ingress router, and the "list of egress routers" is a list of the loopback addresses of the egress routers in the multicast flow. The ingress router makes an association of message-id to the multicast flow.

2. The centralized controller, based on the <Group Resolution Request> message from the ingress router, performs the following:
   2.1 Resolves group membership of the ingress router and the egress routers by referencing the group membership database in Table 1 above. This results in a list of entries <group-id, list of child egress routers>, which is referred to herein as the Group_Membership_List.
   2.2 Responds to the ingress router with a <Group Resolution Response> message that includes the following information: {message-id, list of tuples <group-id, list of child egress routers>}.

3. The ingress router, based on the <Group Resolution Response> message from the centralized controller, determines the multicast flow from the message-id, based upon the association made in step 1. The ingress router caches the list of tuples <group-id, list of child egress routers> which is referred to in order generate the EMR packets for the multicast flow.

When an ingress router tears down an existing multicast flow, then no procedures are required in GMP since the centralized controller does not maintain any flow specific state.

It will be appreciated that the GMP procedures discussed where the setup of a new multicast flow or tear down an existing multicast flow is initiated by an ingress router (e.g., ingress router initiated paradigm) also may be utilized where the setup of the new multicast flow or teardown of the existing multicast flow is initiated by the centralized controller (e.g., in centralized controller initiated paradigm). In at least some such embodiments, the multicast overlay component of the centralized controller may be considered to play the role of the ingress router in the GMP procedures discussed above (e.g., group resolution request is initiated by the centralized controller itself and the associated group resolution response is the unsolicited from the centralized controller to the ingress routers).

Various embodiments of the process for group management based on GMP, as discussed above, are presented in FIG. 68.

Figure 68:
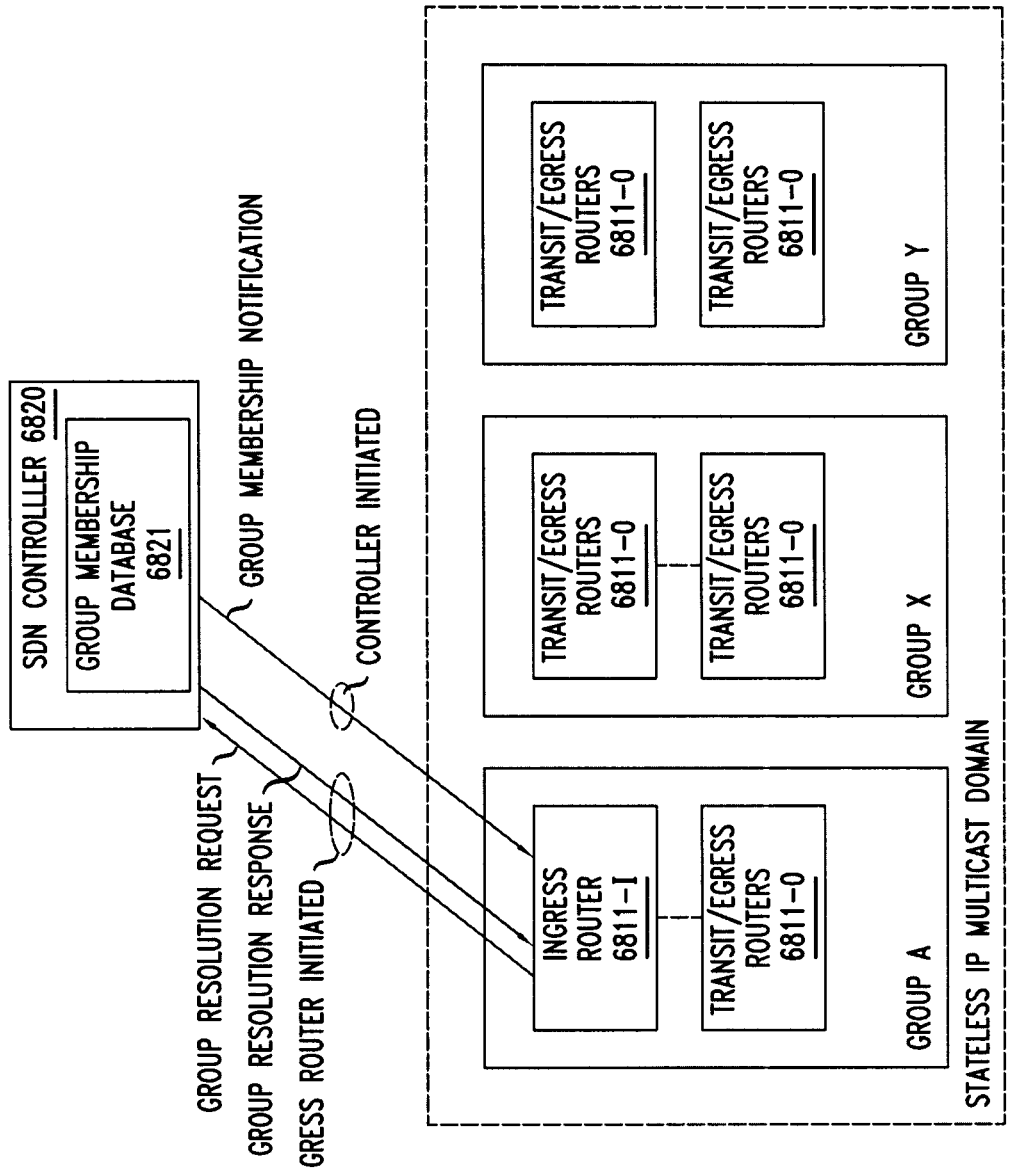
FIG. 68 depicts an example of group management, based on a group management protocol, for stateless IP multicast based on Model-A or Model-B.

FIG. 68 depicts an example of group management, based on a group management protocol, for stateless IP multicast based on Model-A or Model-B.

As depicted in FIG. 68, a centralized controller (illustratively, SDN controller 6820 is configured to interact with various routers for supporting group management for groups of egress routers including a Group A that includes an ingress router 6811-I and transit/egress routers 6811-O, a Group X that includes transit/egress routers 6811-O, and a Group Y that includes transit/egress routers 6811-O. The SDN controller 6820 includes a group membership database 6821 configured to store group membership information for multicast groups which may be used for group management based on the group management protocol.

As depicted in FIG. 68, for ingress router initiated group management, the ingress router 6811-I may send a group resolution request to SDN controller 6820 and receive an associated group resolution response.

As depicted in FIG. 68, for controller-initiated group management, the SDN controller 6820 may send a group membership notification to ingress router 6811-I.

It will be appreciated that group management, including group management based on GMP, may utilize various other types of messages which may be exchanged between various elements under various conditions.

It will be appreciated that group management based on GMP may be supported using various other functions.

In at least some embodiments of Model-B, stateless IP multicast may be supported using tree address management (e.g., allocation and programming of tree addresses at gateway routers).

In at least some embodiments, for a multicast flow, tree address and associated tree address→EMR mappings may be configured in gateway routers. It is noted that, if all participating routers in a flow are located in the same group, then an ingress router can multicast to egress routers directly, without involving the gateway router. In at least some embodiments, for a multicast flow that spans multiple groups, allocation and programming of tree addresses at the gateway routers may be performed by the centralized controller. As a result, for each "active" multicast flow, the centralized controller may maintain a database of tree address→EMR mappings at the various gateway routers (which may be referred to as a tree address mapping database (TAMD)). For example, the TAMD maintained by the centralized controller for the topology in FIG. 5 may be as follows:

TABLE 2

| Ingress Router, Flow-ID | Gateway Router | Egress Routers | Tree Address |
|---|---|---|---|
| IP-X, X1 | . . . | . . . | . . . |
| IP-1, 10 | IP-GW1 | IP-2, IP-3, IP-4 | IP-TA1 |
|  | IP-GW2 | IP-5, IP-6, IP-7 | IP-TA2 |
|  | IP-GW3 | IP-8, IP-9, IP-10, IP-GW3 | IP-TA3 |
|  | IP-GW4 | IP-11, IP-12, IP-13 | IP-TA4 |
| IP-Y, Y1 | . . . | . . . |  |
|  |  | . . . |  |
|  |  | . . . |  |
| IP-N, Z1 | . . . | . . . |  |
|  |  | . . . |  |

The tree address setup and teardown at the centralized controller may be initiated in various ways (e.g., using an ingress router initiated paradigm, using a centralized controller initiated paradigm, or the like).

In at least some embodiments, tree address setup and teardown at the centralized controller may be initiated using an ingress router initiated paradigm. In at least some embodiments, for a P2MP flow, an ingress router may initiate the set-up of tree addresses. The ingress router learns the list of egress routers from the multicast flow overlay and sends a resolution request (including <ingress router, list of egress routers>) to the centralized controller (e.g., by using the procedure SendGroupResolutionRequest_B ( )). The centralized controller, upon receiving the resolution request from the controller, may perform the following: (1) resolve the group membership of the ingress router and the egress routers by referring to the group membership database, (2) select a gateway router for each resolved group by referring to the group membership database, (3) at each selected gateway router, allocate a tree address and programs TreeAddress→EMR mapping, and (4) notify the ingress router with the <list of local egress routers, list of <gateway router, tree address>>.

In at least some embodiments, tree address setup and teardown at the centralized controller may be initiated using a centralized controller initiated paradigm. In at least some embodiments, for a MP2MP flow (e.g., where the centralized controller may participate in the multicast flow overlay, such as where a centralized controller may participate in BGP to learn about MVPN routes), the centralized controller may initiate the set-up of tree addresses. Here, the centralized controller has the database of PE routers and, thus, may perform the following: (1) resolve the group membership of all PE routers by referring to group membership database, (2) select a gateway router for each resolved group by referring to group membership database, (3) at each selected gateway router, allocate a tree address and program the TreeAddress→EMR mapping, and (4) provides each PE router with the <list of local egress routers, list of <gateway router, tree address>>.

In at least some embodiments, a tree address management protocol (TAMP) may be configured to operate between the centralized controller, the ingress router(s), and the gateway routers. The TAMP may use a transport channel that is reliable (e.g., TCP, SCTP, or the like) and efficient (e.g., minimal delay, minimal response time, high throughput, or the like), and that operates on IP. The TAMP may be based on configuration of the ingress router(s) and gateway routers for IP reachability to the centralized controller (e.g., having the IP address of the centralized controller and being able route to it). It is noted that a router may use the loopback address to set up the IP connectivity. The TAMP may operate based on request→response transactions. The TAMP may operate based on request→response transactions in which each message includes a message-id (e.g., a requester generates a locally unique message-id and includes that in a request and the responder includes the same message-id in its response back to requester, such that the message-id sets the context of a unique request→response transaction).

In at least some embodiments, when an ingress router sets up a new multicast flow or updates its list of egress routers then following procedure may be performed based on TAMP:

1. The ingress router sends a <Tree Address Setup> message to the centralized controller. The <Tree Address Setup> message includes the following information: {message-id, flow-id, ingress router, list of egress routers}, where the "message-id" is the unique message-id generated locally by ingress router, the "flow-id" is the unique multicast flow identifier generated locally by the ingress router to identify the multicast flow, the "ingress router" is the loopback address of the ingress router, and the "list of egress routers" is a list of the loopback addresses of the egress routers in the multicast flow.

2. The centralized controller, based on the <Tree Address Setup> message from the ingress router, performs the following:
   2.1. Creates the context of the message by {ingress router, message-id}.
   2.2. Resolves group membership of the ingress router and the egress routers by referencing the group membership database in Table 1 above. This results in a list of entries <group-id, list of child egress routers>, which is referred to herein as the Group_Membership_List.
   2.3. Selects a gateway router from each group-id in the Group_Membership_List and updates the group-id in each entry in the list with its gateway router (i.e., each entry becomes <gateway router, list of child egress routers>).
   2.4 Looks up the multicast flow <ingress router, flow-id> in the TAMD. If the entry does not exist (i.e., the multicast flow does not already exist in the TAMD), then a new entry is created for the multicast flow (with gateway routers and egress routers for that entry being added from the Group_Membership_List). If the entry does exist (i.e., the multicast flow already exists in the TAMD, then the gateway routers and egress routers for that entry are updated from the Group_Membership_List.
   2.5. Updates a list of gateway routers for the TAM. This is performed irrespective of whether it was a new multicast flow entry or a modified multicast flow entry (in 2.4 above), as this results in a list of gateway routers to be updated for the TAM. This list of gateway routers to be updated for the TAM is referred to as Gateway_Routers_Update_List, where each entry is a tuple <gateway router, list of child egress routers, tree address>. If the gateway router is newly added to the multicast flow, then the tree address is 0. If the gateway router is deleted, then list of child egress routers is empty.
   2.6. Sends, to each gateway router in the Gateway_Routers_Update_List, a <Tree Address Mapping Request> message that includes the following information: {message-id, list of child egress routers, tree address}, where the "message-id" is the unique message-id generated locally by the centralized controller (and the context of the message-id is associated with <ingress router, flow-id>), the "list of child egress routers" is a list of loopback addresses of egress routers managed by the gateway router (in a deletion request, this list is empty), and "tree address" is indicative as to whether this is a modification request or a deletion request.

3. The gateway routers, based on the respective <Tree Address Mapping Request> messages from the centralized controller, perform the following for each of the respective <Tree Address Mapping Request> messages:
   3.1. If the list of child egress routers is empty, deletes the Tree Address Table entry for the received tree address, releases all other resources held by that tree address, and proceeds to step 3.4.

3.2. If the tree address is 0, allocates a new tree address from its local IP address space and proceeds to step 3.3; otherwise, if the tree address is not 0, proceeds to step 3.4.

3.3. Programs the tree address in the Tree Address Table with an empty list of EMRs (which is referred to as Tree_EMR_List).

3.4. Looks up each child egress router in the IP Route Table to retrieve its next-hop, respectively, and creates a list of the next-hops (which is referred to as Next-Hop Address List[ ] where each entry includes the list of child egress routers (IP addresses) per unique next-hop).

3.5. In Tree_EMR_List, link each entry from step 3.5. If Gateway Router is also in the list of child egress routers then mark the Tree Address as egress route.

3.6. Responds to the centralized controller with a <Tree Address Mapping Response> message that includes the following information: {message-id, tree address}.

4. The centralized controller, based on the respective <Tree address Mapping Response> messages from the gateway routers, performs the following for each of the respective <Tree Address Mapping Response> messages:

4.1. Correlates the context of the <ingress router, flow-id> from the received message-id.

4.2. If it was in response to a new tree address creation, looks up the corresponding <ingress router, flow-id> entry in the TAMD and records the received tree address against the appropriate gateway router.

5. The centralized controller, based on receipt of all of the <Tree Address Mapping Response> messages from the gateway routers, responds to the ingress router with a <Tree Address Response> message that includes the following information: {message-id, flow-id, list of local egress routers, list of tuples <gateway router, tree address>}.

6. The ingress router, based on the <Tree Address Response> message from the centralized controller:

6.1. Determines the multicast flow from the flow-id.

6.2. Caches the list of local egress routers and the list of tuples <gateway router, tree address> which are referred to in order to generate the EMLS packets for the multicast flow.

In at least some embodiments, when an ingress router tears down an existing multicast flow, then following procedure may be performed based on TAMP:

1. The ingress router sends a <Tree address Teardown> message to the centralized controller. The <Tree address Teardown> message includes the following information: {message-id, flow-id, ingress router}, where "message-id" is the unique message-id generated locally by ingress router, "flow-id" is the unique multicast flow identifier at the ingress router that identifies the multicast flow, and "ingress router" is the loopback address of the ingress router.

2. The centralized controller, based on the Tree address Teardown> message from the ingress router, performs the following:

2.1. Looks up the entry in the TAMD that corresponds to the <ingress router, flow-id>.

2.2. Sends, for each gateway router in the TLMD entry, a <Tree Address Mapping Request> message including the following information: {message-id, list of child egress routers=NULL, tree address}, where "message-id" is the unique message-id generated locally by centralized controller (where the context of the message-id is associated with <ingress router, flow-id>), "list of child egress routers" is set to empty/NULL so that the gateway router deletes the tree address state, and "tree address" is the tree address from the TLMD entry.

It will be appreciate that the TAMP procedures discussed where the setup of a new multicast flow or tear down an existing multicast flow is initiated by an ingress router (e.g., in a ingress router initiated paradigm) also may be utilized where the setup of the new multicast flow or teardown of the existing multicast flow is initiated by the centralized controller (e.g., in a centralized controller initiated paradigm). In at least some such embodiments, the multicast overlay component of the centralized controller may be considered to play the role of the ingress router in the TAMP procedures discussed above (e.g., tree address setup/teardown is initiated by the centralized controller itself and the associated tree address response is the unsolicited from the centralized controller to the ingress routers).

Various embodiments of the process for tree address management based on TAMP, as discussed above, are presented in FIG. 69.

Figure 69:
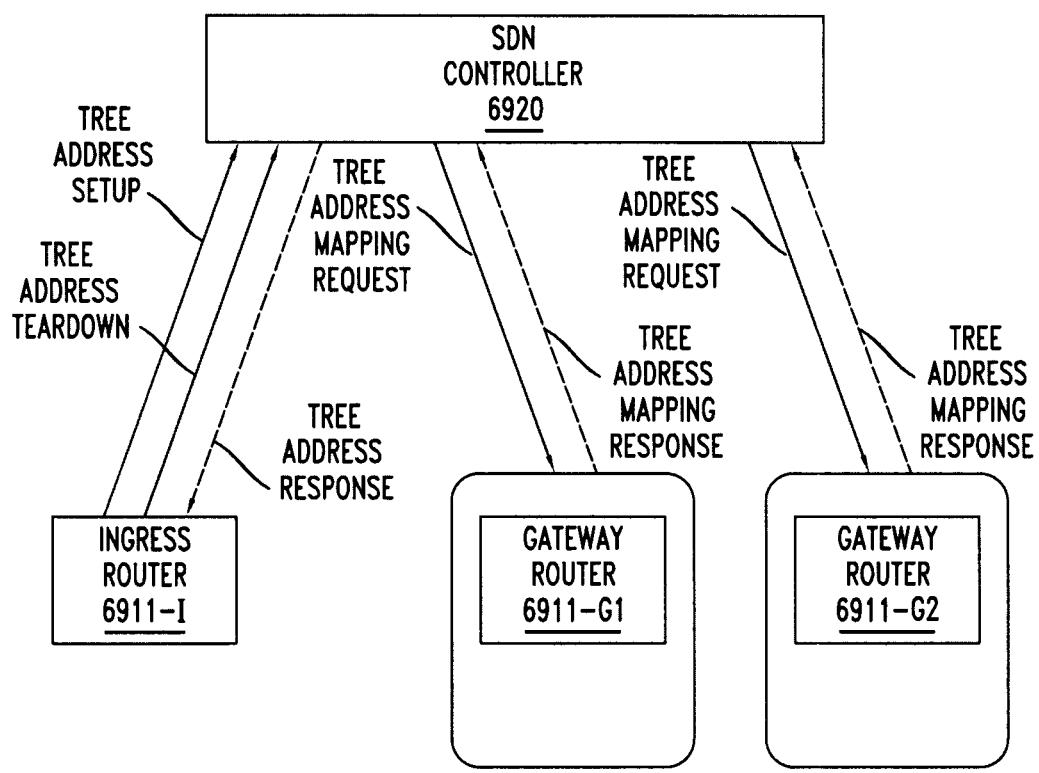
FIG. 69 depicts an example of tree address management, based on a tree address management protocol, for stateless IP multicast based on Model-B.

FIG. 69 depicts an example of tree address management, based on a tree address management protocol, for stateless IP multicast based on Model-B.

As depicted in FIG. 69, a centralized controller (illustratively, SDN controller 6920 is configured to interact with various routers (illustratively, an ingress router 2011-I and a pair of gateway routers 6911-G1 and 6911-G2) for supporting tree address setup and teardown.

As depicted in FIG. 69, the ingress router 6911-I may send a tree address setup message or a tree address teardown message to SDN controller 6920 and receive an associated tree address response.

As depicted in FIG. 69, the SDN controller 6920 may send a tree address mapping request to a gateway router 6911-G and receive an associated tree address mapping response.

It will be appreciated that tree address management, including tree address management based on TAMP, may utilize various other types of messages which may be exchanged between various elements under various conditions.

It will be appreciated that tree address management based on TAMP may be supported using various other functions.

Various example embodiments for supporting stateless IP multicast in packet networks may provide various advantages or potential advantages. For example, various example embodiments for supporting stateless IP multicast in packet networks may be configured to support stateless IP multicast using the IP data plane (e.g., reusing the IP control plane and the data plane of unicast IP routes without incurring additional states, or incurring only minimal additional state, in the IP control plane and the IP data plane). For example, various example embodiments for supporting stateless IP multicast in packet networks may be configured to support stateless IP multicast in packet networks in a manner that may obviate the need for use of Bit Index Explicit Replication (BIER), although it will be appreciated that BIER may still be used. Various example embodiments for supporting stateless IP multicast in packet networks may provide various other advantages or potential advantages.

Figure 70:
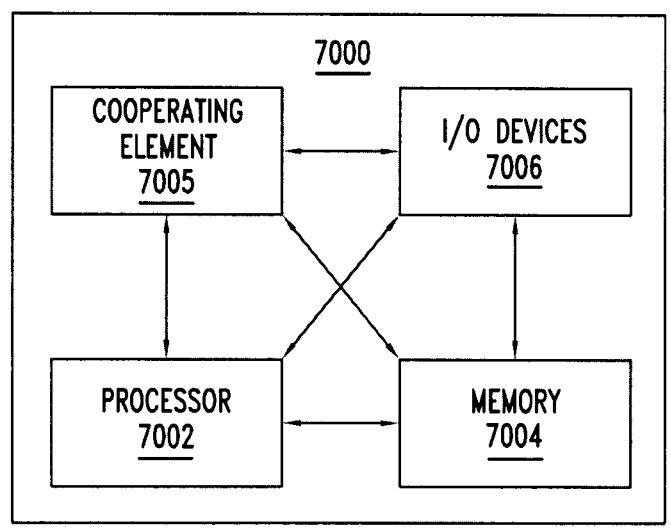
FIG. 70 depicts a high-level block diagram of a computer suitable for use in performing various functions presented herein.

FIG. 70 depicts a high-level block diagram of a computer suitable for use in performing various functions described herein.

The computer 7000 includes a processor 7002 (e.g., a central processing unit (CPU), a processor having a set of processor cores, a processor core of a processor, or the like) and a memory 7004 (e.g., a random access memory (RAM), a read only memory (ROM), or the like). The processor 7002 and the memory 7004 may be communicatively connected.

The computer 7000 also may include a cooperating element 7005. The cooperating element 7005 may be a hardware device. The cooperating element 7005 may be a process that can be loaded into the memory 7004 and executed by the processor 7002 to implement functions as discussed herein (in which case, for example, the cooperating element 7005 (including associated data structures) can be stored on a non-transitory computer-readable storage medium, such as a storage device or other storage element (e.g., a magnetic drive, an optical drive, or the like)).

The computer 7000 also may include one or more input/output devices 7006. The input/output devices 7006 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 7000 of FIG. 70 may represent a general architecture and functionality suitable for implementing functional elements described herein, portions of functional elements described herein, or the like, as well as various combinations thereof. For example, computer 7000 may provide a general architecture and functionality that is suitable for implementing one or more elements presented herein, such as a router 111 or a portion thereof, an SMSE 112 or a portion thereof, or the like.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus to at least:
   handle an Internet Protocol (IP) packet for a multicast group including a set of egress routers, wherein the IP packet includes a payload and a header, wherein the header includes a set of addresses indicative of a group of egress routers including a subset of the egress routers of the multicast group, wherein the set of addresses indicative of the group of egress routers includes a router address of a router and a tree address of a tree from the router to the egress routers in the group of egress routers.

2. The apparatus of claim 1, wherein the router includes a transit router between an ingress router of a multicast flow for the multicast group and the egress routers in the group of egress routers.

3. The apparatus of claim 1, wherein the router includes a gateway router configured to operate as a root of the tree from the gateway router to the egress routers in the group of egress routers.

4. The apparatus of claim 1, wherein the router address of the router includes an IP address of the router.

5. The apparatus of claim 1, wherein the tree address is configured to be mapped, by the router, to respective addresses of the egress routers in the group of egress routers.

6. The apparatus of claim 1, wherein the set of addresses indicative of the group of egress routers is included within an encoding of a shortcut.

7. The apparatus of claim 6, wherein the shortcut includes an Interior Gateway Protocol (IGP) based shortcut.

8. The apparatus of claim 6, wherein the shortcut includes a Multiprotocol Label Switching (MPLS) label switched path (LSP).

9. The apparatus of claim 8, wherein the MPLS LSP includes an MPLS Resource Reservation Protocol-Traffic Engineered (RSVP-TE) LSP or a Segment Routing-Traffic Engineered (SR-TE) LSP.

10. The apparatus of claim 6, wherein the shortcut includes a Segment Routing-Traffic Engineered (SR-TE) path using IP source routing.

11. The apparatus of claim 6, wherein the shortcut includes a source routed Interior Gateway Protocol (IGP) shortcut.

12. The apparatus of claim 11, wherein the source routed IGP shortcut is supported using an IP version 4 (IPv4) Shim Header or an IP version 6 (IPv6) Shim Header.

13. The apparatus of claim 11, wherein the source routed IGP shortcut is supported over an IP Shim Header provided over an IP version 4 (IPv4) Source Route Option or provided over an IPv4 Source Route Shim Header.

14. The apparatus of claim 11, wherein the source routed IGP shortcut is supported over an IP Shim Header provided over an IP version 6 (IPv6) Routing Header or provided over an IPv6 Routing Shim Header.

15. The apparatus of claim 1, wherein the set of addresses indicative of the group of egress routers is included within an IP version 4 (IPv4) Options Header, an IPv4 Shim Header, an IP version 6 (IPv6) Extension Header, or an IPv6 Shim Header.

16. The apparatus of claim 1, wherein the header includes a second set of addresses indicative of a second group of egress routers including a second subset of the egress routers of the multicast group.

17. The apparatus of claim 16, wherein the second set of addresses indicative of the second group of egress routers includes respective IP addresses of the egress routers in the second group of egress routers.

18. The apparatus of claim 16, wherein the second set of addresses indicative of the second group of egress routers includes a second router address of a second router and a second tree address of a second tree from the second router to the egress routers in the second group of egress routers.

19. The apparatus of claim 1, wherein, to handle the IP packet, the at least one memory and the computer program code are configured to, with the at least one processor, cause the apparatus to at least:
  determine, by a handling router, the egress routers of the multicast group;
  generate, by the handling router, the header based on the egress routers of the multicast group; and
  associate, by the handling router, the header with the payload to form the IP packet.

20. The apparatus of claim 1, wherein, to handle the IP packet, the at least one memory and the computer program code are configured to, with the at least one processor, cause the apparatus to at least:
  receive, by a handling router, the IP packet;
  determine, by the handling router based on the set of addresses indicative of the group of egress routers, an address associated with one of the egress routers;
  perform, by the handling router based on a lookup into an IP route table using the address associated with the one of the egress routers, a next-hop router for the IP packet; and
  initiate, by the handling router, handling of the IP packet based on the next-hop router for the IP packet.

21. The apparatus of claim 20, wherein, to initiate handling of the IP packet based on the next-hop router for the IP packet, the at least one memory and the computer program code are configured to, with the at least one processor, cause the apparatus to at least:
  provide, by the handling router, the IP packet to an upper layer of the handling router based on a determination that the next-hop router for the IP packet is the handling router.

22. The apparatus of claim 20, wherein, to initiate handling of the IP packet based on the next-hop router for the IP packet, the at least one memory and the computer program code are configured to, with the at least one processor, cause the apparatus to at least:
  replicate, by the handling router based on a determination that the next-hop router for the IP packet is a remote router, the IP packet to form a replicated IP packet; and
  send, by the handling router, the replicated IP packet toward the remote router.

23. The apparatus of claim 1, wherein, to handle the IP packet, the at least one memory and the computer program code are configured to, with the at least one processor, cause the apparatus to at least:
  receive, by the router, the IP packet;
  determine, by the router based on the set of addresses indicative of the group of egress routers, the router address of the router;
  perform, by the router based on a determination that the router address of the router identified the router, a lookup into a tree address table based on the tree address to identify respective IP addresses of the egress routers in the group of egress routers; and
  initiate, by the router, handling of the IP packet based on the respective IP addresses of the egress routers in the group of egress routers.

24. The apparatus of claim 23, wherein, to initiate handling of the IP packet based on the respective IP addresses of the egress routers in the group of egress routers, the at least one memory and the computer program code are configured to, with the at least one processor, cause the apparatus to at least:
  replicate, by the router based on the respective IP addresses of the egress routers in the group of egress routers, the IP packet to form a replicated IP packet; and
  send, by the router, the replicated IP packet based on the tree from the router to the egress routers in the group of egress routers.

25. The apparatus of claim 1, wherein, to handle the IP packet, the at least one memory and the computer program code are configured to, with the at least one processor, cause the apparatus to at least:
  receive, at one of the egress routers in the group of egress routers, the IP packet;
  remove, by the one of the egress routers, an encoding of an IP address of the one of the egress routers from the header of the IP packet to provide a modified IP packet; and
  forward, by the one of the egress routers, the modified IP packet within a context of a multicast application of the multicast group.

26. A non-transitory computer-readable storage medium storing instructions configured to cause an apparatus to at least:
  handle an Internet Protocol (IP) packet for a multicast group including a set of egress routers, wherein the IP packet includes a payload and a header, wherein the header includes a set of addresses indicative of a group of egress routers including a subset of the egress routers of the multicast group, wherein the set of addresses indicative of the group of egress routers includes a router address of a router and a tree address of a tree from the router to the egress routers in the group of egress routers.

27. A method, comprising:
  handling, by an apparatus, an Internet Protocol (IP) packet for a multicast group including a set of egress routers, wherein the IP packet includes a payload and a header, wherein the header includes a set of addresses indicative of a group of egress routers including a subset of the egress routers of the multicast group, wherein the set of addresses indicative of the group of egress routers includes a router address of a router and a tree address of a tree from the router to the egress routers in the group of egress routers.

28. An apparatus, comprising:
  at least one processor; and
  at least one memory including computer program code;
  wherein the at least one memory and the computer program code are configured to, with the at least one processor, cause the apparatus to at least:
    handle, by an ingress router associated with a multicast group including a set of egress routers, an Internet Protocol (IP) packet including a payload and a header, wherein the header includes a set of addresses indicative of a group of egress routers including only a subset of the egress routers of the multicast group.

* * * * *